United States Patent

Irwin

[15] 3,654,617

[45] Apr. 4, 1972

[54] MICROPROGRAMMABLE I/O CONTROLLER

[72] Inventor: John W. Irwin, Longmont, Colo.

[73] Assignee: International Business Machines Corporation, Armonk, N.Y.

[22] Filed: Oct. 1, 1970

[21] Appl. No.: 77,088

[52] U.S. Cl. .......... 340/172.5
[51] Int. Cl. .......... G06f 9/12
[58] Field of Search .......... 340/172.5

[56] References Cited

UNITED STATES PATENTS

| | | | |
|---|---|---|---|
| 3,210,733 | 10/1965 | Terzian et al. | 340/172.5 |
| 3,238,506 | 3/1966 | Jung et al | 340/172.5 |
| 3,293,610 | 12/1960 | Epperson et al. | 340/172.5 |
| 3,312,951 | 4/1967 | Hertz | 340/172.5 |
| 3,377,623 | 4/1968 | Reut et al. | 340/172.5 |
| 3,395,396 | 7/1968 | Pasternar | 340/172.5 |
| 3,469,239 | 9/1969 | Richmond et al | 340/172.5 |
| 3,409,880 | 11/1968 | Galler | 340/172.5 |
| 3,408,632 | 10/1968 | Hauck | 340/172.5 |
| 3,411,143 | 11/1968 | Beausoleil et al | 340/172.5 |
| 3,419,852 | 12/1968 | Marx et al | 340/172.5 |
| 3,500,328 | 3/1970 | Wallis | 340/172.5 |

*Primary Examiner*—Paul J. Henon
*Assistant Examiner*—Ronald F. Chapurah
*Attorney*—Hanifin and Jancin and Herbert F. Somermeyer

[57] ABSTRACT

A microprogrammable plural ALU (arithmetic-logic unit) controller utilizes task assignments for improving processing efficiencies. The ALU's are selected to be low-cost, low-capability devices. Each ALU is within one independent Micro Programmable Unit (MPU). Interconnection registers, preferably symmetrically arranged, provide program synchronization between the plural MPU's. These same registers have direct connections to data flow circuits for monitoring and controlling their operation.

20 Claims, 37 Drawing Figures

INVENTOR
JOHN W. IRWIN

BY Herbert F. Somermeyer

ATTORNEY

MICROPROGRAMMABLE I/O CONTROLLER

BACKGROUND OF THE INVENTION

The present invention relates to an I/O (Input/Output) controller arrangement and more particularly to such an arrangement which is microprogrammable and adapted to connect one or more data channels to one or more I/O devices.

Data processing systems usually include a central processing unit (CPU) which is internally programmed and has a plurality of input-output channels. Input-output channels in turn have a plurality of I/O subsystems connected thereto. Each I/O subsystem consists of one or more I/O controllers or control units; each with a plurality of I/O devices, such as card readers, card punches, magnetic tape units, magnetic disc files, and the like. In such data processing systems, the most expensive portion on a time-use basis is the central processing unit. For improving cost-performance characteristics of such a data processing system, it is highly desirable that as many of the functions relating to I/O operations be accomplished without delaying operation of the CPU. Of course, these functions added to the I/O subsystems must be performed at relatively low cost, which requires a minimum of additional hardware.

Another aspect of I/O controller design is flexibility. As the I/O devices change, as channel characteristics change, the field changes required in the I/O controller should be held to a minimum with such changes being facilitated by the design of the I/O controller.

SUMMARY OF THE INVENTION

It is an object of the present invention to provide an improved, low-cost, highly flexible I/O controller.

A controller constructed in accordance with the teachings of the present invention includes a plurality of independently operable microprogrammable units (MPU's). Each MPU has its own program of micro-instructions and its own memories. A set of exchange registers receives signals from the respective MPU's on an output bus. Each MPU has input gating means connected with the exchange registers associated with the other MPU's for selectively gating signals therefrom. Such gating means provide program synchronization. The signals stored in such exchange registers are simultaneously supplied to data flow circuits which process information-bearing signals between an I/O channel (Interface) and various I/O devices. The data flow circuits are responsive to the exchange register signals to perform signal processing operations for effecting exchange of information-bearing signals. In such an arrangement, the I/O channel is usually a controlling system and the I/O devices are a subservient system.

According to one aspect of the invention, one MPU (MPUX) is associated with the channel and is the dominant MPU. A second or I/O device MPU (MPUY) is associated with I/O devices and is subservient to the channel MPU.

In other arrangements, additional MPU's may be provided, one being in the data flow circuits as a part of the data flow operation. In such an instance, the exchange registers direct the data-flow MPU to perform data-processing operations on the signals being exchanged. The data-flow MPU in turn supplies status signals via its own exchange registers which then are selectively sampled by one of the other MPU's.

Each MPU may be of simple design having an ALU capable of performing a single micro-step during each cycle of operation. A limited repertoire of instructions are provided with a limited sized instruction word. For saving control memory, an incrementable instruction word counter is provided. For reducing cost of construction, the exchange registers associated with the channel and I/O device MPU's are symmetrically designed.

The channel may trap the channel MPU which in turn may trap the I/O device MPU. While the channel MPU is setting up operations for the I/O subsystem, it may hold the I/O device MPU in an inoperative state; i.e., no signals of any type are being processed. In a moving media system, velocity (tach) signals are supplied to both MPU's for diagnostic and operational purposes.

The channel MPU has connections with I/O devices for addressing and broad supervisory purposes. All operational aspects are effected by the device MPU. The channel MPU may perform diagnostic functions simultaneously with the device MPU operational control.

The foregoing and other objects, features, and advantages of the invention will be apparent from the following more particular description of preferred embodiments of the invention, as illustrated in the accompanying drawings.

THE DRAWINGS

Figure 8:
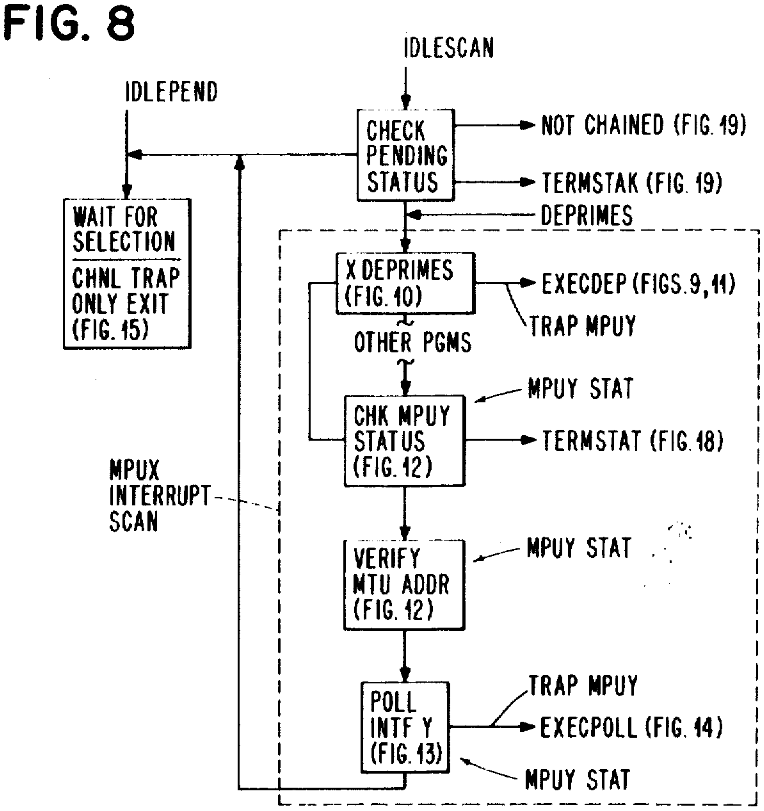
FIGS. 8 to 32 are abbreviated illustrations of micro-routines set forth in FIG. 7 as tabulated below.
Figure 9:
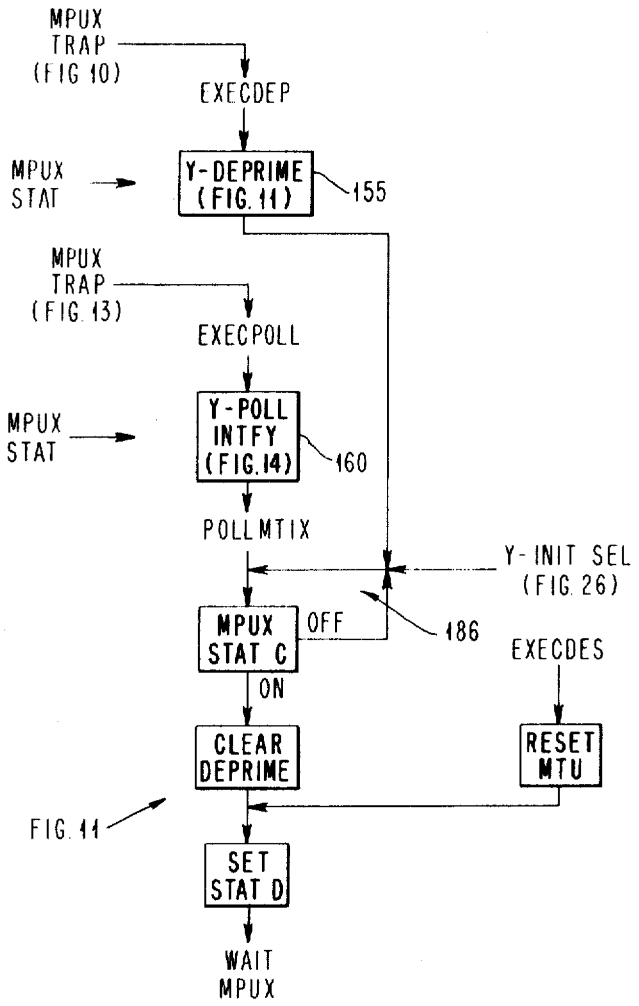

FIG. 8 — IDLESCAN in MPUX
FIG. 9 — IDLESCAN in MPUY

Figure 10:
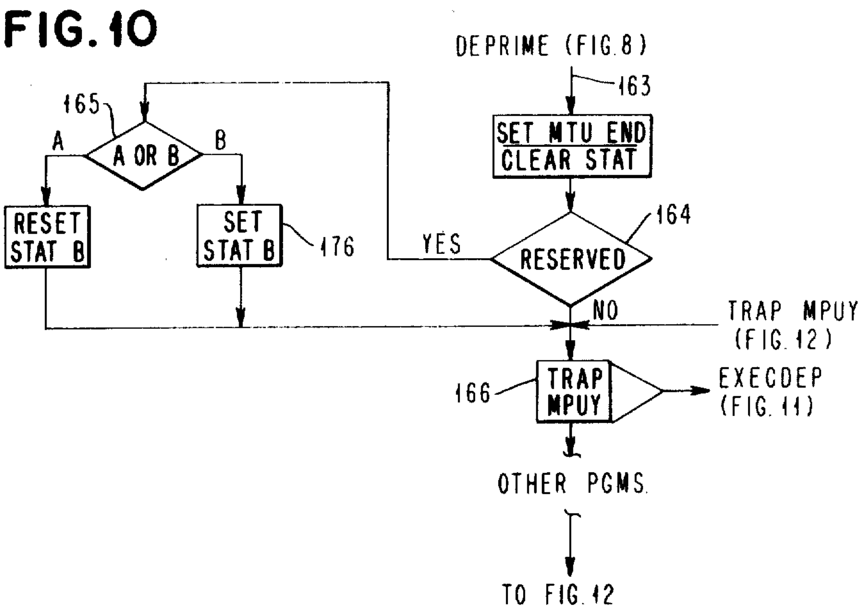
Figure 11:
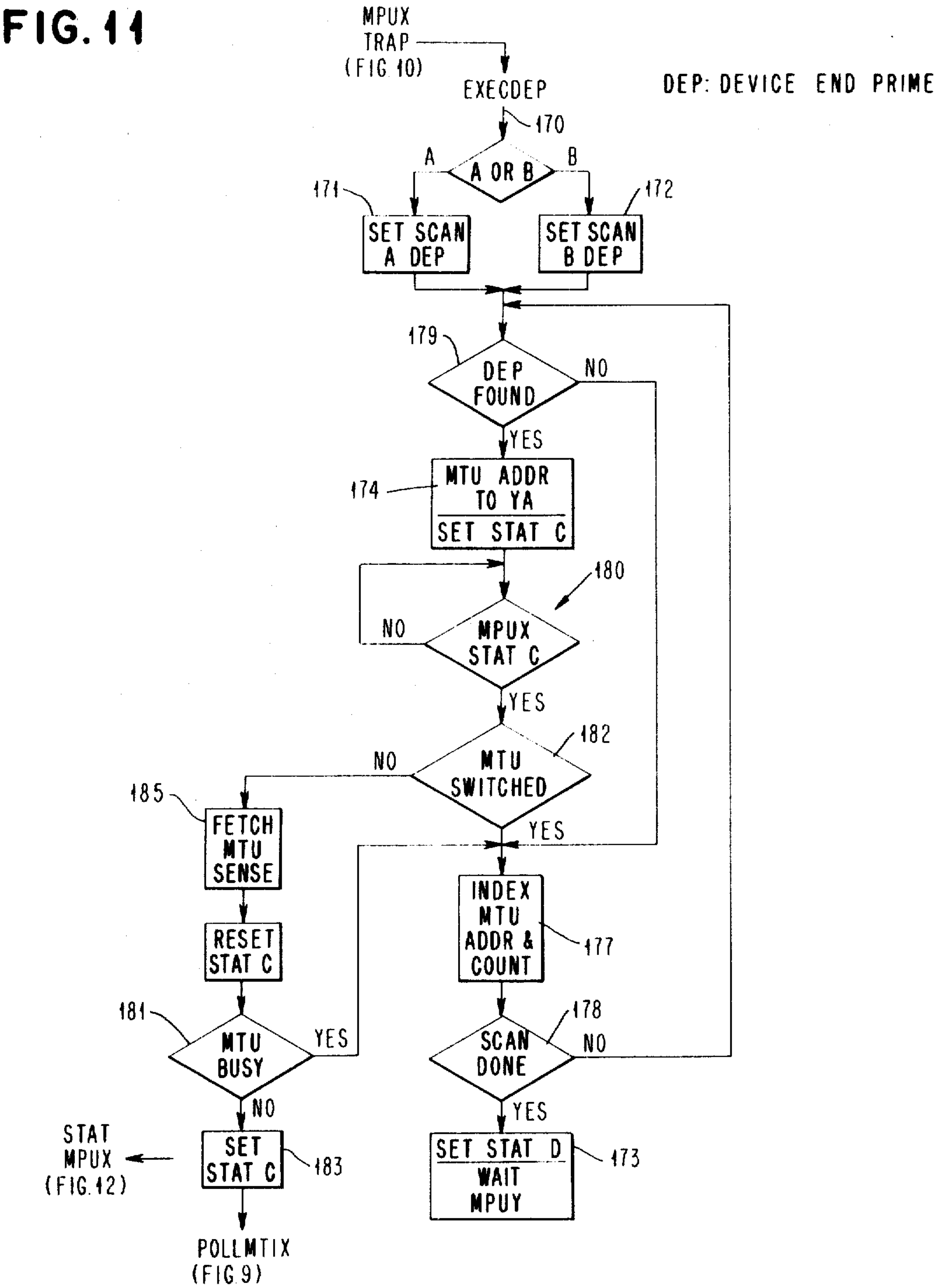
Figure 12:
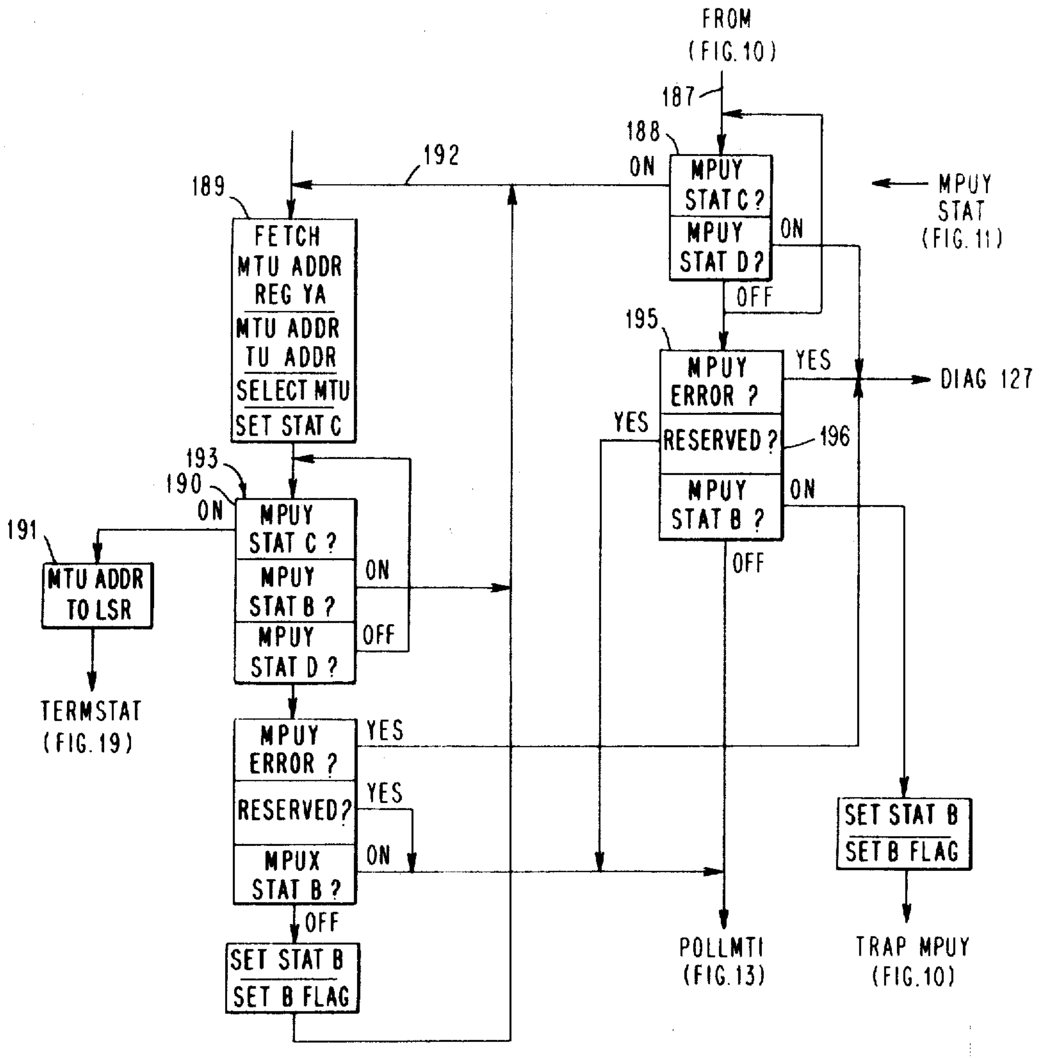
Figure 13:
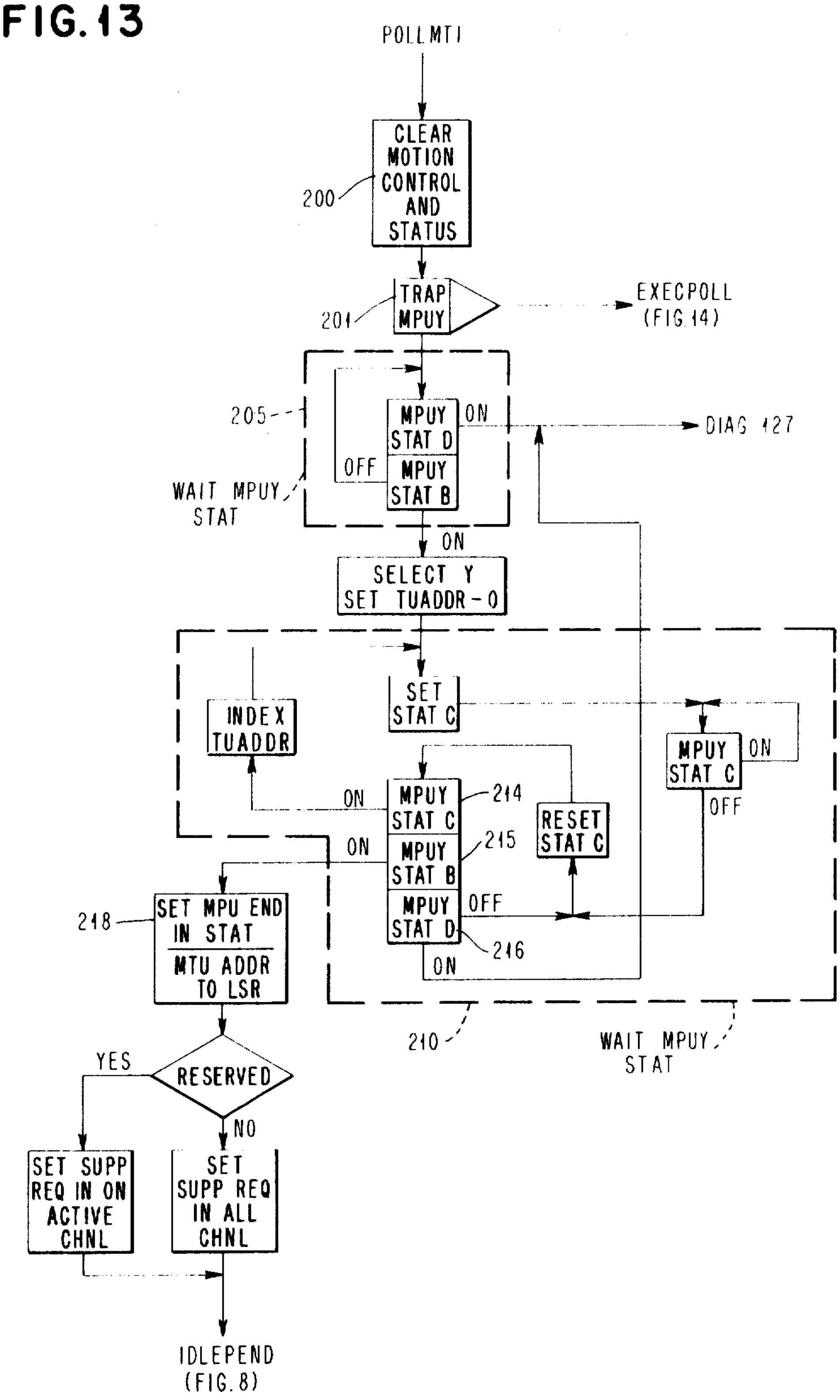
Figure 14:
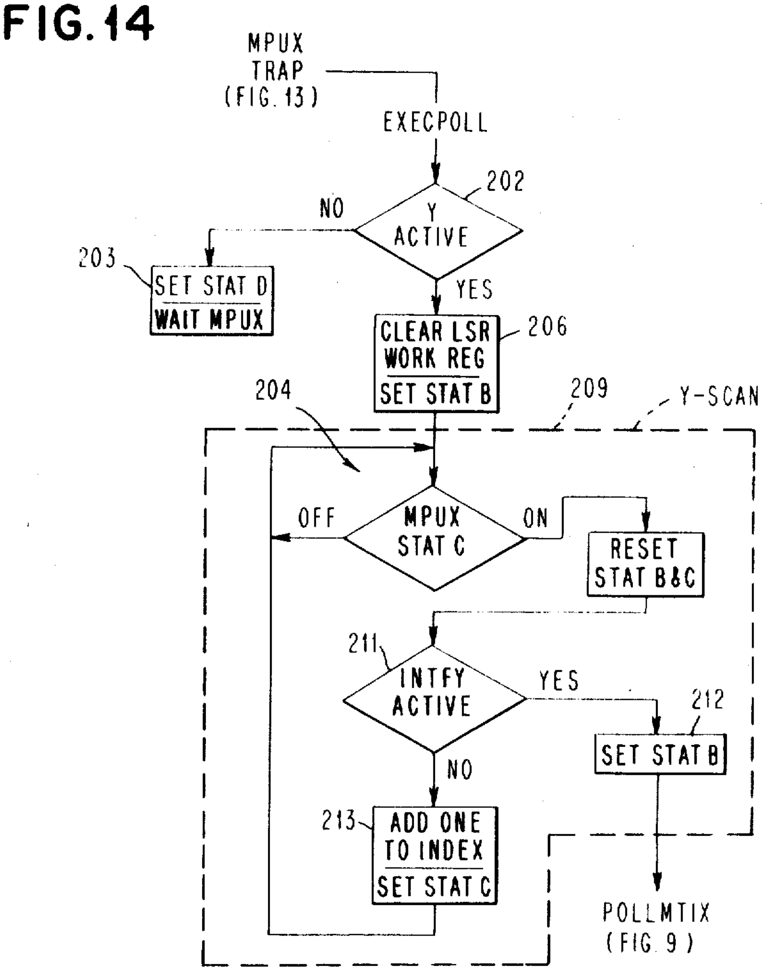

The function of interrupt scanning is shown in:

FIG. 10 — DEPRIMES in MPUX
FIG. 11 — POLL DEPRIMES in MPUY
FIG. 12 — MPUX checking MPUY status and verifying on MTU address received from interface X (INTFX)
FIG. 13 — MPUX polling interface Y (INTFY)
FIG. 14 — MPUY polling interface Y (INTFX)

Figure 15:
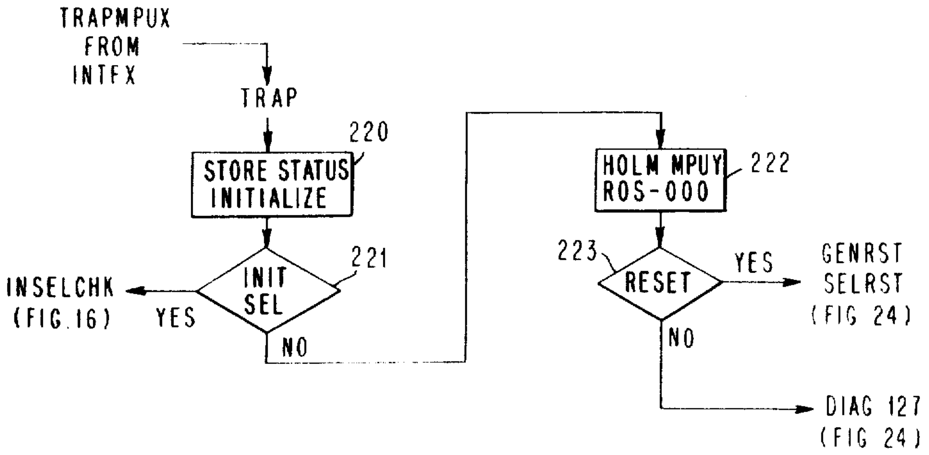
Figure 16:
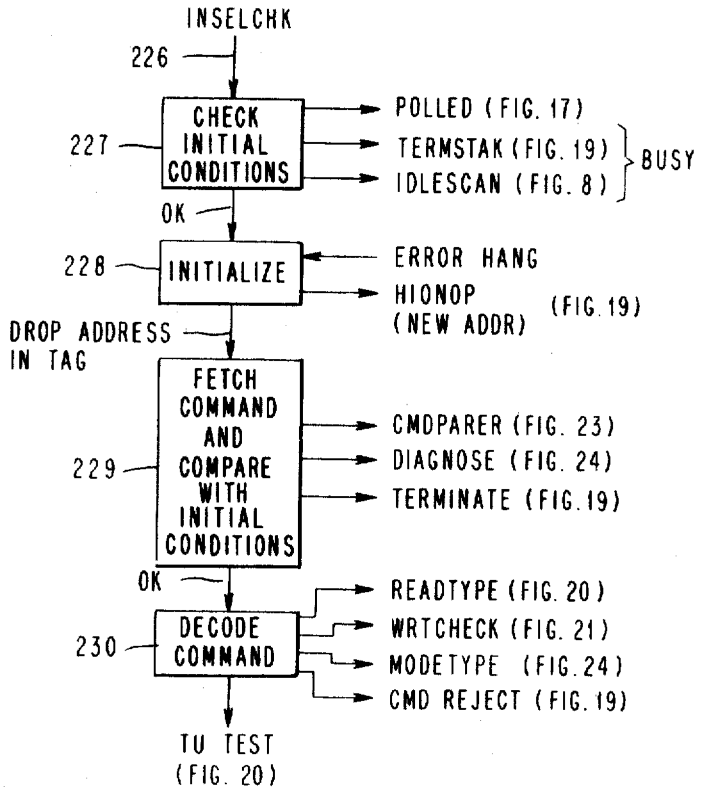
Figure 17:
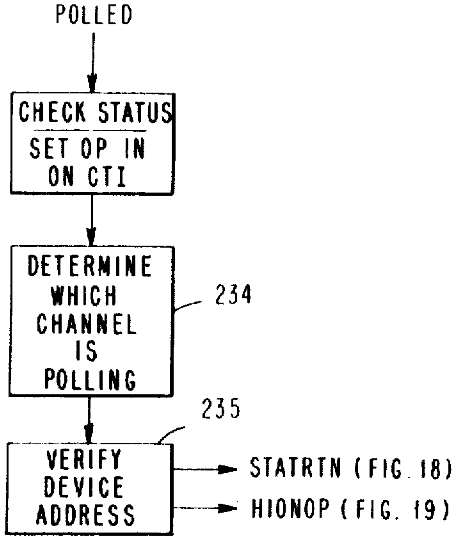
Figure 18:
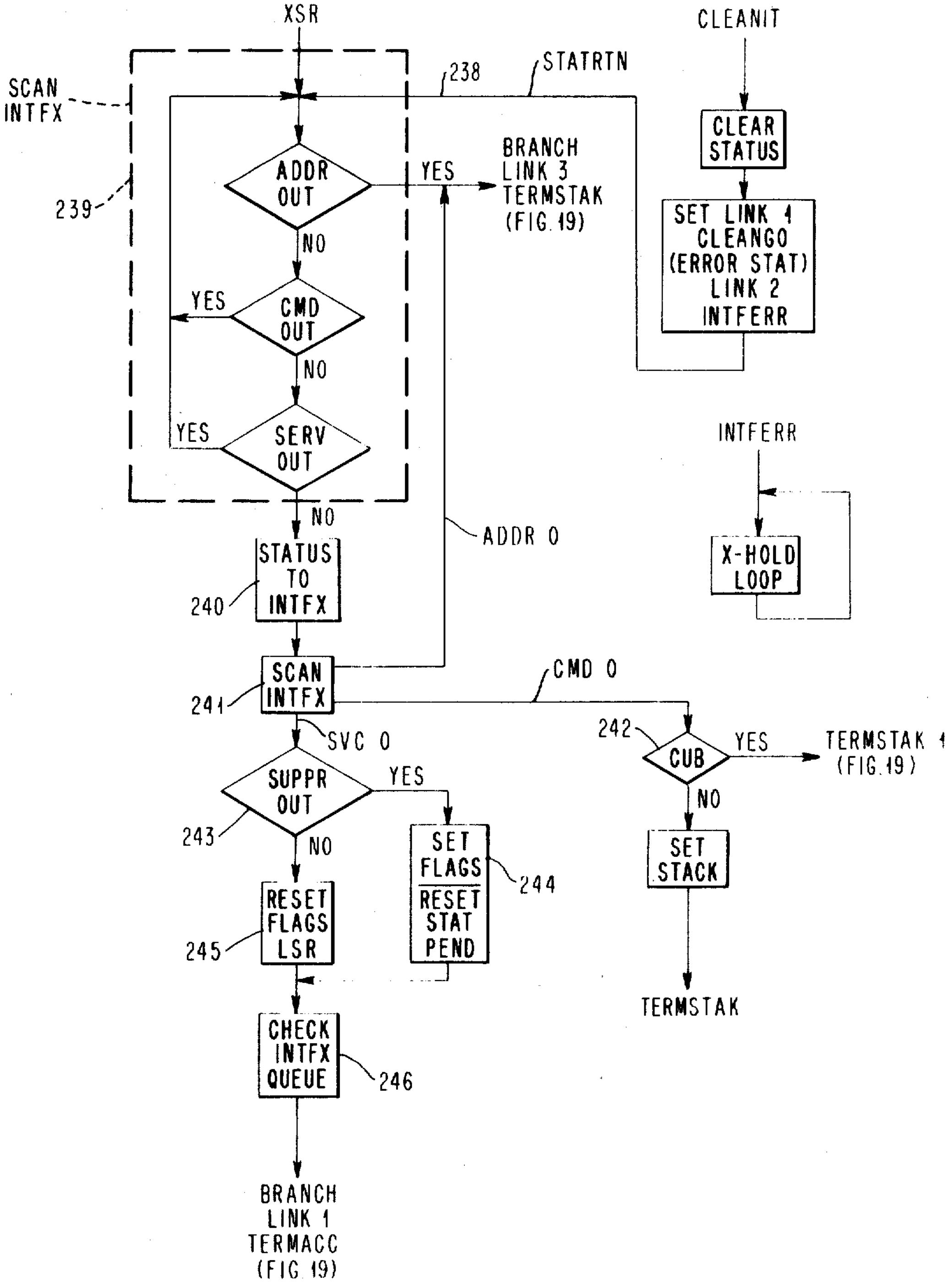
Figure 19:
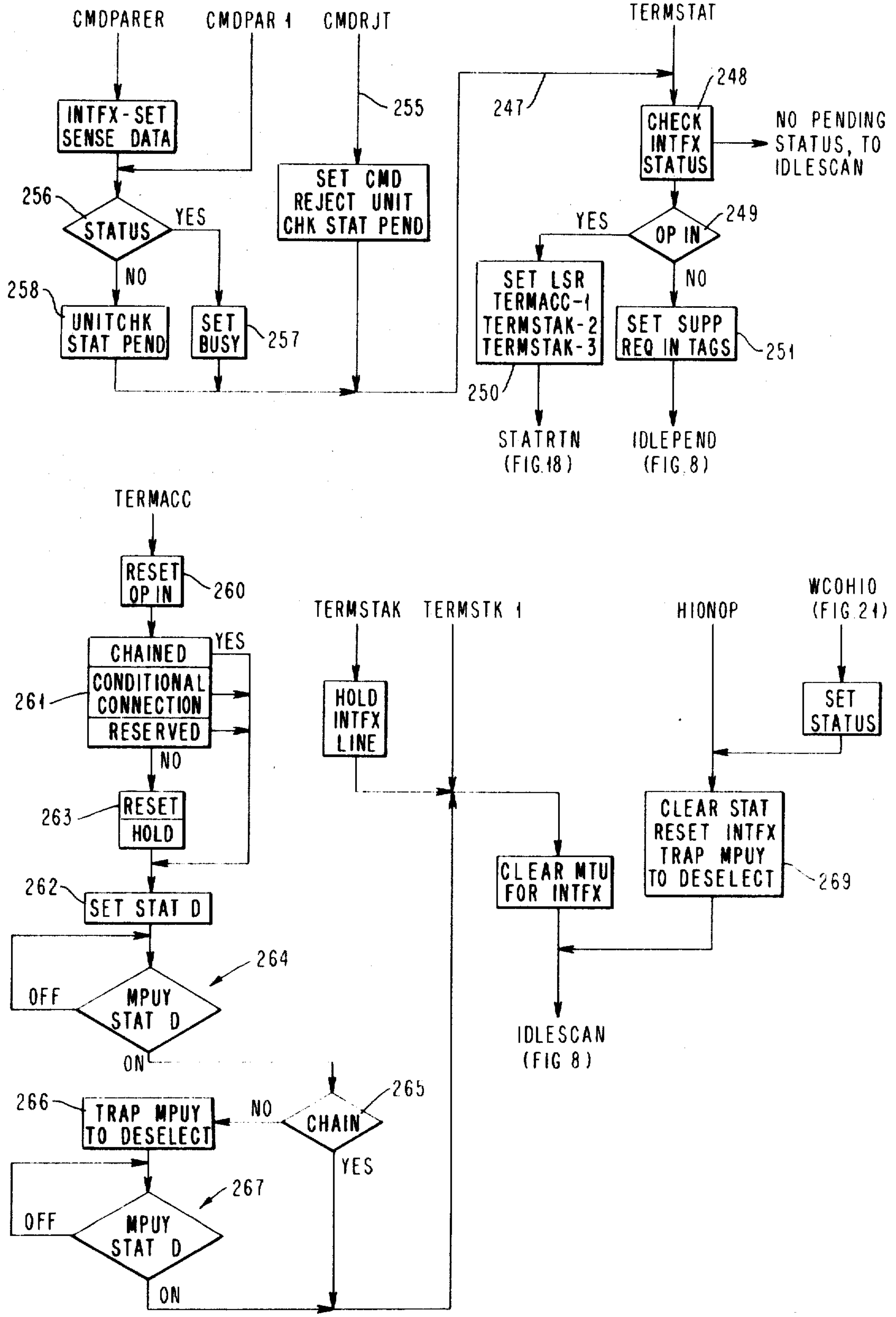
Figure 20:
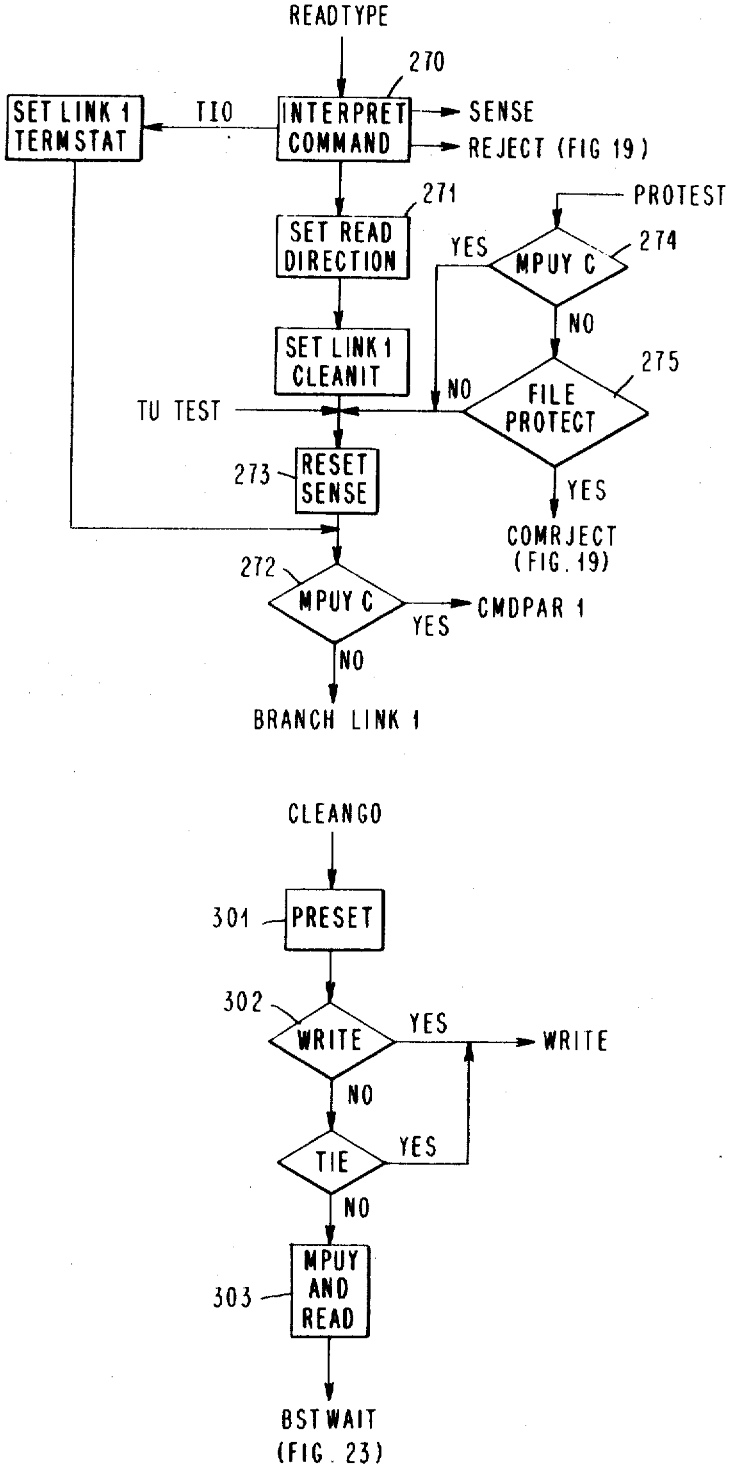
Figure 21:
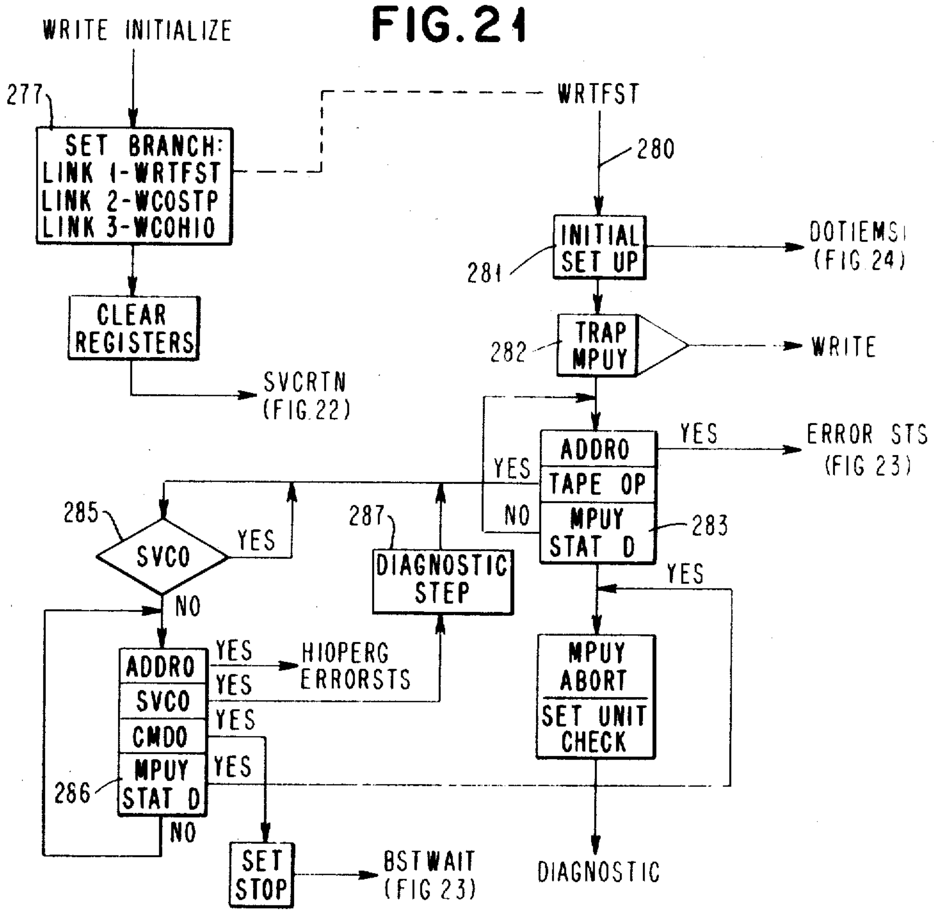
Figure 22:
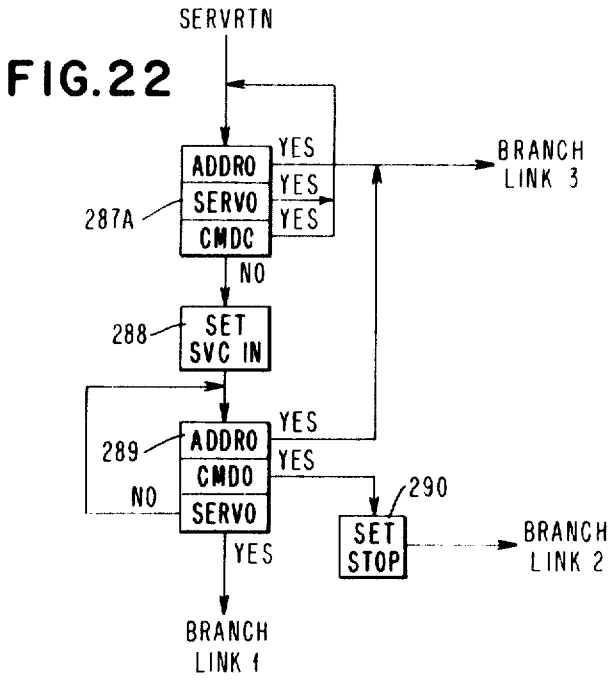
Figure 23:
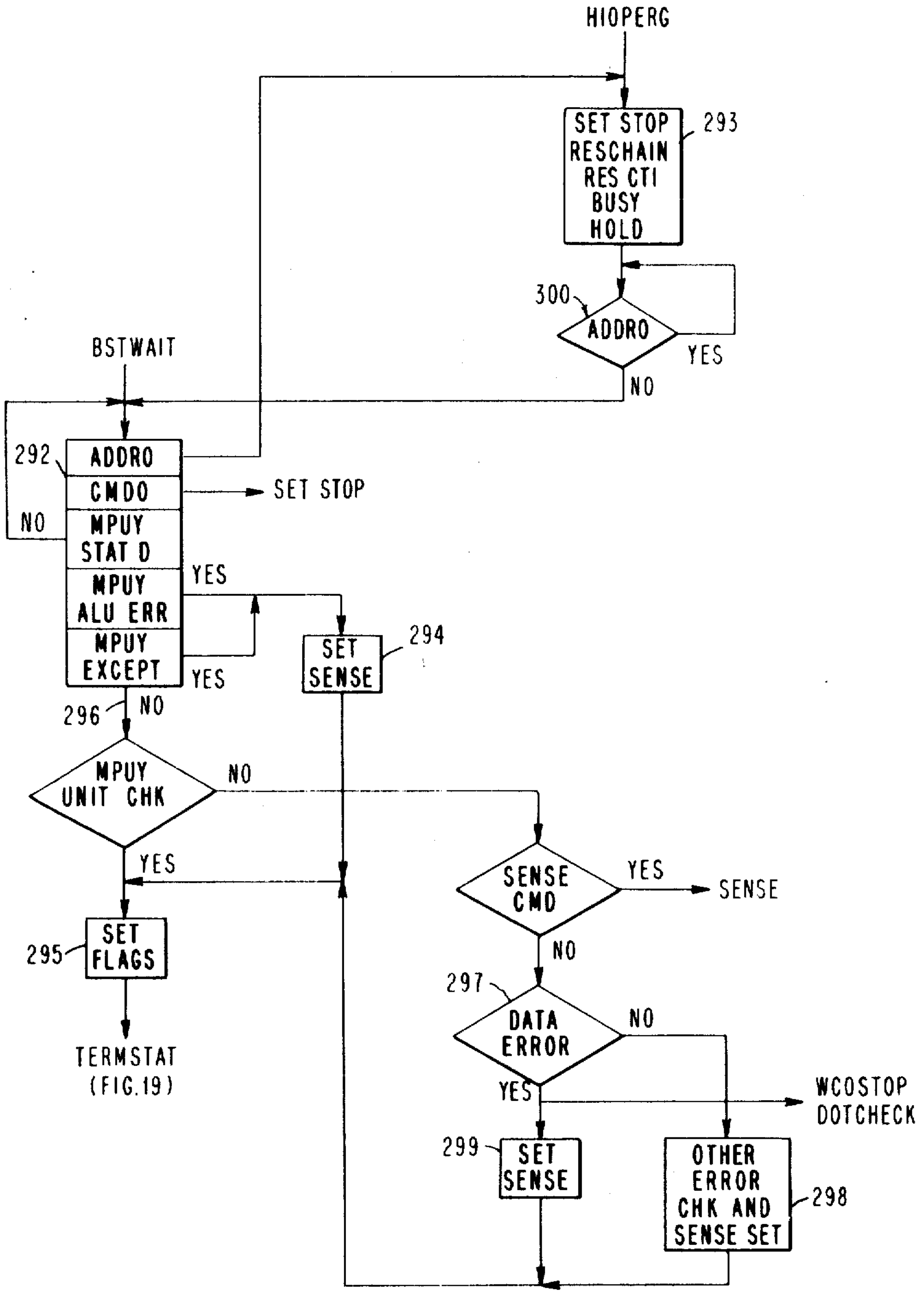
Figure 24:
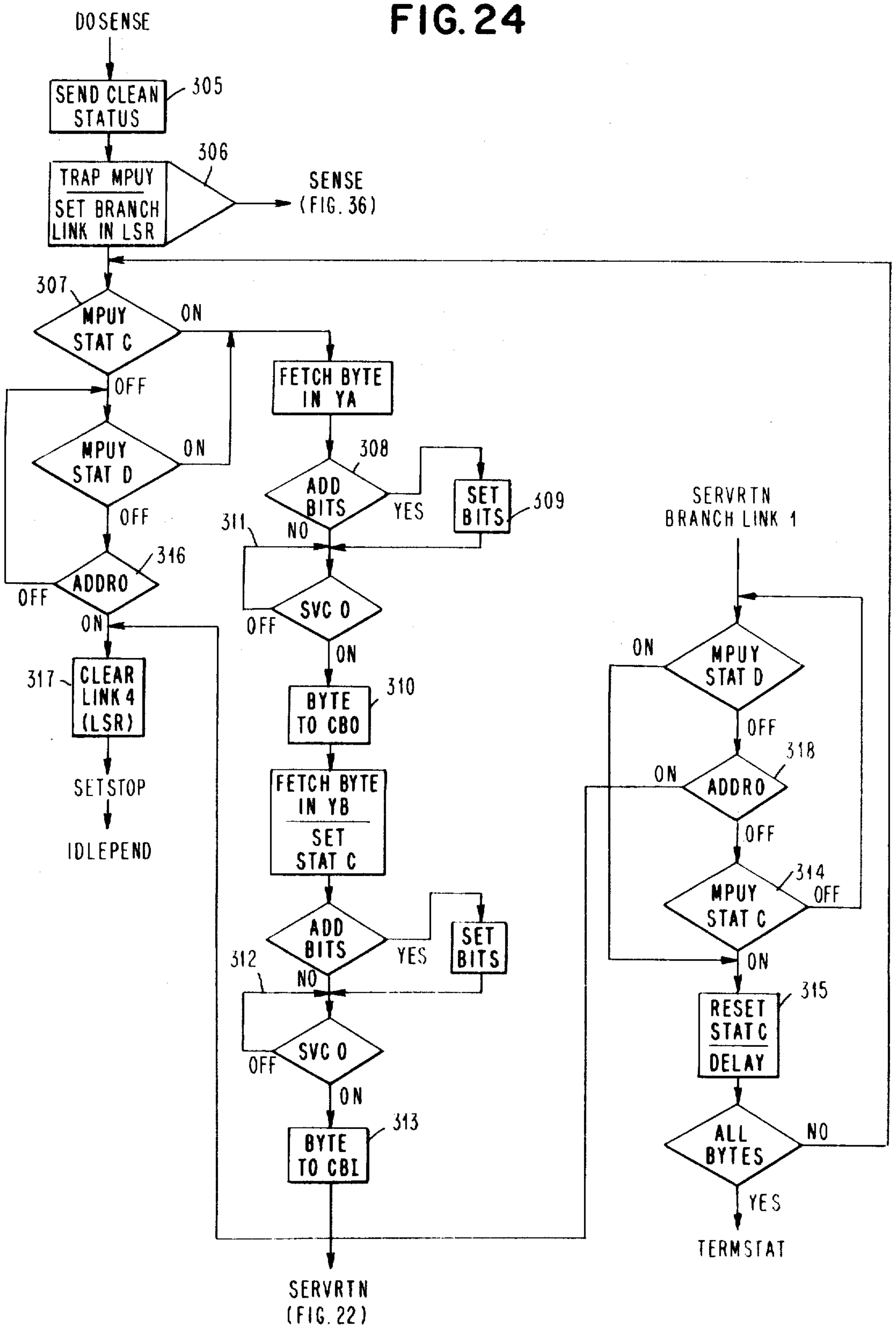

MPUX MICROPROGRAMS:

FIG. 15 — X-trap
FIG. 16 — X-initial selection
FIG. 17 — X-polled
FIG. 18 — X-status
FIG. 19 — X-termination
FIG. 20 — X-read type and MTU tests
FIG. 21 — X-write
FIG. 22 — X-service return
FIG. 23 — X-error status
FIG. 24 — X-sense

Figures 25, 26:
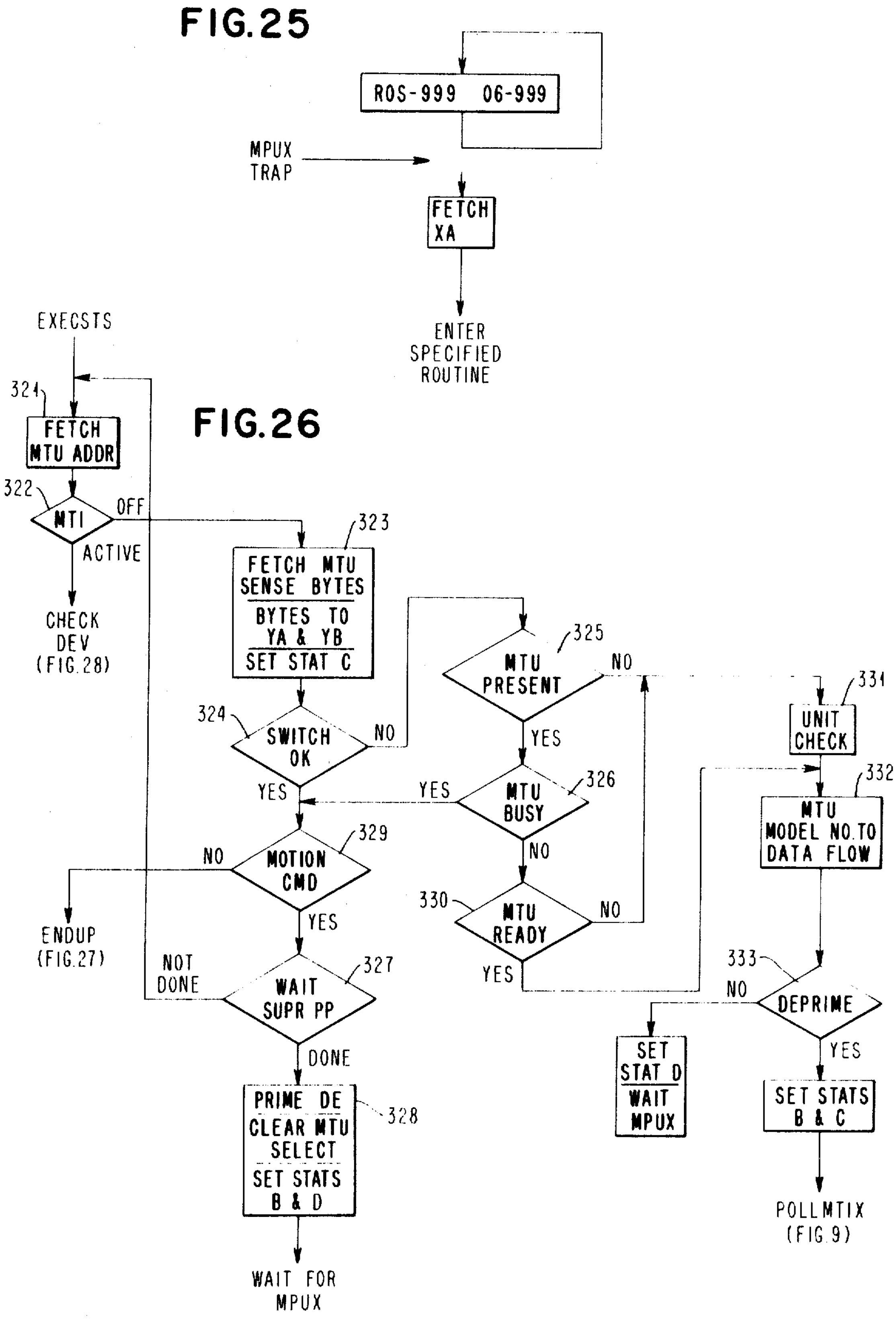
Figures 27, 28:
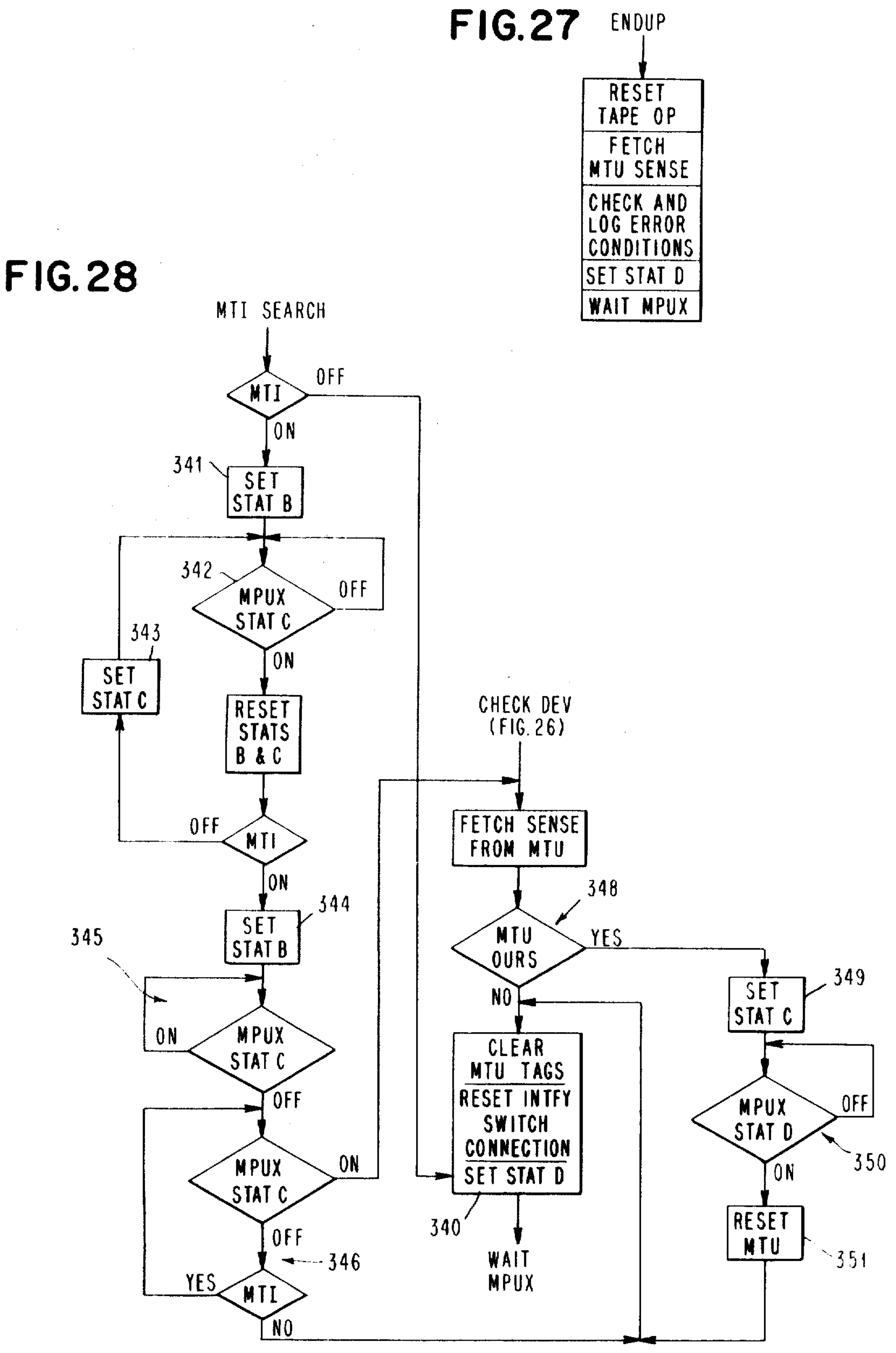
Figure 29:
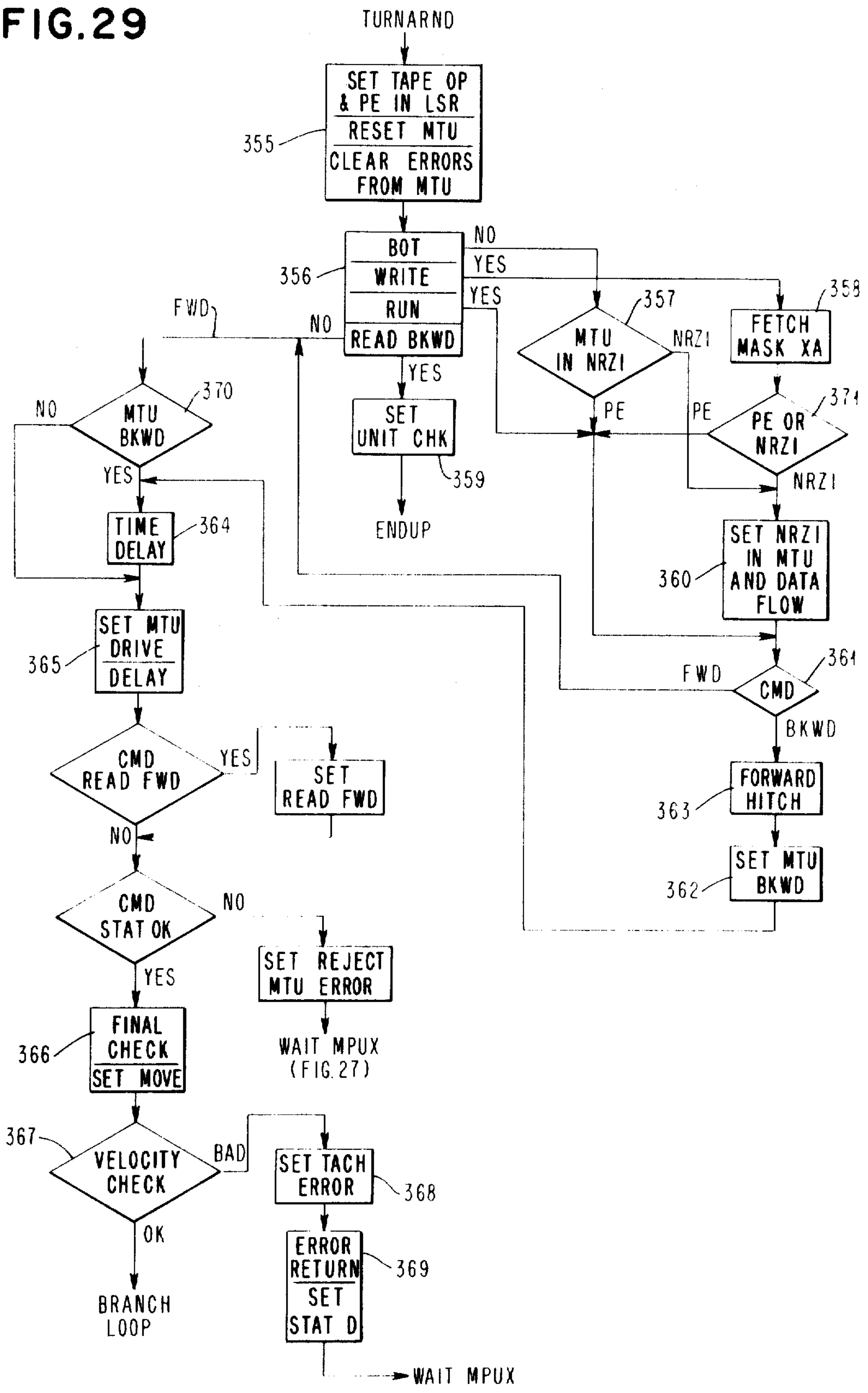
Figure 30:
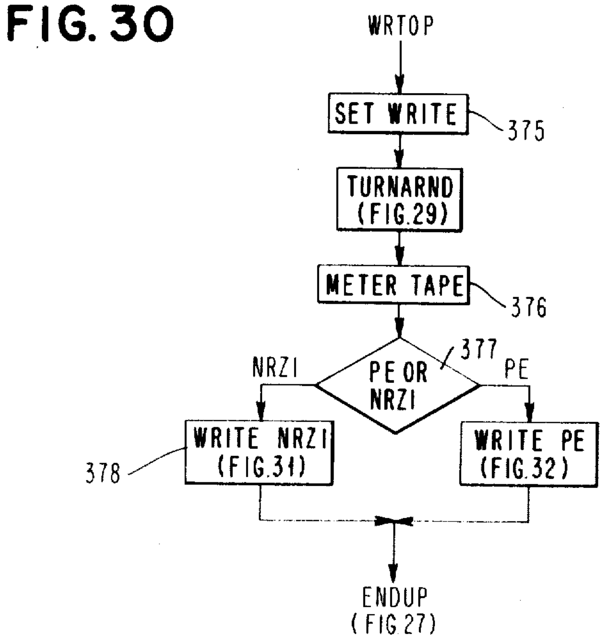
Figure 31:
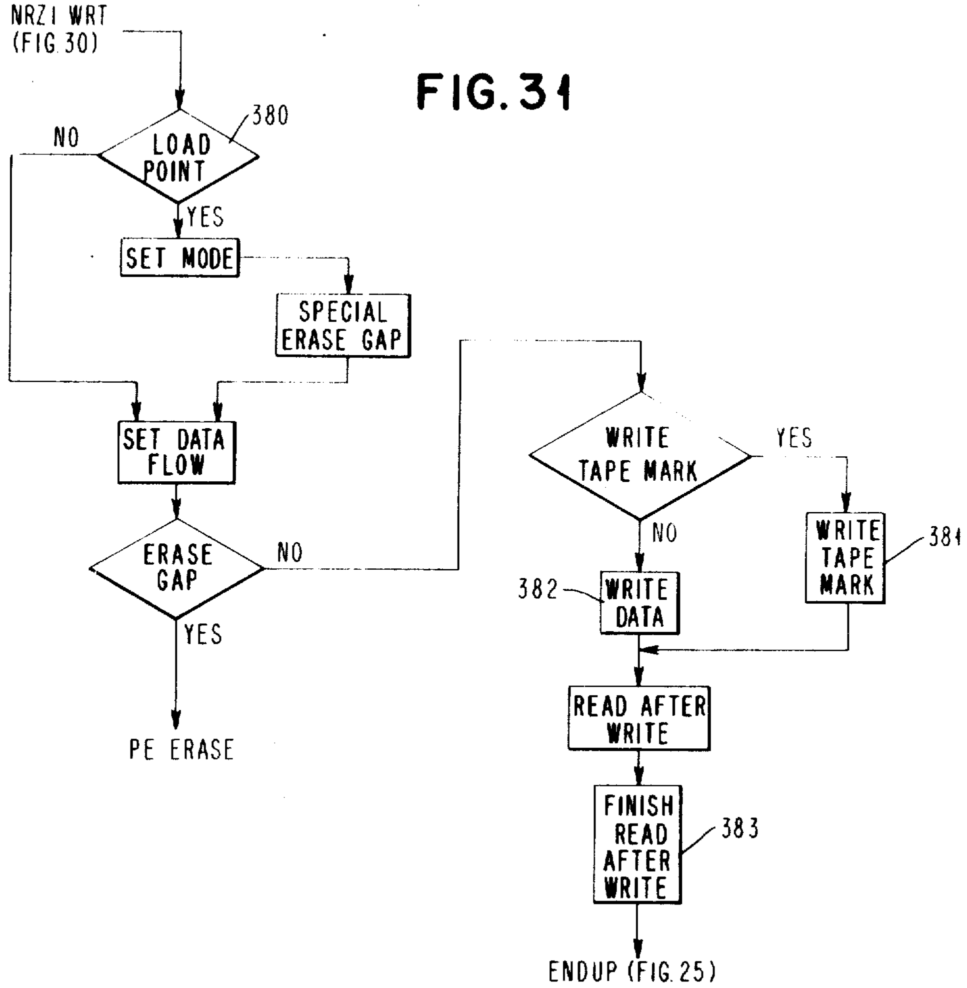
Figure 32:
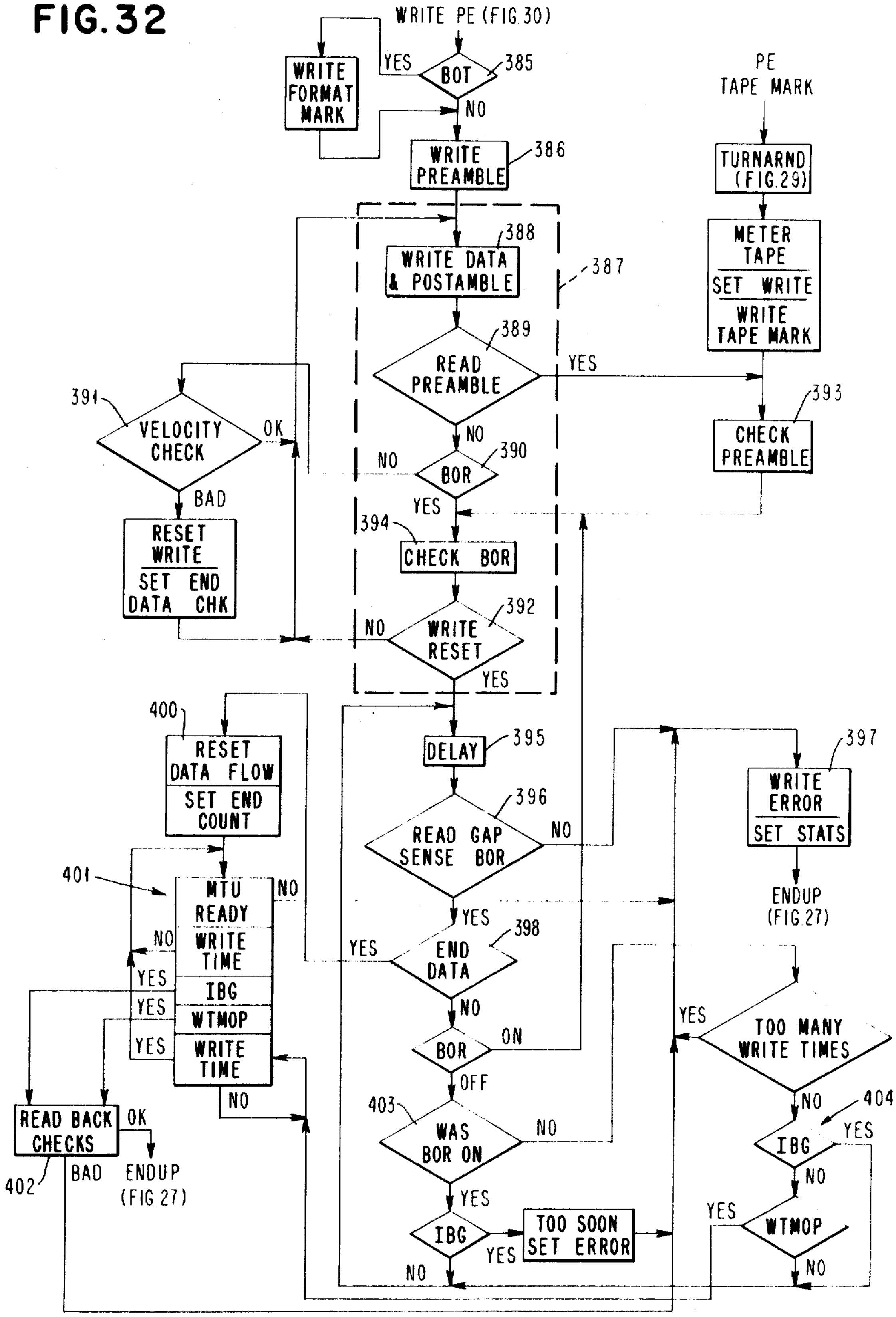
Figures 33, 34:
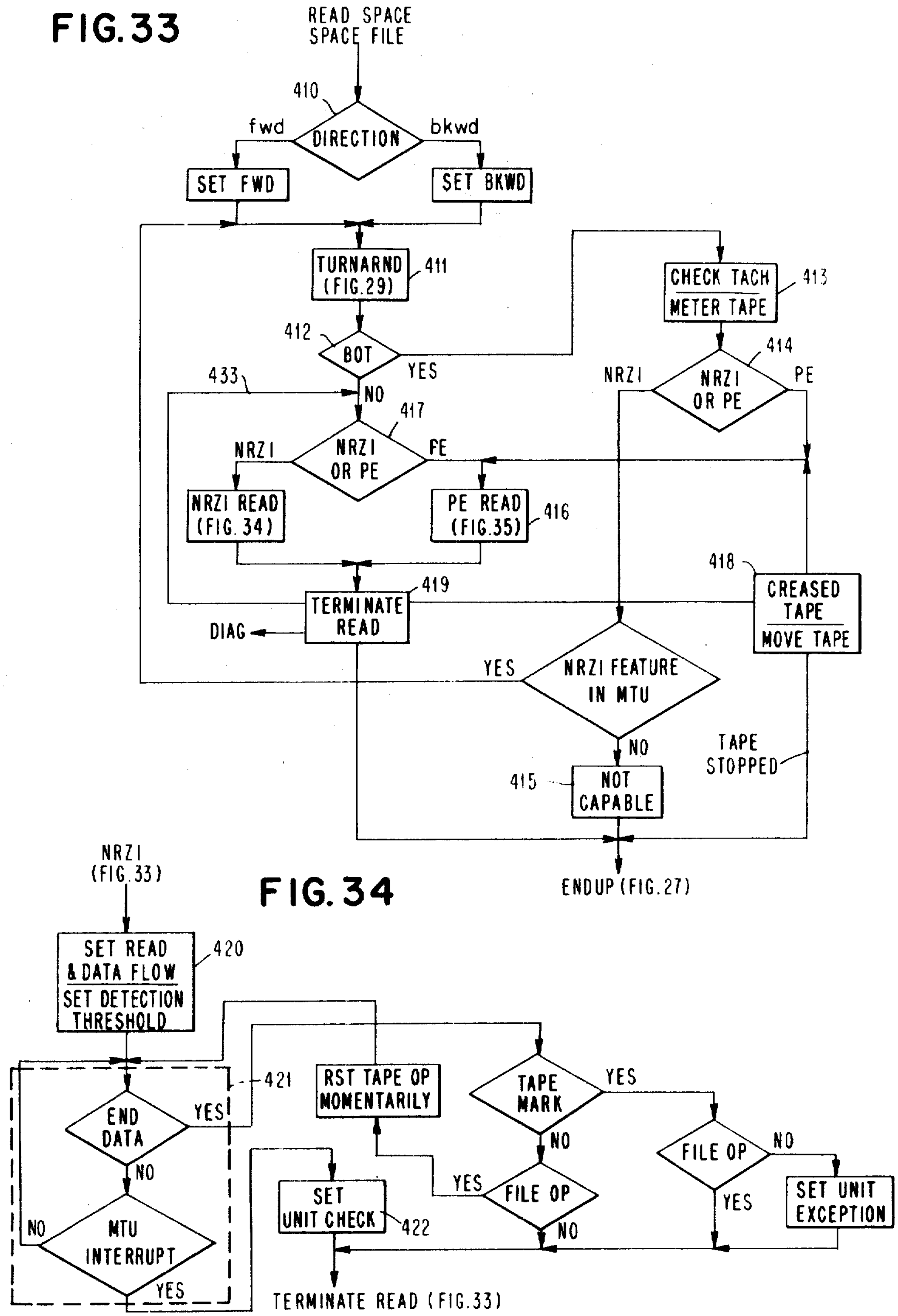
Figure 35:
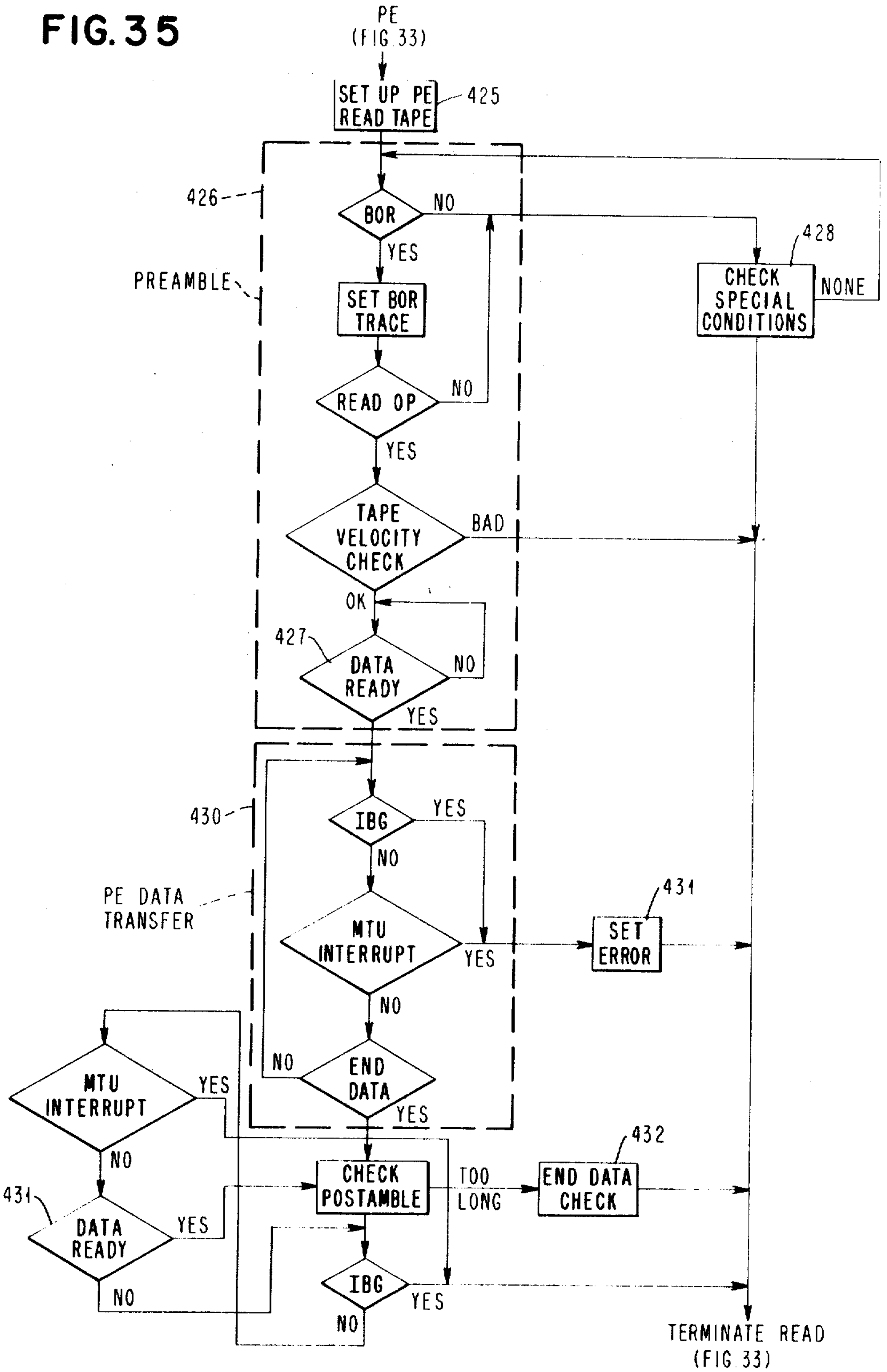
Figure 36:
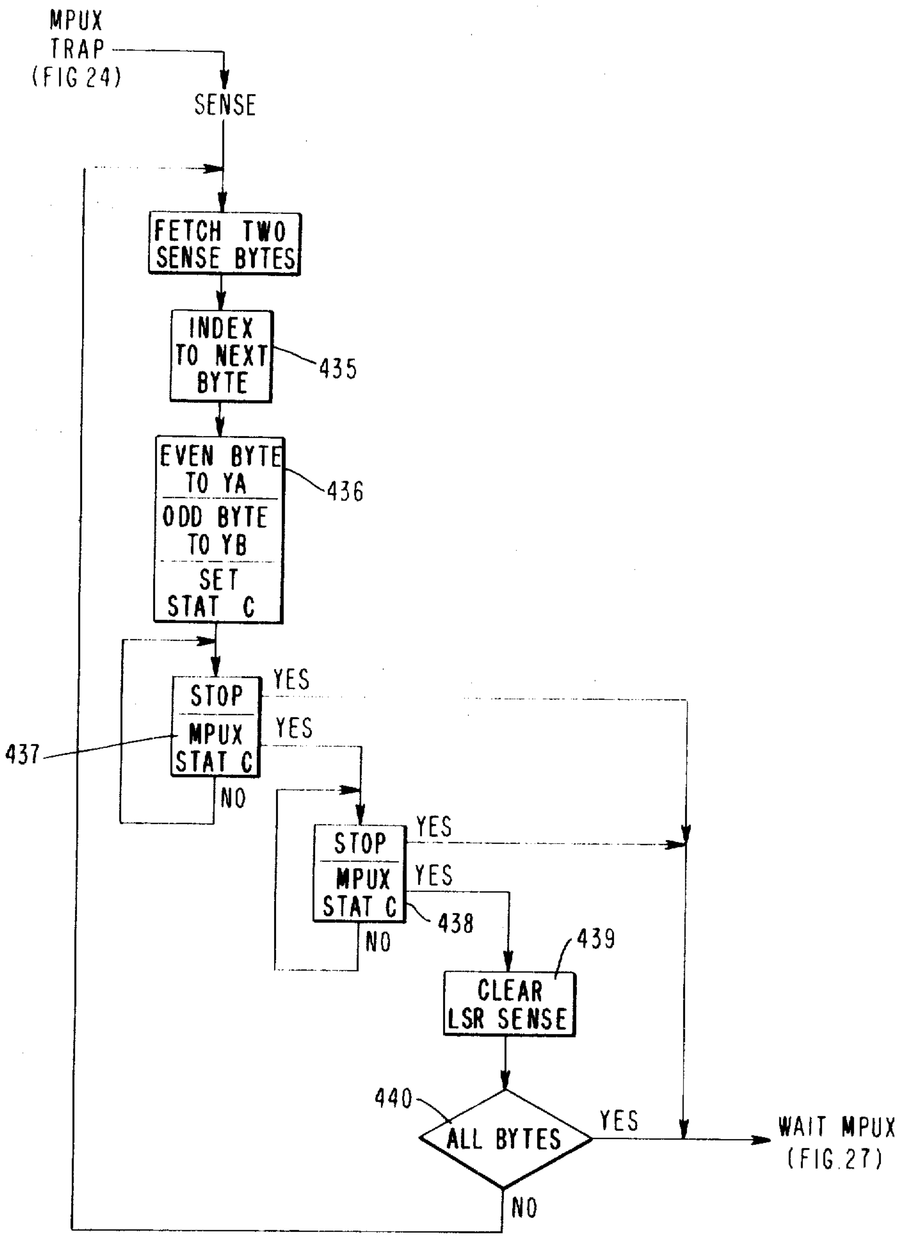
Figure 37:
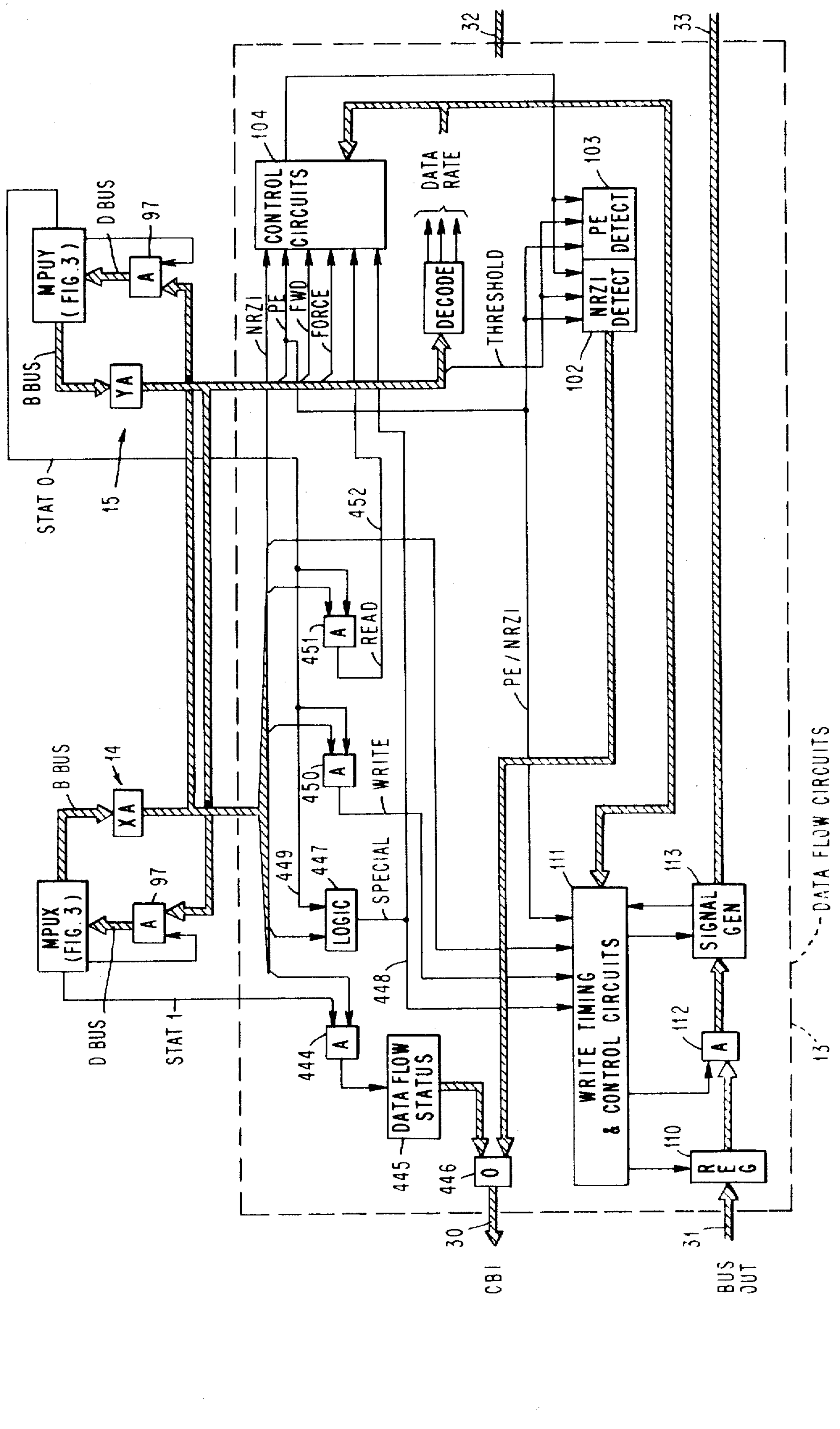

MPUY MICROPROGRAMS:

FIG. 25 — Y-trap
FIG. 26 — Y-initial selection
FIG. 27 — Y-termination
FIG. 28 — INTFY search
FIG. 29 — Motion control
FIG. 30 — Y-write
FIG. 31 — Write NRZI
FIG. 32 — Write PE
FIG. 33 — Y-read
FIG. 34 — Read NRZI
FIG. 35 — Read PE
FIG. 36 — Y-sense FIG. 37 is a simplified logic diagram showing the relationship between data flow circuits and microprogram generated signals from microprocessing units.

GLOSSARY OF ABBREVIATIONS AND ACRONYMS

This glossary provides a ready reference to the abbreviations repeatedly used in describing the invention.

| | |
|---|---|
| ADDR | Address |
| ADDRO | Address Out (a command signal indicating address signals are being sent in bus out lines) |
| ADDRI | Address In (a command signal on INTFX indicating address signals appear from CBI) |
| A-DEPRIMES | DEPRIMES resulting from Channel A activity |
| ALU | Arithmetic-Logic Unit |
| B-DEPRIMES | DEPRIMES resulting from Channel B activity |
| BKDWD | Backward |
| BOC | Branch on Condition |
| BOR | Beginning of Record (remains active during entirety of record readback signal envelope) |
| BOT | Beginning of Tape |
| BSTWAIT | Burst Mode, Wait Routine (MPUX) |
| CBI | Channel Bus In (lines for carrying data signals from I/O controller to CPU via INTFX) |
| CBO | Channel Bus Out (lines for carrying data signals from INTFX to controller 11) |
| CHNL | Channel |
| CLEANGO | A routine entered by MPUX when stat read status permits a read operation to be initiated |
| CLEANIT | A routine entered by MPUX to check status during a read initiation |
| CMD | Command (a control signal) |
| CMDO | Command Out (a control signal telling controller 11 to change operation in accordance with predetermined criteria) |
| CMDPARI | Command Parity (an acronymn representing the entry point of an error analysis routine based upon a command parity error) |
| CMDPARER | Command Parity Error (the primary entry point into an error routine resulting from a command parity error) |
| CMDRJT | Command Reject (an entry point into a termination program based upon the I/O controller rejecting a command received over CBO) |
| CPU | Central Processing Unit |
| CTI | Channel Tag In (a control signal supplied from an I/O controller to a data channel concerning the interpretation of other signals supplied over CBI) |
| CTO | Channel Tag Out (a control signal supplied from a data channel to an I/O controller interpreting other signals supplied over CBO) |
| CU | Control Unit |
| CUB | Control Unit Busy (a tag signal) |
| DE | Device End (a control signal from an I/O device indicating end of an operation) |
| DEP | Device End Prime (see below) |
| DEPRIME | Device End Prime (a flag signal in a memory unit indicating a data channel has previously requested access to an I/O device. Upon receipt of a device end, signals are supplied to the channel to provide access to the I/O device) |
| DIAG | Diagnostic |
| DOTIEMS1 | Do Track in Error Mode Set 1 (an entry point for a mode terminating program) |
| EXECDEP | Execute DEPRIME (an entry point for an I/O device microprogram for initiating scanning for DEPRIMES) |
| EXECDES | Execute DESELECT (the entry point for an I/O device microprogram used to disconnect an I/O device) |
| EXECPOLL | Execute Poll (an entry point for an entry device microprogram used to poll I/O device status) |
| FWD | Forward |
| GENRST | General Reset (a microprogram) |
| HIONOP | Halt I/O, System Not Operating (a channel microprogram used to abort an operation not yet initiated) |
| HIOPERG | Halt I/O Operating (a channel microprogram used to abort a subsystem operation during subsystem activity) |
| IBG | Interblock Gap |
| IC | Instruction Counter |
| IDLEPEND | A wait routine for the channel microprogram unit used to wait for further instructions from a data channel |
| IDLESCAN | A microprogram used to scan for DEPRIMES |
| IHS | Information Handling System |
| INSELCHK | Initial Selection Check (an entry into initial selection which first checks pending status) |
| INTFX | Interface X |
| INTFY | Interface Y |
| I/O | Input/Output |
| IR | Instruction Register |
| LSR | Local Store Register |
| MIS | Multiple Interface Switch |
| MODETYPE | An entry into a microprogram which determines the mode of operation of a subsystem |
| MPU | Microprogrammable Unit |
| MPUD | Microprogrammable Unit No.D (used in data flow circuits) |
| MPUX | Microprogrammable Unit No.X (used in connection with a data channel) |
| MPUY | Microprogrammable Unit No.Y (used in connection with an I/O device) |
| MTU | Magnetic Tape Unit |
| NOP | No Operation (do nothing command) |
| NRZI | Nonreturn to Zero-IBM (a recording scheme) |
| OP | Operation |
| OP IN | Operation In (a tag signal) |
| PE | Phase Encoding (a recording scheme) |
| POLLMTI | Poll Magnetic Tape Interface (an I/O device microprogram which senses the activity of various MTU's) |
| POLLMTIX | Poll Magnetic Tape Interface Exit (an ending routine for POLLMTI) |
| READTYPE | An entry into a microprogram to determine the type of read operation instructed by the data channel) |
| RES | Reserved |
| ROS | Read Only Store |
| RST | Reset |
| RTN | Return |
| SELRST | Selective Reset |
| SERVRTN | Service Return (a channel coordinating microprogram) |
| SFBKWD | Space File Backward |
| SFFWD | Space File Forward |
| STAT | Status |
| STATRTN | Status Return (a microprogram) |
| STS | Status |
| SUPPREQIN | Suppressible Request In (a tag signal) |
| SUPPRO | Suppress Out (a tag signal) |
| SVCI | Service In (a tag signal) |
| SVCO | Service Out (a tag signal) |
| TACH | Tachometer |
| TAPE OP | Tape Operation (a status signal) |
| TERMACC | Termination Routine, Status Accepted By Channel |
| TERMSTAK | Termination Routine, Status is Stacked, Not Accepted |
| TERMSTK1 | (See TERMSTAK, an alternative entry) |
| TIE | Track in Error |
| TIO | Test I/O |
| TM | Tape Mark |
| TU | Tape Unit |
| TUADDR | Tape Unit Address Register |
| TUBI | Tape Unit Bus In |
| TUBO | Tape Unit Bus Out |
| TUTAG | Tape Unit Tag Register |
| WC0HIO | Word Count Equals Zero, Halt I/O |
| WCOSTP | Word Count equals Zero, Stop |
| WRTCHK | Write Check |
| WRTFST | Write First Byte (an entry into the write routine) |
| WTM | Write Tape Mark (a microprogram) |
| XA | Exchange Register XA |
| XB | Exchange Register XB |
| YA | Exchange Register YA |
| YB | Exchange Register YB |

GENERAL DESCRIPTION

Figure 1:
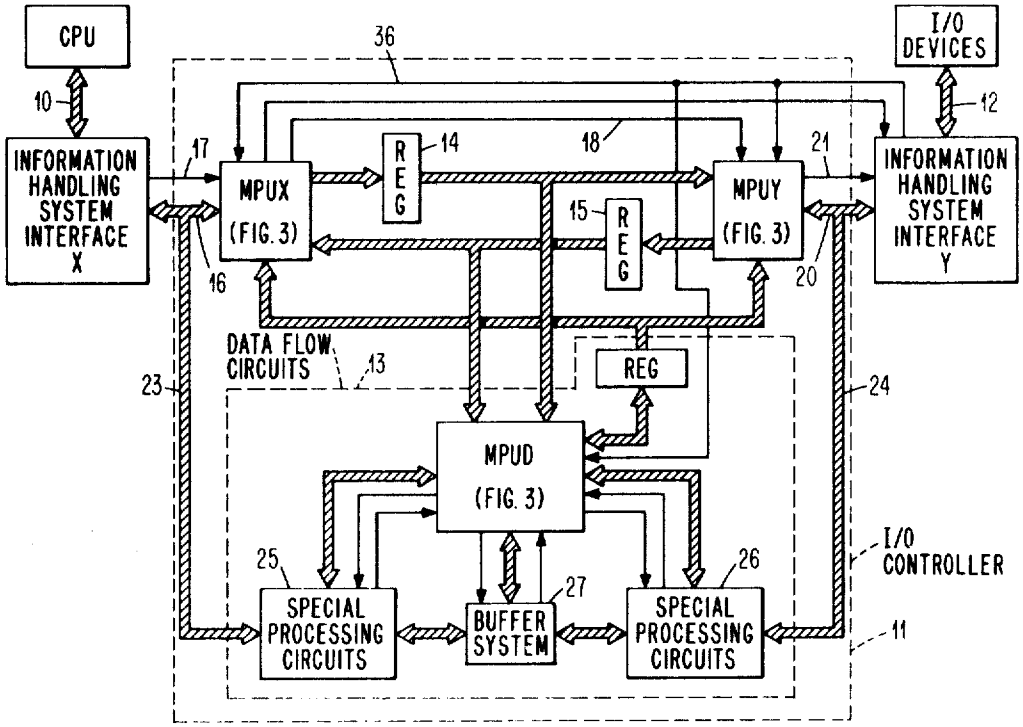
FIG. 1 is a simplified block diagram of a general arrangement of one I/O controller constructed in accordance with the present invention.
Figure 3:
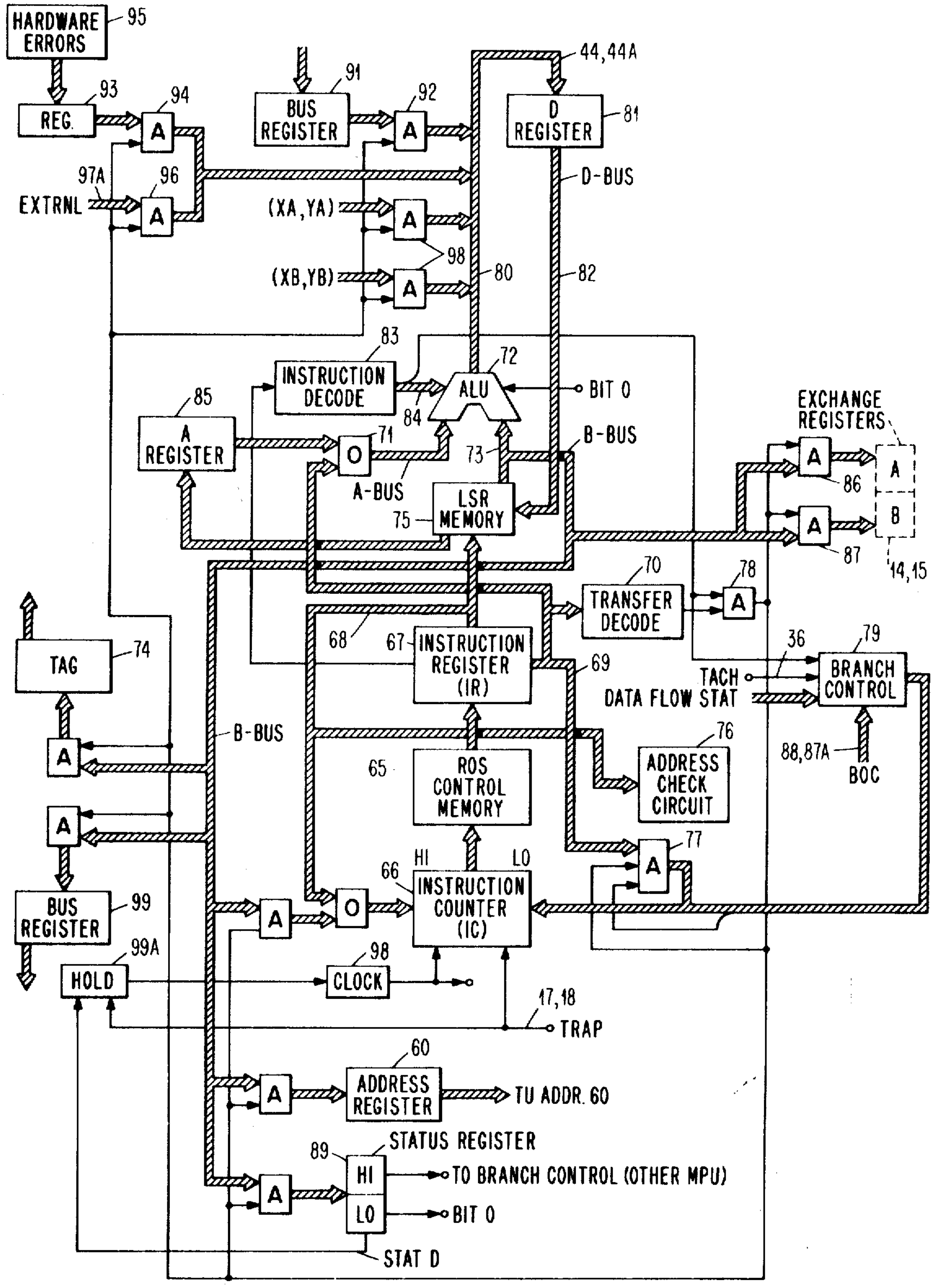
FIG. 3 is a simplified block diagram of an MPU usable with the FIGS. 1 or 2 illustrated I/O controllers.

The described I/O controller is particularly useful with the type of channel described in the Moyer et al. U.S. Pat. No. 3,303,476. The description assumes a channel-I/O controller interface usable with a channel of the type described in that patent. FIGS. 1 and 3 of that patent describe all tag signals used herein except SUPPRESSIBLE REQUEST IN which is defined with respect to MPUX (channel MPU) microprograms. It also assumes that the interface between the controller and the I/O devices follows a similar bus-out, bus-in, tag line arrangement. In addition to the functions described in the Moyer et al. patent supra, a tachometer input line is provided to the system as later described.

With more particular reference now to the appended drawings, like numerals indicate like parts and structural features in the various diagrams. Information handling systems (IHS) interface X (INTFX) is the interface described in the Moyer et al. patent.

INTFX communicates with a CPU via cable 10. I/O controller 11, which illustrates the present invention, provides control for exchanging information-bearing signals between INTFX and interface Y (INTFY). INTFY is connected to one or more I/O devices via cable 12. Such I/O devices, for purposes of illustration only, are magnetic tape units capable of recording and reproducing information-bearing signals in phase-encoding (PE) and NRZI schemes.

I/O controller 11 has three main sections. MPUX is a microprogrammable unit providing synchronization and control functions between the I/O controller and INTFX. MPUY performs similar functions with INFTY. In a magnetic tape subsystem, MPUY provides motion control and other operational related functions uniquely associated with the described I/O device. With other I/O devices, MPUY performs other functions—such as in a printer, a format arrangement control would be programmed into MPUY. The third section is data flow circuits 13, which actually processes information-bearing signals between interfaces X and Y. Data flow circuits 13 may consist of entirely a hardware set of sequences and circuits for performing information-bearing signal exchange operations. In an I/O controller associated with a magnetic-tape recording system, such data flow circuits include writing circuits for both PE and NRZI, readback circuits for both encoding schemes, deskewing operations, certain diagnostic functions and some logging operations associated with operating a magnetic tape subsystem.

Since MPUX and MPUY are independently operable, each having its own programs of micro-instructions, program synchronization and coordination is required. To this end, exchange register networks are provided. Each MPUY has its own output exchange registers, for example, MPUX has exchange registers 14 while MPUY has exchange registers 15. These registers receive output signals from the respective MPU's. The signals temporarily stored in these registers are supplied directly to data flow circuits 13 for effecting and supervising data flow and signal processing operations. This arrangement makes the data flow circuits 13 subservient to both MPUX and MPUY. Additionally, such signals are simultaneously provided to the other MPU—that is, register 15 supplies MPUY output signals to MPUX and register 14 supplies the MPUX output signals to MPUY. The respective MPU's under microprogram control selectively receive such signals for program coordination.

INTFX is a controlling interface. It not only exchanges control signals with MPUX over cable 16, but also has trap control line 17. When this line is actuated, MPUX aborts all present operations and branches to a fixed address for analyzing signals on cable 16. These signals simultaneously supplied over cable 16 force MPUX to perform INTFX selected functions. In a similar manner, MPUX has trap control line 18 extending to MPUY. MPUY responds to an actuating signal on line 18 from MPUX in the same manner that MPUX responds to a trap signal on line 17. MPUY, in addition to exchanging control signals over cable 20, with devices via INTFY, also has a trap line 21 for controlling an I/O device in a similar manner.

All information-bearing signals are exchanged between interfaces X and Y through data flow circuits 13 via full-duplex cables 23 and 24. In FIG. 1, data flow circuits 13 are shown as including a third MPU, MPUD, which has intimate control over special processing circuits 25 and 26 as well as buffer system 27. These special processing circuits are hardware sequences which transform signal formats from the respective interfaces to an intermediate format usable in buffer system 27. Merely by replacing circuits 25 or 26, the I/O controller can operate with a plurality of different signal formats. The micro-routines used in MPUD may also be required to be changed. Of course, micro-routines in MPUY might have to be changed if different forms of I/O devices were selected. For example, if a communication system, such as a television cable, were substituted for the magnetic tape system described in this specification, radically different micro-routines would be required.

Figure 2:
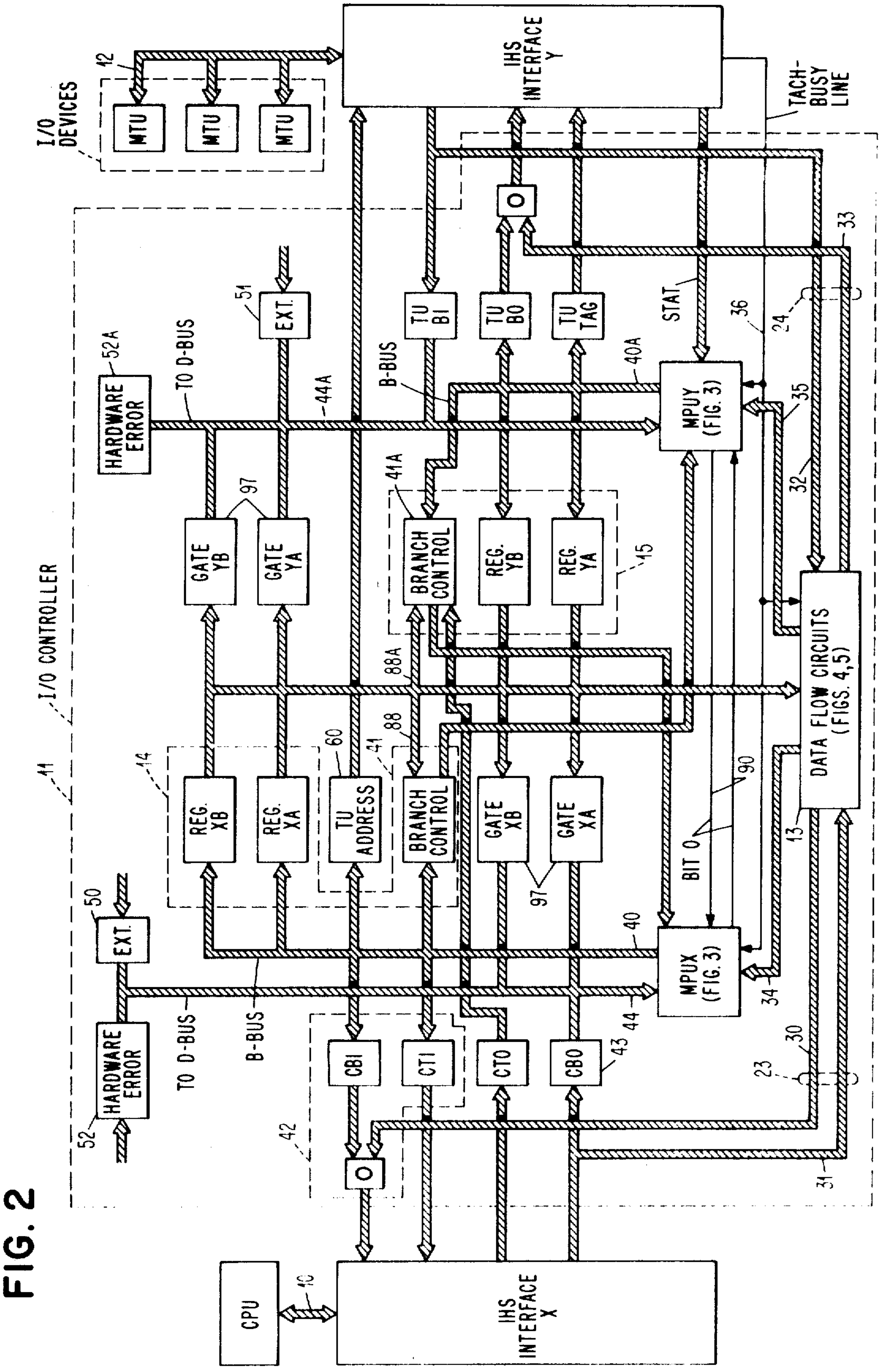
FIG. 2 is an intermediate but simplified block diagram of an I/O controller using the present invention and having two microprogrammable units (MPU's), each having a single ALU of limited capability.

FIG. 2 is a slightly more detailed yet simplified diagram of an I/O controller constructed in accordance with the teachings of the present invention. The controller uses hardware-sequenced data flow circuits 13. INTFX is the data channel described in the Moyer et al. patent supra. Instead of one data channel, two parallel data channels A and B (not shown) are used. Such arrangements are well known. Data flow circuits 13 have channel bus-in (CBI) lines 30 and channel bus-out (CBO) lines 31 connectable to either channel A or B. Each set of lines has a capability of transferring one byte of data plus parity. Similarly, tape unit bus-in (TUBI) lines 32 transfer signals to data flow circuits 13 and MPUY over INTFY. Tape unit bus-out (TUBO) lines 33 carry information-bearing signals for recording in MPU's plus commands from MPUY and MTU addresses from MPUX. Status signals are supplied both to MPUX AND MPUY over status cables 34 and 35. Velocity of tachometer signals supplied by the selected and actuated MTU are received over line 36 by MPUX, MPUY, and data flow circuits 13.

MPUX has output bus 40 (also termed B-bus) supplying signals to its exchange registers 14. These include branch control register 41, register XA, and register XB. Output bus 40 is also connected to the channel exchanging registers 42. These registers are CTI and CBI. CBI is channel bus-in, while CTI is channel tag-in. CTI transfers the tag signals described in Moyer et al. patent and other control signals for interface operations.

Additionally, channel bus-out (CBO) gate 43 receives bytes of data from INTFX for data flow circuits 13 and for MPUX. Gates XA and XB similarly gate exchange signals from the MPUY exchange registers 15. Gates XA receives the control signals from register YA while gates XB receives exchange signals from register XB. CBI register is shared by MPUX and data flow circuits 13. The CBI lines over INTFX are multiplexed in accordance with the Moyer et al. patent. CTI supplies tags indicating what the bus-in signals mean.

INTFY operates in an identical manner. Signals in TUBO (tape unit bus out) register output lines 33 are interpreted by the MTU's in accordance with the signals in TUTAG (tape unit tag) register.

External signals are supplied to MPUX and MPUY via external registers 50 and 51, respectively. Such external signals may be from another I/O controller, from a maintenance panel, communication network, and the like. Also, hardware detected errors are lodged in register 52 for sampling by MPUX.

I/O controller 11 has an efficient initial selection process. MPUX responds to INTFX request for service of an MTU to provide the MTU address over output line 40 into TU address register 60. INTFY transfers the TU address to all MTU's. The appropriately addressed MTU responds to MPUY that the selection is permissable or not permissable. If permissable, a connection is made; MPUY notifies MPUX via register YA.

MPUX then completes the initial selection by responding to INTFX via CTI. Data processing operations then can ensue. A detailed description of this initial selection procedure is included for clearly showing the relationships between MPUX, MPUY, data flow circuits 13, and the two interfaces X and Y.

MICROPROGRAMMABLE UNITS (MPU'S)

The MPU's contain microprograms which determine the logic of operation of I/O controller 11. MPUX contains a set of microprograms in its control memory designed to provide responsiveness and data transfers with INTFX. In a similar manner, MPUY contains a set of microprograms for operation through INTFY with the various MTU's. Registers 14 and 15 contain signals from the respective microprograms which serve as inputs to the respective programs for coordinating and synchronizing execution of various functions being performed. MPUD, when used in data flow circuits 13, contains another set of microprograms designed for transferring data signals between the two interfaces for effecting data processing operations under the joint supervision of MPUX and MPUY. A better understanding of how the microprograms operate the hardware is attained by first understanding the logic construction of the MPU's which, in the illustrative embodiment, are constructed in an identical manner.

Referring more particularly to FIG. 3, the MPU usable in I/O controller 11 is described in a simplified block diagram form. The microprograms are contained in read-only store (ROS) control memory 65. While a writable store could be used, for cost-reduction purposes, it is desired to use a ROS type of memory. The construction and accessing of such memories are well known. The ROS output signal word, which is the instruction word, is located by the contents of instruction counter (IC) 66. IC 66 may be incremented or decremented for each cycle of operation of MPU. By inserting a new set of numbers in IC 66, an instruction branch operation is effected. The instruction word from ROS 65 is supplied to instruction register (IR) 67 which staticizes the signals for about one cycle of operation. The staticized signals are supplied over cables 68 and 69 to various units in MPU. Cable 68 carries signals representative of control portions of the instruction word, such as the operation code and the like. Signals in cable 68 are supplied to IC 66 for effecting branching and instruction address modifications. Cable 69, on the other hand, carries signals representative of data addresses. These are supplied to transfer decode circuits 70 which respond to the signals for controlling various transfer gates within MPU. The other portions of the signals are supplied through OR circuit 71 to ALU 72. In ALU 72, such signals may be merged or arithmetically combined with signals received over B-bus 73 for indexing or other data processing operations. MPU has local store register memory (LSR) 75 accessible in accordance with the address signals carried over cable 68. Address check circuit 76 verifies parity in the address. The address signals may also be used in branch operations. AND circuits 77 are responsive to transfer decode signals supplied from circuits 70 through AND circuits 78 to transfer the address signals in an instruction word to IC 66. Such transfer may be under direct control of the operation portion of the instruction word as determined by transfer decode circuits 70 or may be a branch on condition (BOC) as determined by branch control circuits 79 which selectively open AND circuits 77 in accordance with the conditions supplied thereto, as will become apparent.

The data flow and arithmetic processing properties of the MPU center around ALU 72. ALU 72 has two inputs—the A-bus from OR circuit 71 and B-bus 73. ALU 72 supplies output signals over cable 80 to D register 81. D register 81 supplies staticized signals over D-bus 82 to LSR 75. Instruction decode circuits 83 receive operation codes from IR 67 and supply decoded control signals over cable 84 to ALU 72 and to AND circuit 78 for selectively transferring signals within MPU.

ALU 72 has a limited repertoire of operations. Instruction decode 83 decodes four bits from the instruction word to provide 16 possible operations. These operations are set forth in the Instruction Word List below:

INSTRUCTION WORD LIST

| OP Code | Mnemonic | Function |
|---|---|---|
| 0 | STO | Store Constant in LSR, A set to 0 |
| 1 | STOH | Store Constant in LSR, Indexed Addressing |
| 2 | BCL | Match with Field 1, Branch to Addr in Field 2 |
| 3 | BCH | Match with Field 1, Branch to Addr in Field 2 |
| 4 | XFR | Contents of one selected LSR location is transferred to selected register or selected input is gated to one selected LSR location |
| 5 | XFRH | See XFR above plus indexed addressing |
| 6 | BU | Branch to 12-bit ROS address in instruction word |
| 7 | 00 | Not used — illegal code |
| 8 | ORI | A OR'd with B, result stored in LSR 75 |
| 9 | ORM | A OR'd with B, result not stored |
| A | ADD | A plus B, sum stored in LSR 75 |
| B | ADDM | A plus B, sum not stored |
| C | AND | A ANDed with B, result to LSR 75 |
| D | ANDM | A ANDed with B, result not stored |
| E | XO | A Exclusive OR B, result to LSR 75 |
| F | XOM | A Exclusive OR B, result not stored |

In the above list, the letter "A" means A register 85, "B" is the B-bus, and the mnemonics are for programming purposes. The term "selected input" indicates one of the hardware input gates (92, 94, 96, 98) to the ALU output bus 80. The term "selected register" indicates one of the "hardware" registers in MPU. These include the interconnect registers 14 and 15 (FIG. 2), tag register 74, bus register 99, address register 60, and IC 66. Note that transfers from LSR 75 to these selected registers is via B-bus 73. In FIG. 2, the B-bus for MPUX corresponds to cable 40, while the MPUY B-bus is cable 40A. Registers 14 receive signals via AND circuits 86 and 87. In MPUY, AND circuits 86 and 87 supply signals to exchange registers 15. Branch control 79 in FIG. 3 is the internal branch control. Branch controls 41 and 41A of FIG. 2 supply their signals respectively over cables 88 and 87A to the respective MPU's. These branch controls are separate circuits. Tag register 74 in FIG. 3 for MPUX corresponds to CTI register in the channel exchange registers 42. For MPUY, it corresponds to TUTAG register connected to INTFY. In a similar manner, bus register 91 in MPUX is register CBI in channel exchanging registers 42, while in MPUY it is register TUBO (tape unit bus out). Address register 60 of FIG. 3 corresponds to TU address register 60 of FIG. 2. MPUY address register 60 is not used.

Status register 89 has several output connections from the respective MPU's. It is divided into a high- and low-order portion. The high-order portion has STAT (status) bits 0–3, while the low-order portion has STAT bit 0 plus STAT bits 4–7 (referred to as STAT A through STAT D, respectively). The low-order portion is supplied to the branch control 79 of the other MPU's. The bits 0 and 4–7 are supplied to the data flow.

Bit 7 additionally is supplied directly to the ALU 72 of the MPUY as indicated by lines 90 in FIG. 2. This corresponds to a self-trapping operation which will be later described. Interpretation of the STAT bits is mircoprogram determined.

The signal-receiving portions of each MPU are in four categories. First, bus register 91 is designed to receive tags and data bytes for MPUX—this corresponds to CBO register 43 of FIG. 2. An MPUY bus register 91 is TUBI (tape unit bus in) register. AND circuits 92 are responsive to the transfer decode signals from circuits 70 to selectively gate bus register 91 to D register 81. From thence, the data bytes are supplied to LSR 75. Secondly, D register 81 also receives inputs from hardware error register 93 via AND circuit 94. Hardware error signals (parity errors, etc.) are generated in circuit 95 in accordance with known techniques. Thirdly, AND circuits 96 receive external data signals over cable 97A for supplying same to D register 81 under microprogram control. Fourthly, interchange registers 14 and 15 respectively supply signals to pairs of AND circuits 98 which selectively gate the interchange signals to D register 81 under microprogram control. The receiving microprogram controls the reception of interchange signals from the other MPU.

Generally, the outgoing signals from each MPU are supplied via B-bus 73; also a main input bus to ALU 72. The signal-receiving bus is the D-bus, which is the input bus for LSR 75 and the output bus for ALU 72.

Since ALU 72 has a limited repertoire of operations, many of the operations performed are simple transfer operations without arithmetic functions being performed. For example, for OP code 4, which is a transfer instruction, the contents of the addressed LSR is transferred to a selected register. This selected register may be A register 85 in addition to the output registers. To add two numbers together in ALU 72, a transfer is first made to A register 85. The next addressed LSR is supplied to the B-bus and added to the A register contents with the result being stored in D register 81. At the completion of the ADD cycle, the contents or result of D register 81 is stored in LSR 75. If it is desired to output the results of the arithmetic operation, then another cycle is used to transfer the results from LSR 75 over B-bus 73 to a selected output register, such as one of the interchange registers or bus register 87.

In FIG. 3, the input to D register 81 is either cable 44 or 44A of FIG. 2. Hardware error circuit 95 and error register 93 of FIG. 3 correspond both to the hardware error circuits 52 and 52A of FIG. 2. External cables 97A receive signals from the external registers 50 an 51 respectively for the two MPU's.

It is understood that MPUD has a similar set of exchanging registers respectively with both MPUX and MPUY.

AND circuits 98 of FIG. 3 correspond to the gates XA, XB, YA, and YB of FIG. 2.

Each MPU is trapped to a predetermined routine by a signal on trap line 17 or 18, respectively. The trap signal forces IC 66 to all zeroes. At ROS address 000, the instruction word initiates X-trap routine (FIG. 15) or Y-trap routine (FIG. 25). For reliability purposes, it is desirable to force MPUY to inactivity. This means that clock oscillator 98 is gated to an inactive state. During normal operations, clock 98 supplies timing pulses to advance IC 66 and coordinate operations of the various MPU's as is well known. Whenever MPUY has finished its operations, it sets Stat D in register 89. Stat D indicates MPUY has finished its operations as requested by MPUX. The Stat D signal sets hold latch 99A indicating that MPUY is inactive. Hold latch 99A gates clock 98 to the inactive condition. When MPUX traps MPUY, not only is IC 66 preset to all zeroes, but hold latch 99A is reset. Clock 98 is then enabled for operating MPUY. For design choice reasons, MPUX is not inactivated in this manner. MPUX has an idling routine which is later explained.

Examination of the MPU's shows that the computing capability is substantially less than that required for performing all I/O controller functions referred to in the microprogram description. Duplication of hardware is useful to reduce manufacturing costs.

DATA FLOW CIRCUITS 13

Figure 4:
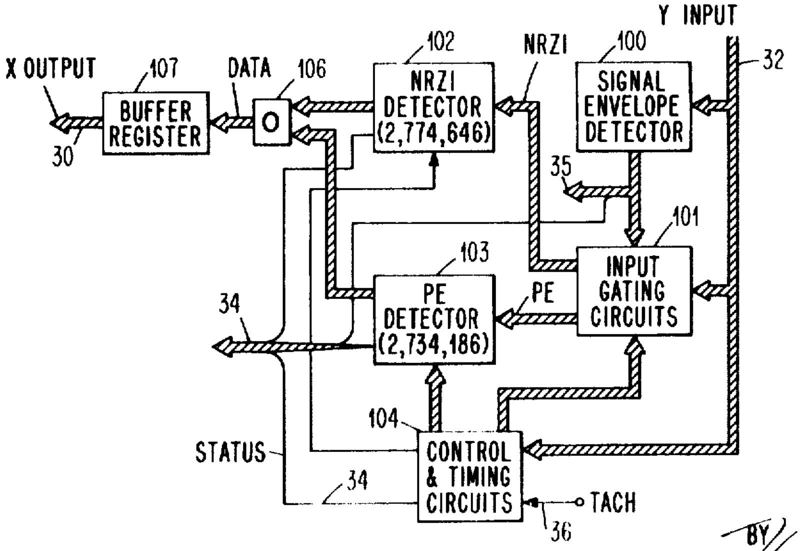
FIG. 4 is a simplified data flow diagram illustrating transfer of signals from an I/O device to a channel.
Figure 5:
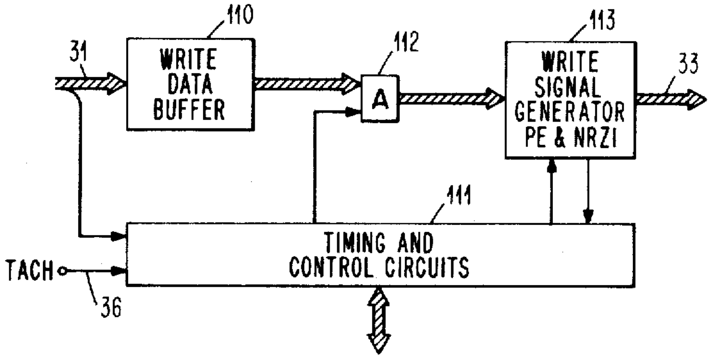
FIG. 5 is a simplified data flow diagram illustrating data flow from a channel to an I/O device.
Figure 6:
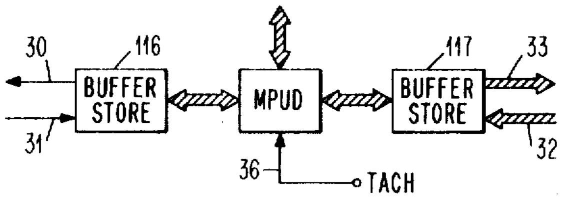
FIG. 6 is a simplified block diagram showing data flow arrangement utilizing a simple MPU having a single ALU.

The hardware-designed data flow circuits 13 are shown in full logic form in FIGS. 4 and 5, while FIG. 6 is a simplified diagram of an MPUY-controlled data flow circuit.

In FIG. 4, data signals are received over cable 32 before conversion of the data signals from a tape-format form to INTFX form. Signal envelope detection circuit 100 verifies that signals are repetitively received over cable 32. Upon detection of an envelope, appropriate signals are supplied over cable 35 to MPUY. Also, input-gating circuits 101 receive an actuating signal enabling the input signals to be passed to one of the detection circuits 102 or 103. The format of the signals in input cable 32 indicates whether the tape format is PE (phase encoded) or NRZI (nonreturn to zero-IBM). These two recording schemes are respectively shown in U.S. Pats. Nos. 2,734,186 and 2,774,646. Control and timing circuits 104 are responsive to a burst of ones, commonly referred to as a preamble or postamble, for indicating that a PE signal is being received. RECEIVED. A latch (not shown) is set, and the control signals are supplied to input gating circuits 101 to direct the signals to PE detection circuits 103. Such circuits may take one of several forms which is not pertinent to the practice of the present invention. On the other hand, if control circuits 104 detect NRZI, then the input signals are directed to detector 102. The outputs of detectors 102 and 103 are in the same format and are supplied through OR circuit 106 to buffer register 107. From thence, the signals are supplied over cable 30 as shown in FIG. 2.

Upon detection of each byte of data, which may include deskewing operations, control signals are supplied over cable 34 to MPUX for coordination with INTFX. Additionally, status signals from control and timing circuits 104 indicate to MPUX and MPUY whether NRZI or PE signals are being detected. Detectors 102 and 103 may be adaptive—that is, their operation may vary with the velocity of the tape in the various MTU's. In PE detector 103, the self-clocking characteristics of PE may be sufficient to track frequency variations of the input signal. In NRZI detector 102, tachometer signals received over line 36 are used to vary the length of the gate—that is, in NRZI detection, the first-occurring transition in a byte turns on a timer having a predetermined time-out period. Any signals occurring in that time-out period are defined as being in the byte associated with the leading bit. As the tape velocity varies, the byte-period duration varies. The tachometer signals on line 36 alter the time-out period such that the period varies in accordance with tape velocity variations.

Signal envelope detection circuit 100 also supplies control signals over cable 33 indicating that the detection threshold in the various MTU's should be changed. For example, if there is a track in error (TIE), the threshold in that particular track should be raised. MPUY additionally controls threshold level through control signals placed in the TUBO register to OR with signals over cable 33. MPUY can therefore selectively modify or override threshold signals from the signal envelope detection circuit.

Write data flow is shown in FIG. 5. The signals to be recorded by the various MTU's are received over cable 31 and stored temporarily in write data buffer register 110. Note there is no input gating such that write data buffer 110 must receive all the signals supplied by INTFX. When such a signal is applied, MPUX actuates timing and control circuits 111 to activate AND circuit 112 in timed relationship with the write signal generation circuits 113. Write signal generation circuits are those normally used for generating PE or NRZI signals, as is well known. The digital generated signals are supplied over cable 33 to the addressed MTU. Tachometer signals received over line 36 may be used to provide automatic density control of the write signals such that there is a constant density recorded on tape.

In FIG. 6, MPUD is connected respectively to interfaces X and Y via cables 30–33 through buffer stores 116 and 117. Tachometer signals received over line 36 are supplied to a branch control circuit in MPUD for controlling density recording during a write operation. Microprograms in MPUD for a read data flow includes microprogrammed timing subroutines which meter the one-half wave lengths of the input signals. The one-half wave length durations are then used in an analytical program for determining whether PE or NRZI is being received. Once this has been set up, the program branches to a NRZI or PE detection routine. The NRZI routine includes a time-out microprogrammed routine which performs in the same manner as the time-out circuitry of NRZI detector 102. In a similar manner, time-out subroutines are used in the PE detector which effectively meter the duration of the one-half wave lengths of the PE and use the information derived therefrom for ascertaining the data content of the PE signal. In FIG. 6, no special processing circuits are provided for MPUD—all of the special processing being performed by programming techniques.

If the arrangement of FIG. 1 for MPUD is used, special processing circuits 26 correspond to detectors 102, 103, and signal generation circuits 113.

Special processing circuits 25 merely are the buffer registers shown in FIGS. 4 and 5. In the event that INTFX had special formats, circuits 25 convert the detected signals to the appropriate signal formatting.

MICROPROGRAMMING GENERALLY

Figure 7:
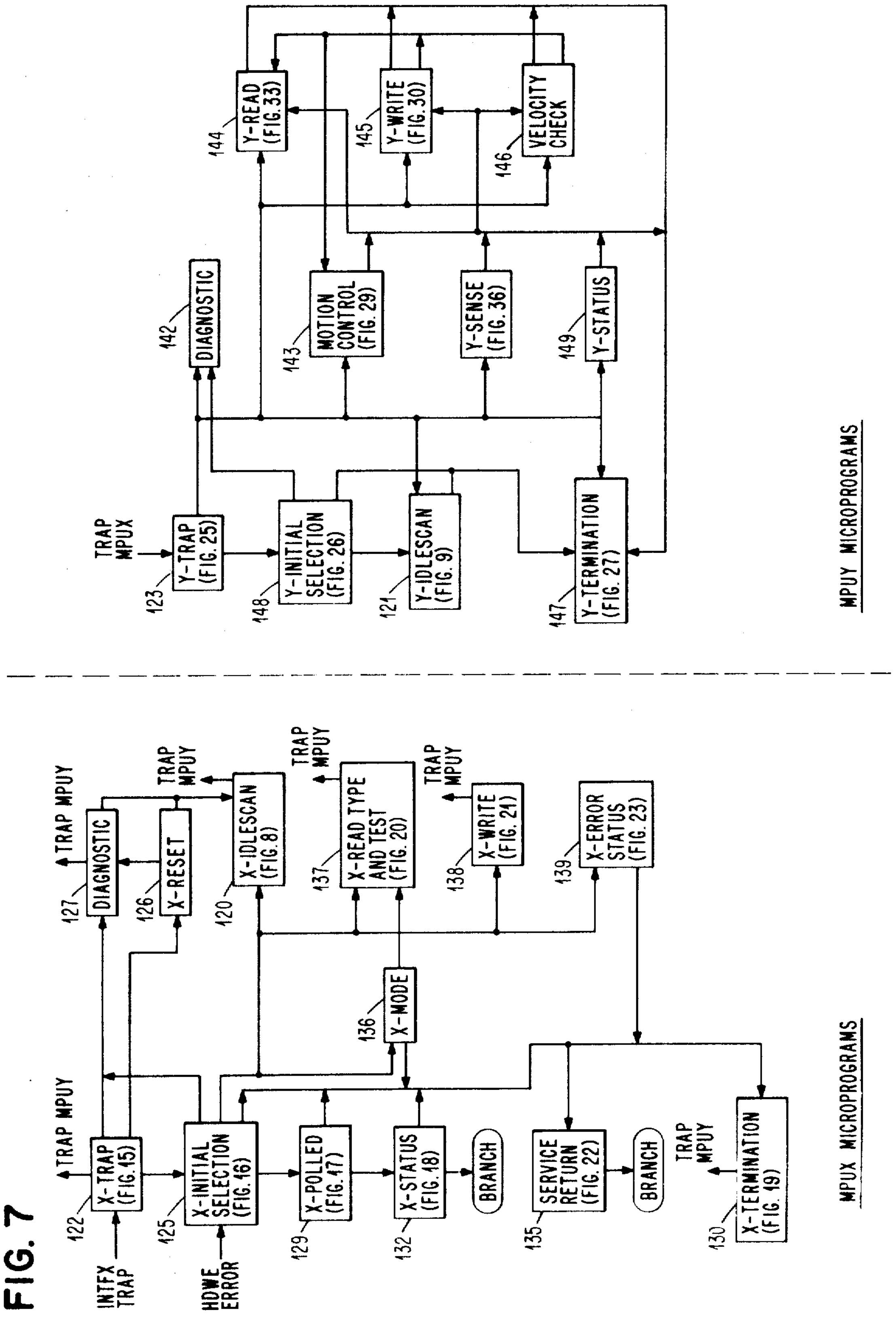
FIG. 7 is a simplified program diagram for MPUX and MPUY.

FIG. 7 shows general relationships between the micro-routines of MPUX and MPUY. This showing is greatly simplified to give a general impression of how the micro-routines cooperate to perform I/O controller functions. Many of the functions performed by these micro-routines have been performed before in other I/O controllers, usually by hardware sequences. Correlation of selected microprogram routines with previous hardware routines are set forth in some of the detailed description following this section. Some micro-routines of lesser importance to the present invention have been omitted for clarity. The described routines were selected to illustrate the operating relationships of MPUX, MPUY, and data flow circuits 13.

X idlescan 120 and Y idlescan 121 monitor pending status, interrupt status, and provide inter-communication between the two MPU's for ascertaining the availability of devices connected to INTFY. X idlescan 120 includes trapping MPUY via Y idlescan 121 for polling INTFY to determine availability of an MTU addressed by INTFX. Included in X idlescan is a wait routine which idles MPUX until trapped by INTFX. INTFX traps MPUX to ROS 65 address 000. At MPUX ROS address 000, X-trap 122 begins. During the execution of X-trap routine 122, MPUY is trapped to ROS address 000 to later execute Y-trap routine 123. In X-trap 122, CTO is sensed for initial selection. If the initial selection tag is active, X-trap routine branches the microprogram to X-initial selection 125. If there is no initial selection, then either X-reset 126 or an ALU diagnostic within diagnostic 127 is performed. Upon completion of these functions, X idlescan 120 may be re-entered to complete MTU scanning operations. Initial selection 125 is responsive to certain hardware errors received over line 128 (sensed as described with respect to FIG. 3) to stop I/O controller 11 for indicating detected hardware errors. A primary function of initial selection 125 is interrupt processing, as described later with respect to FIGS. 8 et seq.

During an initial selection, X-polled 129 is entered to further identity the INTFX request. Also, certain branch conditions are set up in LSR for use later by X-termination 130. MTU address verification may be performed. Upon completion of the branch setups, the X-polled 129 initiates X-status 132. X-status 132 activates CTI to send tag signals to INTFX indicating controller status in response to the previously received INTFX request. Based upon the branching set up in X-polled 129, the microprogram execution may follow several routes. These primarily end up in X-termination 130 which terminates the MPUX operation. MPUX then scans for further interrupts. With all scanning completed, MPUX waits for further instructions from INTFX.

Another important routine is service return (SERVRTN) 135 used in conjunction with INTFX for timing and control purposes during data transfers. The operation of the above-referred-to data channel operation in Moyer et al. is implemented by service return 135. Another possible routine entered from initial selection 125 is X mode 136, which determines the mode of operation in the controller in response to INTFX CMDO (Command Out) signals. X-read type and test 137 is entered in the event the initial selection results in a read operation. X-read type and test 137 traps MPUY to predetermined addresses, as later explained, for initializing a read operation in MPUY. In a similar manner, X write 138 is entered and also traps MPUY to another subroutine for initializing a write operation. Error status 139 transfers error information through INTFX to CPU. This routine is closely associated with initializing I/O controller 11 for read or write. Sense 140 is entered in response to a sense command. Sensing transfers sense bytes to CPU for analysis. X-termination 130 also traps MPUY in connection with the selecting activated MTU's and for performing other functions in connection with terminating an operation previously initiated through INTFX as will be described. MPUY micro-routines respond to MPUX micro-routines for controlling various MTU's via INTFY. These micro-routines also transfer information control signals from INTFY to MPUX for retransmittal to INTFX. Upon being trapped by MPUX, Y-trap 123 obtains an MPUY ROS address from XB register and then branches to that address. Such ROS addresses are the first instruction address of several MPUY micro-programs. For example, one address initiates diagnostic 142. Diagnostic 142 initiates motion control activity in motion control 143, reading activity in Y-read 144, writing activity in Y-write 145, velocity analysis in velocity 146, or termination in Y-termination 147. Diagnostic 142 may also perform internal diagnostic functions such as ALU operation checking. On the other hand, Y-trap routine 123 may branch to Y-initial selection 148 to initialize MPUY for activity set forth in additional control signals from MPUX in registers 14. This may include an initiation of status 149, termination 147, or Y-idlescan 121. The MTU operating routines 143–146 may also be initiated from initial selection 148. As will become apparent, in addition to exchanging control signals via registers 14 and 15, status information is freely exchanged between the two MPU's for microprogram coordination.

In the following detailed description, the idlescan routines are first discussed in detail. This discussion shows some of the inter-relationships between the two MPU's and the micro-routines. It is also useful to show how control information is transferred from MPUX via registers 14 to MPUY, as well as exchange of status information via status registers 89 in the MPU's. Then, the MPUX microprograms are described in simplified form to show what function MPUX performs in I/O controller 11. Discussion of MPUX and MPUY sense shows transfer of signals from MPUY to MPUX via registers 15. This discussion is followed by a similar discussion of MPUY microprograms. Finally, a discussion on the relationship of data flow circuits 13 responsiveness to the microprograms completes the description.

INTERRUPT SCANNING

IDLESCAN MICROPROGRAMS—MPUX AND MPUY

FIGS. 8 and 9 respectively show in intermediate flow-diagram form X- and Y-idlescan micro-programs. Portions of these programs scan for interrupts from INTFX and verify the accessability of MTU's; whether or not a previous INTFX request had been received and supply status information to INTFX for subsequent action. FIGS. 10–14 a more detailed diagrams showing the functions performed during interrupt scanning. This is referred to as DEPRIME, which means DEVICE END PRIME. When a MTU has finished its function, it supplies a NOT BUSY signal. MPUY scans some LSR registers called DEPRIMES in which action requests (PRIMES) from INTFX are stored. Upon receipt of a DEVICE END scan request from MPUX, Y-idlescan 121 checks these LSR registers for PRIMES. Upon detection of a PRIME, the associated MTU is checked for presence of the NOT BUSY signal. If present, the information is supplied to MPUX for forwarding to INTFX. A comparable hardware sequence version of this same function is fully described in U.S. Pat. No. 3,404,376. The design of the present I/O controller enables a microprogram performance of this function. The microprogrammed version reduces costs by enabling time sharing hardware among various functions.

Upon initial start up, i.e., depression of a start button, all status in the I/O controller is cleared. MPUX is hardware trapped and proceeds to execute a MPUX checkout routine (not shown). MPUY is released from trapped status to execute its MPUY checkout routine (not shown). Upon successful completion (no errors) of both routines (not shown) MPUY is again hardware trapped and MPUX enters IDLESCAN.

Upon a trap by INTFX, X-trap 122 and initial selection 125 are entered. Then, idlescan 120 is entered for checking pending status and determining interrupt status. The term "idlescan" is the code name for entering checking pending status 152. This subroutine is not shown in further detail. The functions performed are easily microprogrammable. Such functions include initially resetting control unit busy (CUB) flag for INTFX. This means that the micro-program determines the busy/not-busy status of I/O controller 11. Such action includes checking for stacked requests, queues, reserved pending status of I/O controller 11, chained, and conditional connection conditions. If there is pending status, termination 130 is entered as more fully explained with particular reference to FIG. 19. If I/O controller 11 is in a chained condition, then the wait-for-selection routine 150 is re-entered until INTFX issues the next chained command. (Chaining dedicates a MTU to a predetermined sequence of operations under INTFX control which cannot be interrupted.) Next, whether or not a conditional connection has been made to INTFX is determined. If so, i.e., the connection is conditioned on ability to perform the function requested, it must wait until INTFX has determined whether or not it wants the subsystem including a MTU to perform a given function. A conditional connection occurs when I/O controller 11 supplies an indication of an equipment failure or the like. If none of the above conditions are detected, a pending status register in LSR is cleared.

In some peripheral subsystems, INTFX actually may consist of more than one data channel. Such an arrangement is called MIS (multiple interface switch). Such a switch usually has two data channels, A and B. By arbitrary definition, channel A has priority in requesting service over channel B. When such a feature is included in INTFX, check pending status 152 senses for outstanding requests from both channels and also senses priority. STAT B active indicates channel B and when inactive indicates channel A. Any status detected is set forth either in LSR of MPUX or in status register bit A, which is the internal BOC (Branch on Condition). If check pending status 152 ascertains there is no pending status and the controller is not chained, previously received interrupt requests for an MTU that were busy are scanned. These are termed DEVICE END PRIMES (DEPRIMES). Such scanning is fully described in U.S. Pat. No. 3,404,376.

Scanning DEPRIMES requires micro-routines in both MPUX and MPUY. The DEPRIMES are stored in LSR of MPUY in four LSR registers as tabled below:

TABLE I

DEPRIMES MAPPING —LSR IN MPUY

| LSR Byte Address | Channel | INTFY MTU Addresses |
|---|---|---|
| 111 | A | 0–7 |
| 112 | A | 8–15 |
| 113 | B | 0–7 |
| 114 | B | 8–15 |

In the above table, I/O controller 11 has the capability of communicating through channels A and B of INTFX and MTU 0–15 of INTFY. Any MTU is connectable to either channel A or B via I/O controller 11. LSR byte addresses 0111–0114 are arbitrarily selected. Each MTU has one bit position in the respective LSR byte registers. Each bit position corresponds to the latch used in U.S. Pat. No. 3,404,376. The micro-routines scan LSR looking for ones (PRIMES) in the bit positions. Upon detection of a one, INTFY is interrogated to determine the busy/not-busy status of the respective MTU. INTFY replies via MPUY indicating whether or not MTU is available. If there has been a DEVICE END received from the addressed MTU, an effective connection is made from INTFX to INTFY for transferring data signals between CPU and the addressed MTU. If the MTU is busy, the scan proceeds until a PRIME is found or the scan completed. No PRIMES in LSR bytes 111–114 indicate there are no outstanding requests. Therefore, upon completion of a scan with no PRIMES, IDLEPEND 150 is entered to wait for further INTFX action.

In FIG. 8, upon completion of check pending status 152, four subroutines for interrupt scanning are serially entered. The first is X-DEPRIME 154. This subroutine sets up MPUX for interrupt scanning and traps MPUY to EXEXDEP in Y-DEPRIME 155 (FIG. 9). MPUY subroutine 155, explained in detail later with respect to FIG. 11, scans its LSR byte registers 111–114 as set forth in Table I. Upon a hit, the MTU address is supplied to its interchange register YA: and the B bit of its Stat register 89 is set. MPUX, upon detection of stat-B active, fetches the device address via YA gate 97 (FIG. 2). Scanning requires that MPUX set its stat-C bit to indicate that an MTU is being selected. MPUY, upon sensing MPUY Stat C, enters check MPUY status 156. This subroutine not only fetches the MTU address, but also checks various status bits, errors, and stores the status in its own LSR. The MTU address is verified in subroutine 157.

After address verification, MPUX enters X-poll INTFY 158. Subroutine 158 traps MPUY to EXECPOLL in Y-poll INTFY 160. In subroutine 160, MPUY POLLS INTFY for its activity and status. As soon as INTFY is detected as being active, i.e., the selected MTU has responded, the scanning sequence is returned to MPUX indicating that INTFY has been polled (MPUY Stat C is active). MPUX then responds by setting the device status in its own LSR and supplying control signals to INTFX entitled "SUPPRESSIBLE REQUEST IN" which indicate to CPU that the peripheral subsystem is available for performing the requested function. MPUX exits X-poll INTFY 158 to IDLEPEND 150. It then waits for CPU to initiate further action. MPUY exits subroutine 154 to wait MPUX via POLLMTIX as explained with respect to FIG. 11.

With particular reference now to FIGS. 10 and 11, the X-DEPRIME 154 and Y-DEPRIME 155 subroutines are described. Interrupt scan is initiated through the entry of X-DEPRIME 154 at 163. The first action is to set DEVICE END in LSR and clear MPUX status register 89 to all zeroes. This action indicates that channel A activity is being checked first and that no MTU is being selected. Then, in test step 164, MPUX determines whether or not I/O controller 11 has been previously reserved by INTFX. If it has been reserved, then in step 165, MPUX determines whether or not it is channel A or channel B. If it is channel B, Stat B is set to "1" requiring MPUY to scan channel B DEPRIMES. Otherwise, Stat B is reset indicating that channel A DEPRIMES are to be scanned. In the event that I/O controller 11 was not reserved, step 165 is bypassed.

In step 166, MPUY is trapped to Y-DEPRIME at EXECDEP 155. At this time, MPUX may enter another program returning to check MPUY status 156 at some later time. In this description, MPUX idles until MPUY has completed Y-DEPRIME 155.

Upon being trapped, MPUY enters Y-DEPRIME subroutine 155 at 170 (FIG. 11). First, MPUY determines whether channel A or channel B is to be scanned. This affects LSR addressing during the scan operation. Depending on whether channel A or B is indicated by MPUX Stat B, steps 171 or 172 are entered. These steps set MPUY to either scan A or B DEPRIMES. If there are no hits in the scan, MPUY sets Stat D (no primes found) in step 173 and waits for MPUX. When no DEPRIME is found in step 179 at a given LSR location, the microprogram indexes the scan in step 177 to the next MTU address. The scan count is also indexed. Decision step 178 compares the scan count with the number of attached MTU's. If the scan is completed, no DEPRIMES were found. Then step 173 sets stat D and MPUY waits MPUX. If the scan is not done, the next DEPRIME location is examined in step 179.

Upon detection of a DEPRIME in step 179, the MTU address is supplied to YA and stat B is set. Stat C informs MPUX that the MTU address is available in YA. MPUY at 180 then waits for MPUX to fetch the MTU address. When MPUX sets its stat C (FIG. 12, step 189), then MPUY resets its stat C for continuing Y-DEPRIME 155. As soon as MPUX sets stat C, MPUY executes step 182 to determine whether or not the addressed MTU is switched, i.e., connected to another I/O controller (not shown). If so, the addressed MTU is not available; and the scan continues via indexing step 177. When the addressed MTU is available, its sense data is fetched in step 185. Stat C is then reset. Next, in decision step 181, MPUY determines whether or not the addressed MTU is busy. If it is busy, then the scan is continued via indexing step 177. When the MTU corresponding with the sensed DEPRIME is not busy, MPUY sets Stat C in step 183 and enters Y-idlescan (FIG. 9) via POLLMTIX. In POLLMTIX (FIG. 9), MPUY waits at 186 for MPUX to set stat C (FIG. 12). MPUX has fetched MTU address from YA. As soon as MPUX stat C is sensed, MPUY clears DEPRIME in LSR and sets stat D to wait MPUX.

Returning now to MPUX, its last-described operation was step 166 (FIG. 10) wherein it trapped MPUY to perform the operations just described with respect to FIG. 11. MPUX may then enter other programs; but, eventually, it returns to the idlescan routine at 187 of FIG. 12 for checking MPUY status. First of all, in step 188, MPUX determines whether MPUY has set stat C or D, i.e., whether or not a DEPRIME has been detected or a scan has been completed. MPUX waits at 188 until one of the two MPUY stats are activated. First, assuming that stat C is set, then the MTU address must be verified. In step 189, MPUX fetches the MTU address from YA register 15. This MTU address is then transferred in step 189 to TU address register 60 (FIG. 1). Simultaneously, a tag line to MTU's (not shown) entitled "select" is activated such that every MTU examines the address in TU register 60. MPUX also sets stat C to indicate to MPUY that the MTU is being selected. Assuming that MPUY stat C remains on, in branch step 190, the micro-routine moves to step 191 wherein the MTU address is transferred to LSR. This is a memory operation such that MPUX can perform later-described operations with regard to the selection of the addressed MTU. Then the X-termination 130 is entered at TERMSTAT informing INTFX of the acquired status data and enables MPUX to wait for further instructions.

Next, assuming that MPUY stat C is off (MTU address was not in YA), stat B of MPUY is on (MTU address now in YA); then the routine is re-entered at point 192 wherein the MTU address is fetched from YA. When stats B, C, and D are all off, MPUX waits MPUY at 193 until one of the three stats is set. Assuming next that MPUY stat D is set on and stats B and C are off, further status checking is required. There may be an error. First, if there is an error, an ALU diagnostic (DIAG 127) is entered. If there is no error, it is again checked whether or not the I/O controller has been reserved by INTFX. If it has been reserved, X-polled 129 (FIG. 17) is now entered. This is done to determine whether or not the I/O controller has been polled on a reserve status. Similarly, if MPUX stat B is on, the same routine is entered. If both of these conditions are off, then MPUX sets stat B and B-interface flag (channel B active). After doing this, the routine is re-entered at point 192 until a change in status causes the micro-routine to branch to one of the other above-described destinations.

Returning now to the wait cycle 188, assume that MPUY stat D is on, i.e., no DEPRIMES have been detected. First, in step 195, MPUY error indications are checked. If there is an error, a diagnostic routine operable with the MPUY is entered. If there is no error, the reserve status of I/O controller is checked in step 196. If it is reserved, or if controller 11 is not reserved and MPUX stat B is off, then X-polled 129 shown in FIG. 13 is entered at POLLMTI. This routine will initiate polling an addressed MTU to determine its status. If the MPUY stat B is on, the A DEPRIMES have been scanned such that B DEPRIMES may now be scanned. The B-interface flag is set on, and the micro-routine returns to step 166 in FIG. 10 for trapping MPUY to scan B DEPRIMES.

X-polled 129 (FIG. 13) is performed as follows. First, in step 200, LSR registers containing motion control and status information are cleared in preparation for acquiring status data from the polling. In step 201, MPUX traps MPUY to Y-poll INTFY 160 at EXECPOLL as next explained with respect to FIG. 14.

MPUY enters Y-poll INTFY 160 via MPUX trap. First, in step 202, MPUY determines whether or not INTFY is active—that is, are there any control signals being received from any MTU. If there are not any, stat D is set in step 203; and MPUY then waits MPUX. Stat D provides communication to MPUX to ensure that it will follow the correct micro-routine. When INTFY is active, selected scratch-pad registers called "-work 1" in LSR are cleared. Stat B is then set to the active condition indicating to MPUX that INTFY is active. Then MPUY proceeds to waiting cycle 204 until MPUX sets stat C active (MPUY may proceed).

Meanwhile, MPUX had been waiting in two-step decision cycle 205 (FIG. 13) for MPUY to set either stat B or D. If stat D is set and MPUY had been trapped for determining INTFY activity, an error may have occurred in the subsystem. Accordingly, a diagnostic routine is entered. If MPUY stat B has not been reset, MPUX waits for MPUY to set stat B in step 206 in FIG. 14. MPUX then moves to raise the select line (not shown) in INTFY and resets the tape unit address register 60 to all zeroes. This initiates a scan of MTU addresses until MPUY sets stat C on, i.e., INTFY becomes active.

This scan loop includes setting stat C in step 208 causing MPUY to execute Y-scan cycle 209. Scan cycle 209 has its corresponding MPUX scanning in Y-scan cycle 210. MPUY waits at 204 until MPUX has set stat C in step 208. Then, MPUY determines in step 211 whether or not INTFY is active. If it is active, the addressed MTU is ready to go; and stat B is set in step 212. Then, the micro-routine exits the Y-polled subroutine and enters POLLMTIX of FIG. 9. If INTFY is inactive, MPUY in step 213 adds one to the index and sets stat C. Setting stat C informs MPUX that the addressed MTU was not active. Then, MPUY waits at 204 until MPUX has again set stat C.

The corresponding Y-scan cycle 210 in MPUX (FIG. 13) includes a wait cycle having steps 214, 215, and 216. Step 214 senses whether or not stat C of MPUY is on. If MPUY stat C is on, the scan is indexed by indexing TU address register 217. This advances the MTU addressing step 208. MPUX sets stat C enabling MPUY to proceed from 204 (FIG. 14). In step 215 (FIG. 13), stat B of MPUY is sensed for determining whether or not an MTU has made INTFY active. If it has, cycle 210 is exited as will be later described. Step 216 is an error-checking step. If MPUY sets stat D, no activity is indicated. This should be erroneous because of the previous activity of INTFY. In the event that it is active, a diagnostic routine is entered. In the event it is off, step 214 is re-executed; and stat C is reset.

On detection of stat B from MPUY, MPUX informs INTFX that a requested MTU is now available. In step 218, a device-in status line in CTO is activated. This informs INTFX that the MTU is available. In the same step, the MTU address is transferred from TU address register 60 to LSR for future microprogram reference. Next, MPUX determines whether or not the I/O controller is reserved. If it has been reserved, a suppressible request in (SUPP REQ IN) on CTI of the reserving channel A or B is activated. If there has been no reservation, the SUPP REQ IN is raised on all channels in INTFX. MPUX then exits to the wait routine in FIG. 8 entitled "IDLEPEND."

MPUX SUPERVISORY MICROPROGRAMS

FIGS. 15–24 are simplified flow diagrams of the microprograms used in MPUX to effect coordination of operations with INTFX, supervision of certain aspects of data flow circuits 13, and effecting supervisory control over MPUY and MTU's. It should be understood that these microprograms may take several forms and still effect advantages of the present invention. Program segmentation techniques may be used within the microprograms. For brevity, it is assumed that program segmentation has been minimized.

The order of presentation of these programs follow generally the execution of initial selection processes as well as communication during burst and other modes of operation. The microprograms that are described in moderate detail are trap, initial selection, polled status, termination, and sense. Routines read type and test and write are utilized during burst mode. Service return is used in timing the data transfers. Error status and the sense, reset and mode are usable with other microprograms. It will become apparent that MPUX is continuously monitoring CTO for newly received instructions from INTFX. ADDRO, indicating a new selection or early termination, and CMDO, indicating a change in operation, are particularly important.

X-trap 122 is initiated by a trap signal received from INTFX over line 17 setting IC 66 (FIG. 3) to all zeroes. Irrespective of the microprogram being executed at the current time, this action requires MPUX to obtain the next instruction word from ROS address 000. Status stored in LSR, as well as in the various other registers in the I/O controller, ensure that no status data is lost.

In storing status, step 220 first transfers status information to LSR. This includes transferring information from error register 93. The signals stored in interconnection registers 14 are also transferred to LSR at a preselected byte address such that MPUX may recover that information. The interconnection registers are then cleared to all zeroes in preparation for performing functions requested by INTFX. In step 221, MPUX samples whether or not CTO is receiving an initial selection signal from INTFX. If INTFX is indicating initial selection, initial selection 125, as next explained with respect to FIG. 16, is entered. If it is not an initial selection trapping operation, in step 222 MPUX traps and holds MPUY at its ROS address 0000 as described with respect to FIG. 3. In decision step 223, MPUX determines whether or not there is a general or selective reset. Reset enables I/O controller to restart in accordance with INTFX command signals. If none of these conditions occur during a trap, an error has occurred. Diagnostic routines are then entered to determine the source of the error. For brevity, diagnostic routines are not explained in detail. An alternative action is to stop I/O controller and light a trouble indicator for manual intervention.

Initial selection 125 is explained with particular reference to FIG. 16. The routine is entered at point 226 for checking initial conditions in step 227. MPUX, before it can evaluate what the initial selection signal from INTFX means, must determine what all of the initial conditions are for setting up program branching operations to be used later. If ADDRO (Address Out) is inactive on CTO, X-polled 129 (FIG. 13) is entered. ADDRO indicates that INTFX is requesting access to the MTU indicated by signals on CBO (Channel Bus Out). If ADDRO is active, I/O controller 11 responds with either ADDRI (MTU is available) or CUB (Control Unit Busy), as will become apparent.

Further initial condition checking includes CU status pending, whether or not I/O controller 11 is stacked in this operation, whether or not there is a contingent connection, and the like. With any status pending, the pending address of the MTU is compared with the requested address on CBO. If they are the same, ADDRI on CTI is activated. Also, if there was no outstanding status pending or if the addresses are the same, OPERATION IN is raised.

When MPUX has determined all initial conditions are satisfactory (OK) for the INTFX request, the initial subroutine 228 is entered. On the other hand, if the pending MTU address does not compare with the requested MTU address, the microprogram momentarily signals the interface hardware that selection is not possible. The interface hardware returns the CUB signal and continues for the remainder of the selection attempt. If there was a contingent connection, IDLESCAN 120 is re-entered for rechecking that situation. If there was no contingent connection, MPUX places the control unit in PENDING STATUS and initiates termination 130.

Initialize 228 clears out old status, prepares I/O controller 11 for a new operation, and supplies signals to INTFX indicating that I/O controller 11 is prepared to proceed. The MTU address received from INTFX is moved to a pending address register in LSR as well as to interchange registers 14 for transfer to MPUY. It is also supplied to TU address register 60 for selecting the MTU. MPUY is then trapped to fetch MTU address from interchange register XA. MPUX then moves the MTU address to CBI for verifying with INTFX that the correct address was received. Initializing is completed by raising the ADDRI signal in CTI and then checking on whether or not diagnostics are to be performed.

If ADDRO is now active in CTO, termination 130 is entered (FIG. 19). ADDRO being active at this time indicates INTFX wants to terminate the operation. Accordingly, in termination 130, status is again cleared; and MPUY is trapped to deselect the previously addressed MTU. The I/O controller then returns to idle pending 150 to wait for selection. Normally, ADDRO is not active; and MPUX waits for CMDO. CMDO tag indicates a command signal is appearing on CBO. During this wait period, hardware errors may be monitored. For example, if a service-out is supplied, an INTFX error has occurred; then, I/O controller 11 stops all operations pending clarification of that error by either manual intervention or subsequent CPU diagnostics and resultant control signals not pertinent to the present invention.

Upon receipt of CMDO over CTO from INTFX, fetch command 229 is entered. The command is fetched from CBO, checked for parity error, and analyzed by MPUX. For example, there may be a test I/O (TIO), a no operation (NOP), or read, or write, or other form of command. During fetch command, hardware errors, pending status, stacked status, and the like are checked again. If status is pending or stacked and the command is not TIO, then MPUX supplies a CUB INTFX—that is, I/O controller is in the middle of a sequence of operations and cannot receive additional assignments.

During fetch command 229, several branch conditions are set up in LSR for later use by MPUX. For example, if status is pending or stacked and there is a TIO command, there are three possible routines used in the X-termination 130 for completing this portion of the microprogram. The routine executed is a function of various conditions in INTFX and MPUX. Also, whether or not the addressed MTU is busy is checked. If addressed MTU is busy, several branch conditions are set up; the MTU busy status is sent to INTFX by status 132. Also, if a diagnostic flag from INTFX on CTO is active, diagnostic 127 is entered. If none of the above tags occur, decode command 230 is entered. This last action is initiation of a data processing operation such as read, write, and the like.

Decode command 230 takes the CBO signals and analyzes them for determining what function is to be performed. The microprogram branches in accordance with the command code on CBO to either X-read type 137, X-write 138, error status 139 (based upon a command reject), or initiating motion control such as rewind, forward space, erase, and the like. These routine executions replace hardware sequences in earlier I/O controllers. Since the functions are well known, they are not all further described.

For initial selection, X-polled 129 is centered if ADDRO is not active. The initial selection trap with ADDRO inactive indicates that a microprogram request for service has been honored by the I/O channel. Normally requests for service are to process interrupts found during the DEPRIME POLLMTI routines. This micro-routine replaces a previous hardware sequence which examines INTFX poll request, determines which channel (A or B) is polling, and then sets up branch conditions for use later on in initial selection processing. The first step in X-polled 129 checks the status and then activates operational in tag on INTFX acknowledging receipt of the poll. If status is already pending or stacked, the corresponding MTU and CU address are already stored in LSR. If status is neither stacked nor pending, MPUX assembles the MTU and CU address information for INTFX.

In subroutine 234, MPUX determines which channel, A or B, is polling. This is determined by a hardware latch (not shown) which indicates either channel A or B. A notation as to which channel is selecting is placed in LSR, and all REQUEST IN tags are cleared. This means that I/O controller is no longer available for a new request from INTFX. The present poll must be completely processed before I/O controller 11 can communicate with INTFX about a new request.

After MPUX determines which channel is polling within INTFX, the device or MTU address is verified by subroutine 235. The address is sent back to INTFX via CBI of registers 42. At this time, ADDRI tag is raised in register 43 indicating that the information on CBI is an address. Branch conditions in LSR again are established for use later on by the microprograms during initial selection processing. Then, MPUX waits until either the ADDRO tag line or the CMDO tag line is activated. If the CMDO line is activated, MPUX returns status to INTFX via X-status 132. If ADDRO is activated, HIONOP subroutine in termination 130 is entered. This subroutine resets I/O controller 11 and deselects any selected MTU.

Status is supplied to INTFX upon its request or each time a CMDO is processed. For example, during verify device (MTU) address in X-polled 129, a CMDO tag was sensed to initiate a status return. In responding to CMDO, MPUX enters X-status 132 (FIG. 18) at STATRTN 238. First, INTFX is scanned in microprogram cycle 239. This scan consists of scanning for ADDRO, SVCO, and CMDO tags. If ADDRO tag is active, the microprogram branches to TERMSTAK in the termination 130 (FIG. 19). ADDRO active at this time indicates termination of the I/O operation, therefore, termination 130 is entered. If either SVCO and CMDO are active, scan INTFX 239 is repeated until those tags become inactive. This assurance that no outbound tags are active must be performed before any inbound tag can be activated.

INTFX is now ready to receive status information. Immediately, in subroutine 240, MPUX effects transfer of status to INTFX via CBI. Scan INTFX cycle 241, identical to cycle 239, is executed. If CMDO is received during cycle 241, MPUX determines in step 242 whether or not CUB was sent. If I/O controller 11 is in busy status, termination 130 is entered at TERMSTK1 as later explained. If it is not busy, the stack flag (not shown) is set—that is, a request has been stacked in LSR which cannot be processed until the fall of SUPPRO. Then, the microprogram branches to TERMSTAK in termination 130. If SVCO is active, then in step 243 INTFX SUPPRO is tested. If SUPPRO is active, the appropriate latches or flags are set in step 244; and status pending is reset. If SUPPRO is inactive, all the flags in LSR are reset during step 245. The two branches of the microprogram join in step 246 to check INTFX CUE latches (not shown). This checks whether or not any other initial selection attempts were received from either channel A or B while I/O controller 11 was busy. The microprogram then branches to termination 130 at TERMACC. In summary, it can be seen that in the status routine there are three possible branches—TERMSTK1, TERMSTAK, and TERMACC. The first two terminations are based on stacking status and the third on acceptance of status. Termination 130 terminates the presently executed micro-routines and prepares the I/O controller for subsequent action with respect to INTFX.

A common entry to termination 130 (FIG. 19) is via TERMSTAK at 247. In subroutine 248, status with INTFX is checked. This includes status pending, status stacked, operation inactive, control unit busy (CUB), channel A or B selecting, are there any CUE's, and the like. If there is no pending status, the program branches to IDLESCAN. CUE is a latch (not shown) indicating Control Unit End. When CUB is active, CUE latch blocks any attempted selection until the controller is no longer busy.

Upon successful testing of status, a test is made for OPERATIONAL IN during step 249. If OPERATIONAL IN has been raised on CTI, an initial selection is indicated as being successfully started. Subroutine 250 sets three branch conditions for entering termination 130 via status routine 132 (FIG. 18) as previously described. If OPERATIONAL IN is not active, SUPPLEMENTAL REQUEST IN tags are established in subroutine 241. The micro-routine then returns to IDLEPEND 150 of FIG. 8.

If there is a command reject by MPUX, the termination routine is entered at 255. MPUX sets the command reject unit check tag and status pending flags and then enters the TERMSTAT at 247.

Another alternative entry into termination 130 is via a command parity error (CMDPARER and CMDPAR1). These two points of entry may be from FIG. 16, fetch command 229. In the CMDPARER entry, INTFX sense data is set up. If CMDPAR1 is the entry, status pending is checked in step 256. If there is status pending, the CUB is set in step 257. If there is no status pending, unit check status pending flag is set in step 258. Then, TERMSTAT is entered.

An independent subroutine in termination 130 is TERMACC. This subroutine is entered when the status supplied to INTFX has been accepted. This is indicated by the receipt of SVCO on CTO. A reject of status is indicated by a CMDO which causes the microprogram to branch to TERMSTAK or TERMSTK1. For TERMACC subroutine, OPERATIONAL IN on CTI is made inactive during step 260. Then, the status of the I/O controller is scanned during cycle 261. If the I/O controller is chained or subject to a conditional connection or reserved, stat D is set in step 262. This notifies MPUY that the status furnished to INTFX has been accepted. If none of the conditions are detected in scan 261, a hold latch (not shown) is reset. This is a hardware latch which informs INTFX that the controllers connection to the currently selected interface A or B is being maintained for one reason or another. After stat D is set, MPUX waits during wait cycle 264 for MPUY to set its stat D, which is an acknowledgement that it is waiting for MPUX to proceed on initial selection processing. This action is described in detail later with respect to FIG. 27.

Immediately upon sensing MPUY stat D as being active, MPUX determines in step 265 whether or not the I/O controller is still chained. If it is not chained, MPUY is trapped in step 266 to deselect or release any MTU connected to the controller. In wait cycle 267, MPUX again waits for MPUY to set stat D. MPUY stat D being set indicates that the deselection of an MTU has been completed. After this action has been completed or the I/O controller is chained, MTU device indications in LSR are cleared for INTFX; and IDLESCAN (FIG. 8) is entered for scanning for additional DEPRIMES or other requests.

In the event the status furnished to INTFX during status 132 is rejected, TERMSTAK or TERMSTK1 is entered. If TERMSTAK is entered, the hold flag on INTFX is activated, CBI is cleared, and all channel tags in (CTI's) are reset. In LSR, the I/O busy signal is reset in the pending status byte. Then, IDLESCAN is re-entered as above described.

Another entry into termination 130 is HIONOP which means "halt I/O not operating" (no data processing is occurring in controller 11). Halt I/O means "do not continue any I/O operations." This entry can be from several routines, such as from initialize shown in FIG. 16. With this mode of entry, MPUX first in subroutine 269 clears the status registers shown in FIG. 3, traps MPUY to deselect the connected MTU, resets the chain flag in LSR, clears CBI in channel registers 42, and drops all CTI's. The microprogram then returns to IDLESCAN shown in FIG. 8 for checking pending status.

During a recording operation, often referred to as "write," there may be a write check condition (a write error has occurred). One write check condition is termed WC0HIO, which means "word count zero or halt I/O." Upon detection of a write check condition wherein the input/output processing through INTFX should be held, the status surrounding the write check is stored in LSR. Unit check tag is supplied to CTI. The status pending flag is then set in LSR and HIONOP is entered at subroutine 269, as previously explained.

From the above descriptions, it can be seen that termination 130 contains many entry points which are closely associated with terminating a particular microprogram routine and transferring such information to INTFX. This, of course, is in addition to transferring status information via status routine 132 and error status routine 139. Those latter two routines do not terminate a set of microprogram routines.

FIG. 20 illustrates in simplified form read-type and test 137. For each read operation, the read-type routine determines the type of read, i.e., NRZI, PE, forward, backward, and the like, and test conditions of the system affecting a read operation. In subroutine 270, the command received from INTFX via CBO 43 is interpreted. If a sense operation is initiated, sense 140 is entered. The purpose of a sense routine is to fetch sense data, i.e., status information and the like, for INTFX. If the command received by the I/O controller is illegal, the command is rejected with the termination 130 being entered at COMREJCT which then supplies a unit check condition to INTFX. If the command is TIO (test I/O), the link 1 register in LSR is set to TERMSTAT for use later on in the termination procedures. If the command concerns a read operation, MPUX in subroutine 27 presets the controller for read in either the forward or backward direction. Then, MPUX sets the link 1 register in LSR to subroutine "CLEANIT".

Upon acceptance of any command in the just-described processing, the TU test routines are entered. These test routines may also be entered from initial selection 125. If the command is TIO, step 272 tests whether or not MPUY stat C is active. If it is active, the status of the MTU is such that unit check must be returned to INTFX. This is accomplished by causing the micro-routine to branch to termination 130 at CMDPAR1—that is, if MPUY stat C is active, MTU status is improper for a test I/O operation. If the stat C of MPUY is off, the microprogram branches through link 1 register LSR to TERMSTAT at 247 of FIG. 19.

Upon initiation of a read command via subroutine 271, all of the sense data in controller is cleared during step 273. Test step 272 is performed as previously described. Another entry into the test routine is PROTEST. In this entry, two decision steps 274 and 275 check for stat C of MPUY and file protect. If MPUY stat C is on, MPUX resets sense and executes step 272. If MPUY stat C is off and the file protect is off, MPUX goes through reset sense step 273 to branch link 1. If the file protect is on, i.e., a write is illegal, it will go to command reject entry of termination 130.

From the above description, it can be seen that the MPUX read routine is merely a supervisory operation. The detailed read operation control is handled by MPUY with the data processing circuits 13 performing the actual data processing functions.

A similar situation occurs in the write 138 (FIG. 21). Initial selection 125 initiates the write operation at 276. In subroutine 277, MPUX sets up three branch conditions which will be used later on in the write operation. The first one is WRTFST, which means write first byte of data. The second link is WC0STP, which is word count zero stop. This subroutine is entered during an operation when a CMDO, i.e., stop, is received from INTFX in response to the first SVCIN tag. The first SVCIN tag indicates that the I/O controller is ready to receive the first byte of data for recording. The third possible branch is WC0HIO, which means word count zero halt I/O, as previously explained. After setting the branch conditions, the word count registers (tally of number of bytes recorded) are cleared to zero, CBI is cleared, and selected scratch-pad registers within LSR are cleared. Then, the microprogram branches to service-return routine of FIG. 22. That routine informs the INTFX that I/O controller is ready to proceed with writing. After the first byte of data has been processed, SVCIN and SVCO tags are handled by circuits in signal processing circuits 13 and as described in Moyer et al., supra.

The WRTFST branch condition is entered at 280 to initiate set-up subroutine 281. In this set up, proper parity on CBO is checked. A word count in the sense registers of LSR is cleared to zero. If a set track in error (TIE) mode set has preceded the write command, mode routine 136 is entered to perform the transfer of the mode set data to the data flow section. This is termed DOTIEMS1 which means "do track in error mode set routine 1." The scratch pad is incremented by one with numbers being sent to CBI. In subroutine 282, MPUY is trapped to perform a write command as described with respect to write routine 145. Next, scan cycle 283 is entered. If ADDRO is up, error status routine 139 is entered. If ADDRO is up at this time, it means that the INTFX wishes to terminate the operation. If TAPE OP is up, i.e., MPUY has set its stat indicating MTU is operable, then normal write initiation routines are followed. The third point of the scan is MPUY stat D. If stat D is off, the scan is repeated. If stat D is on, it means that MPUY has terminated its operation and the write operation cannot be performed. MPUX then traps MPUY to abort the write and sends in unit check to INTFX. It then enters diagnostic routine 127 to check on the erroneous condition.

If the TAPE OP condition is satisfied, MPUX enters wait cycle 285. If SVCO is still active, the byte of data to be recorded has not yet been transferred to the I/O controller. As soon as SVCO becomes inactive, scan cycle 286 is entered. If ADDRO is active, HIOPERG (halt I/O controller operating—data processing being performed) is entered in the error status 139. If SVCO becomes active again, a diagnostic routine is performed. In step 287, the above-referred-to work register is incremented and returned to CBI. This action concerns a diagnostic routine which is beyond the scope of the present specification. If CMDO becomes active, the operation is to be terminated. In this situation, the stop flag in LSR is set to the active condition; and the burst wait (BSTWAIT) entry to error status 139 is followed. This action sets the I/O system for terminating write. Next and last, MPUY stat D is sensed. If stat D is on, it means that no MTU is connected to the I/O controller; and the write is stopped. If stat D is off, the scan is repeated until one of the flags becomes active.

An important function within the I/O controller which is previously completely hardware sequenced is the service routine (SERVRTN) 135. This routine transfers the first byte of data; thereafter data flow circuits 13 sequence the data signals as shown in Moyer et al. patent, supra. First, scan cycle 287A is entered. ADDRO. SVCO, and CMDO tags are sensed. If ADDRO is active, a halt I/O is in process. Branch according to link 3 as set up in the write initialize is entered—that is, WC0HIO. If either SVCO or CMDO are active, the scan cycle is repeated. If all of the outbound tags are inactive, MPUX sets SVCIN tag in step 288. This indicates to INTFX that the I/O controllers is prepared to receive the first byte of data for recording, or transfer the first byte of data to INTFX. Immediately after setting SVCIN tag in CTI, scan cycle 289 is entered. The three outbound tags—ADDRO, CMDO, and SVCO—are again scanned. If ADDRO becomes active, the link 3 entry to termination routine is entered. If CMDO is sensed, i.e., the I/O operation is to be terminated, the stop flag (LSR) is set in step 290; and link 2 subroutine is entered (FIG. 23). This is the normal way of terminating a data processing operation. Next, SVO is sensed; and if it has not been activated, the I/O controller is not to proceed. Receipt of a SVCO indicates that the I/O controller may proceed to the next step. In a write operation, it indicates a byte of data has been supplied to CBO; while in a sense, it means that the data has been received by INTFX. Upon receipt of a SVCO, branch link 1 is used to return to the desired routine. Use of tags in a read operation is explained in more detail with respect to FIG. 23.

Referring next to FIG. 23, error status 139 is explained. The burst wait entry (BSTWAIT) is used during the burst mode of operation. Burst mode means that channel A or B of INTFX is dedicated to the transfer of data signals from an addressed MTU and a given CPU. Scan cycle 292 is first performed. First, ADDRO is checked. If ADDRO is received, HIOPERG 293 is entered. Again, ADDRO indicates that an INTFX is attempting to terminate the connection.

The second point in scan cycle 292 is CMDO. If it is active, the burst operation is to be terminated. A stop flag in LSR is set, and branch link 2 is entered for stopping either the write or read operation. Next, the MPUY stat D is sensed. If stat D is off, the cycle is reinitiated at that point. If stat D is on, the scan is continued (MPUY has finished its operation and is at wait MPUX). An error condition must exist if this latter program sequence was followed. MPUY ALU errors are checked as well as other exceptions from MPUY. If either of these are active, set sense status 294 is entered; various LSR flags are set in subroutine 295; and TERMSTAT entry of termination 130 is entered. This means the burst mode being terminated, and MPUY is informing INTFX of what happened.

Scan 29 is exited in a normal fashion at 295. If MPUY has set a unit check (cannot perform a function), then set flag subroutine 296 is also entered. These flags indicate a unit check status, i.e., the I/O controller cannot perform the desired function. Normally, MPUY did not supply a unit check and MPUX determines whether or not a sense command is being executed. If so, sense 140 (FIG. 24) is entered. If not, i.e., normal data processing operations are being performed, a data error is sensed for in step 297. If there are no data errors, other error checking is performed in subroutine 298. If errors are detected, data check or other forms of error indications are provided through CTI to INTFX. If there are no errors, TERMSTAT entry of termination 130 is used. If there is a data error, sense bits are set in subroutine 299; and the appropriate flags are set in subroutine 295 and TERMSTAT termination routine is entered.

Returning now to HIOPERG 293, a routine is executed in response to an ADDRO command from INTFX received during other operations. First, MPUX sets the stop flag in LSR, resets other flags such as all CTI's, chain flag, and sets busy condition (CUB) and holds for further operations. It then goes to wait cycle 300 waiting for ADDRO to become inactive. Upon ADDRO becoming inactive (INTFX ready to proceed), MPUX returns to scan cycle 292 for scanning INTFX status and subsequent branching to the appropriate routine in termination 130.

CLEANGO routine indicates the status is "clean", i.e., the I/O controller is free to proceed with the operations. Preset subroutine 301 is first performed. This includes dropping all status-in tags at CTI and transferring the data flow mask to data flow circuits 13. The latter function is described later. Then, in decision step 302, it is determined whether or not a write command is active. If it is a write command, a write initiate within write 138 is entered as previously explained. If the command relates to track in error (TIE), the write initiate command is entered as it is time shared with the TIE function. TIE functions have been used in hardware sequences before and are not further described. If both decision steps result in negative answers, the operation is determined to be a read operation. MPUY is then trapped during step 303 to perform Y-read 144. BSTWAIT routine is then entered for preparing MPUX for further action.

Additionally, an error status 139 is used in connection with stopping a write in WTOSTP. It is entered through set sense subroutine 299. Also, if there is a data check, set sense subroutine 299 is executed in preparation for entering termination 130.

In response to a sense command, MPUX enters the FIG. 4 illustrated sense routine. MPUX in step 305 determines that there is satisfactory status (clean status) for forwarding the status to INTFX. At 306, MPUX traps MPUY to its sense routine, described later with respect to FIG. 36. MPUX stores branch link numbers in LSR for use later on. MPUY in its sense routine fetches two bytes of data for each cycle of operation. The even-numbered bytes are placed in YA, and the odd-numbered bytes are placed in YB. When the two bytes have been supplied to exchange registers 15, MPUY sets stat C; and upon completion of furnishing all the sense bytes, it sets its stat D. Accordingly, MPUX at 307 senses for MPUY stat C. As soon as stat C is sensed, MPUX fetches the even-numbered sense byte in YA. It then performs a routine at 308 for determining whether or not MPUX should add bits to the sense byte from its own status registers. If yes, additional bits are supplied at 309. Then, at 310, MPUX supplies the sense byte to CBI. At 311, sense routine branches to service routine for sensing SVCO as was previously described.

After sending the even-numbered byte to CBO, MPUX fetches the odd-numbered byte from YB and then sets its stat C informing MPUY to fetch the next two bytes of sense data. MPUX then determines with respect to the odd-numbered bytes whether or not additional bits should be added; then proceeds to SVCRTN at 312. Upon receipt of SVCO, MPUX transfers odd-numbered byte to CBI at 313. MPUX then again senses for MPUY stat D, i.e., whether or not the sense operation is complete. While waiting for MPUY to set stat C at 314 (indicating that the next two sense bytes are available in YA and YB), MPUX senses for ADDRO from INTFX for determining whether or not the sense operation should be aborted. Before determining whether or not all sense bytes have been transferred, MPUX resets its stat C at 315 and provides a suitable delay. If all sense bytes have been transferred, it returns to TERMSTAT. If more bytes are to be transferred, MPUX re-enters step 307.

While MPUX waits for MPUY to fetch sense bytes (MPUY stats C and D are off), ADDRO is sensed at 316. If ADDRO is active (the I/O connection is being terminated), then the link registers in LSR are cleared at 317. The stop flags are set in LSR and IDLEPEND is entered awaiting further INTFX instructions. ADDRO being active at 318 also causes exit of sense to IDLEPEND.

In addition to the above-described microprograms, MPUX also performs other functions. This includes a mode of operation which determines PE, NRZI, etc., modes of operation. Such functions being substantial duplicates of prior hardware sequences, are not described. The reset operations and the special control operations reside in a similar category. The control operations are associated with the later-described motion control routine of MPUY—that is, space, record, rewind, and other medium motion controls. The initiation of such motion controls are well understood, and the microprogram version thereof used in MPUX to initiate such actions are one of design choice.

MPUY MICROPROGRAMS

Selected MPUY microprograms are described in some detail for illustrating the transfer of signals from INTFY to MPUX via the interchange registers. For brevity, not all of MPUY microprograms are described.

As previously explained with respect to FIG. 3, MPUY while waiting for MPUX may be forced to a static condition, i.e., the MPUY clock is turned off. This is the preferred mode of holding MPUY. An alternative approach is shown in FIG.

25 wherein at ROS address 999 unconditional branch instruction 06 is set to return the microprogram to address 999. This enables MPUY to perform an endless loop until trapped by MPUX to ROS 000. At address 000, whether it be held as explained with respect to FIG. 3 or FIG. 35, MPUY fetches signals from register XB. These signals are a ROS address for MPUY to enter one of the microprograms now to be described.

One of the first routines to be performed by MPUY concerns initial selection. Initial selection (FIG. 26) is entered at EXECSTS. The first step 321 fetches the MTU address from register XA. In step 322, MPUY determines whether multi-tagged interrupt (MTI) is pending in the addressed MTU connected to INTFY. If no interrupt (MTI) is pending, MPUY in step 323 fetches the MTU sense bytes and transfers same to registers YA and YB. It then sets stat C informing MPUX that information is available in registers YA and YB. The sense bytes inform INTFX as to the status of the MTU. If an interrupt (MTI) is pending, MPUY then proceeds to check the MTU in INTFY polling as described later with respect to FIG. 28.

Continuing now with respect to MTI being inactive, MPUY checks the condition of the switch (not shown) in INTFY—that is, the MTU may be switched between one or more I/O controllers. If, in step 324, the MTU is not connected to another controller, MPUY determines at 325 whether or not the MTU is physically present. If it is not, a unit check status is generated at 331. If it is present, MPUY at step 326 determines whether or not it is busy. If it is busy, it determines whether or not the MTU is executing a motion command. If MTU is executing a motion command, MPUY at 327 determines whether or not a SUPPRO is active (command chaining in process). If so, step 321 is re-entered. If it has been completed, MPUY then primes for DEVICE END at 328. This consists of setting a DEPRIME bit in the registers described with respect to interrupt scan. This is a mechanism used by MPUY for recording a request from INTFX and for getting back to INTFX as soon as the addressed MTU is made available, i.e., has supplied a DEVICE END (DE). DE indicates the operation a device is performing has been completed. MPUY then clears MTU select line and sets both stats B and D, and awaits further action by MPUX. If there is no motion command sensed at 329, the end-up routine (FIG. 27) is entered. The end-up routine merely provides a short set of operations to enable MPUY to wait MPUX (FIG. 25).

Returning now to step 326, if the addressed MTU was not busy, then MPUY determines at 330 whether or not the MTU is ready. If MTU is not ready, it means power may be turned off, a tape reel may not be installed and the like. If power is turned off, unit check signal is generated at 331. When the addressed MTU is ready, MPUX in step 332 sets up to the MTU model (velocity) code in register YA for data flow control. Next, in step 333, MPUY checks whether or not there is still a DEPRIME in LSR. If not, stat D is set and MPUY waits MPUX. If there is a DEPRIME, MPUY sets both stats B and C and enters POLLMTIX of FIG. 9.

The Y-termination 147 is explained with respect to FIG. 27. The code name "ENDUP" is used to indicate MPUY is entering this routine. The purpose of this routine is to make all data available to MPUX and prepare MPUY for waiting for the instructions. First off, MPUY resets TAPE OP status. This means that MPUY is in effect closing down data flow operation. TAPE OP status active indicates that an MTU is connected to MPUY and is in operational state, i.e., transferring data signals. Next, MPUY fetches the MTU sense bytes and stores them in its own LSR. MPUY then checks and logs any error conditions that it may have. Stat D is finally set, and MPUY waits MPUX.

Part of the initial selection process requires MPUY to poll or search INTFY. Microprograms effecting this search are shown in FIG. 28. The longer program is entered at MTISEARCH, while the shorter program is entered at CHECKDEV. CHECKDEV is a portion of the MTISEARCH.

The first step in MTISEARCH determines whether the MTI (multi-tagged interrupt line) is active or inactive for any MTU. MPUX has a control line (not shown) to INTFY that gates the logical "OR" of all MTU interrupts to MPUY. If it is inactive, stat D is set at 340 and MPUY waits MPUX. On the other hand, if MTI is active, MPUY sets stat B at 341. MPUX now activates INTFY to supply only the MTI indication of the addressed MTU to MPUY and scans all MTU addresses in sequence until the MTU having MTI is located. During this scan, MPUX and MPUY stat registers are used to synchronize the two programs. It then waits for MPUX stat C at 342. Remember that MPUX stat C indicates that MPUY may proceed. MPUY then resets its own stats B and C and again senses whether MTI is active. If it is inactive, MPUY sets stat C at 343 and again waits for MPUX stat C. This latter situation indicates that MTI went from active to inactive status. On the other hand, when MTI remains active, stat B is set at 344; and MPUY awaits MPUX stat C to be reset at 345. As soon as MPUX stat C is turned off, (it having been turned on during wait cycle 342), MPUY enters polling cycle 346. As soon as MPUX sets its stat C active again, MPUY enters the CHECKDEV subroutine. On the other hand, as long as MPUX stat C remains off, it will sense whether or not MTI is active. If it is active, MPUY then remains in the polling cycle. If it becomes inactive, it enters termination step 340 as will be described with respect to CHECKDEV.

CHECKDEV is entered either from initial selection 148 of FIG. 26 or when MPUX stat C is turned on during MTISEARCH. In the first activity, MPUY fetches sense from the addressed MTU. Then, in step 348, MPUY determines whether or not the MTU is assigned to I/O controller 11. Remember that various MTU's may be connected through various switching devices (not shown) to several I/O controllers. If the MTU is not assigned to I/O controller 11, termination step 340 is entered. This involves clearing the MTU tags from LSR, resetting the connection, and setting stat D. Normally, the MTU being polled is assigned to I/O controller 11. In that instance, MPUY sets stat C at 349 and waits at 350 for MPUX stat D to be turned on. MPUX setting its stat D on indicates to MPUX that all activity required for MTISEARCH has been completed. All the activity having been completed, MPUY resets MTU at 351 and enters termination step 340 as previously described.

An important microprogram used in practically every MTU operation except for sense and polling is the motion control program shown in abbreviated form in FIG. 29. The entry point is coded as TURNARND. This program effects all tape motion of the addressed MTU. Commands are exchanged between MPUY and the addressed MTU during the motion control program for carrying out motions required for read, write, diagnostics, and for positioning tape in preparation for any of the latter operations. This program is usually not entered by a trap operation from MPUX, rather, it is entered from other programs yet to be described. MPUX, however, does have the capability of trapping MPUY to this program.

The first step 355 sets TAPE OP condition, i.e., the addressed MTU, is going to perform a function for MPUY. This condition is set in LSR of MPUY. The PE bit is also set. The MTU is reset such that new commands from MPUY may be received. All error conditions are cleared from LSR. Then, MPUY executes a series of decision steps at 356 with regard to the instructions received from MPUX in REG XB as well as sensing conditions in MTU. The first decision step determines whether or not MTU is at beginning of tape (BOT). When it is not BOT, MPUY executes step 357 to determine whether or not the addressed MTU is set in NRZI mode. The MTU's of this disclosure can be only set in either NRZI or PE modes.

Returning now to decision step 356, if it is BOT, MPUY determines whether or not a write operation is to be performed. If yes, then MPUY fetches a data mask (a control word for data flow circuits 13) from register XA in step 358 and proceeds as will be later described. On the other hand, if the instruction from MPUX is not write, MPUY determines whether or not the command is rewind unload (run). If not, it proceeds further in decision step 356 to determine the direction of motion whether it should be a read forward or a read backward. If it is a read backward, an error condition occurs and unit check is set at step 359; and MPUY enters ENDUP as previously described. On the other hand, it if is a forward read, the illustrated preparatory steps are followed.

Returning now to the sequence followed when initial condition is not BOT. Assume there is NRZI capability in the addressed MTU (step 357). In step 360, MPUY sets NRZI mode indicators in LSR and in data flow control register XA. Then, at 361, MPUY determines whether the commanded motion is in the forward or backward direction. If it is in the backward direction, MPUY at 362 sets the addressed MTU in the backward mode, i.e., sets the command MOVE BACKWARD. Upon a MOVE BACKWARD, a forward hitch is performed at 363. A forward hitch is described in detail in the commonly assigned F. R. Hertrich U.S. Pat. application Ser. No. 814,689, filed Apr. 9, 1969, now U.S. Pat. No. 3,561,656. Then, MPUY enters time delay 364 permitting the addressed MTU to stabilizetape in columns. After this delay, MPUY sets the addressed MTU in the drive status at 365. Another delay is introduced for permitting the addressed MTU to effect the command.

Next, MPUY performs a series of checks and sends a final move command to the addressed MTU. First, it detects whether or not the command is read forward. If it is read forward, MPUY activates the read forward command line. It then checks command status in MTU. If the command status is not all right, a flag in LSR 75 is set rejecting the command based upon MTU error. This information is also forwarded to exchange registers 15. MPUY then sets stat D and waits MPUX. Normally, the command status is OK. Then, at 366, MPUY does final checking associated with the MTU move-tape operation as is well known and has been performed in hardware-sequenced controllers. The move command is then set to the addressed MTU. Following this, MPUY performs velocity check 367. This consists of counting timing pulses between successive tachometer pulses supplied to MPUY over line 36 from the addressed MTU. The counted timing pulses are compared with a predetermined number for indicating whether or not velocity is within predetermined limits. If it is proper, MPUY waits MPUX. If there is bad velocity, i.e., the tape is moving too slow, tachometer error is set at 368. The error information is supplied to registers 15, and stat D is set during error return 369. MPUY then waits MPUX.

Returning now to decision step 356, when the read backward decision indicated a forward direction of motion, the forward/backward status of MTU was sensed at 370. If it already was in the forward direction, step 365 is entered. On the other hand, if the command is a forward move and the addressed MTU is in backward mode, the MTU is set to the forward condition and time delay 364 is entered.

If the operation is to be a write operation, i.e., TURNARND is entered from Y-write routine shown in FIG. 30, a data mask (a control word) for use by data flow circuits 13 is fetched by MPUY in step 358. In step 371, MPUY senses whether or not the write operation is PE or NRZI. If NRZI, step 360 is performed, and the sequence described above is followed. If the write is PE and PE was previously set in step 355, the program branches directly to step 361.

The Y-write program 145 is described with respect to FIGS. 30, 31, and 32. After MPUX traps MPUY to WRTOP, MPUY first sets the write flag at 375 in LSR 75. Then, TURNARND motion control program of FIG. 29 is entered. Upon the completion of TURNARND, the branch setup (not shown) in step 375, which set up the write condition, branches back to step 376 of Y-write 145. In this step, MPUY counts tachometer pulses for metering a given amount of tape to form an IBG. After a predetermined amount of tape has been transported, decision step 377 is entered. If it is a NRZI write, NRZI write routine 378 is performed as shown in FIG. 31. If PE is to be written, the write PE routine shown in FIG. 32 is performed. Upon completion of either write routine, ENDUP in Y-termination 147 (FIG. 27) is entered.

NRZI write 378 (FIG. 31) supervises operation of data flow circuits 13 during the write mode of operation for recording data received from INTFX in NRZI recording scheme. All of the discussion with respect to NRZI is directed toward recording in the present known NRZ recording formats. MPUY determines whether or not the operation commenced at load point in step 380. If so, it then sets up a special erase gap operation. NRZI mode is set in the selected MTU, and data flow operations are set in data flow circuits 13. Next, if an erase gap is to be performed, an erase subroutine (not shown) is entered. This subroutine merely requires the addressed MTU to supply an erase current to its transducer for a predetermined length of tape. Upon completion of that operation, ENDUP routine of FIG. 25 is entered. If it is not an erase operation, MPUY determines whether or not a tape mark is needed. If a tape mark is needed in NRZI format, write tape mark 381 is performed. Again, the subroutine is relatively simple and merely uses data patterns placed in TUBO to record the standard NRZI tape mark. After the tape mark operation, the read-after-write portion of the write data subroutine 382 is entered for checking the tape mark.

Generally speaking, data flow circuits 13 perform all of the write signal generation and coordination with the addressed MTU. The addressed MTU must accept data over INTFY as the data flow circuits 13 supply it. During this period of time, coordination with INTFX is performed by MPUX by hardware sequences, as described in Moyer et al., supra.

Many digital magnetic tape subsystems have two gaps for each track on the tape. The upstream gap in a write operation is called the write gap, which records data signals on the tape. The downstream gap is the read gap. As the data is recorded on the tape, the recorded data signals eventually pass the read gap. Many I/O controllers verify recording operations by what is termed "read-after-write" operations. It is intended that the presently described I/O controller be used in this mode, no limitation thereto intended. Data flow circuits 13 may include hardware sequences for performing this read-after-write function as is well known in the industry. Alternatively, microprograms in MPUY can perform supervisory functions—that is, when data flow circuits 13 detect a lack of readback envelope when a readback envelope should have appeared in the read gap, then a BOC can be performed by MPUY. Such BOC will indicate to MPUX that there is a write error, MPUX then branches to error logging operations and informs INTFX of the write error. Normally, there is no write error; the MPUY microprogram proceeds to subroutine 383 which continues the reading operation even after signals are no longer being recorded. The signal delay between the write and read gaps requires a supplementary read operation. Upon completion of the read and detection of the end of record, the ENDUP routine in FIG. 25 is entered.

The philosophy of control for recording in the PE mode follows generally that of the NRZI mode. However, because of many additional format requirements known of PE recording, the write PE program shown in FIG. 32 is necessarily more complex than the NRZI write program. Entry into the program is at BOT decision step 385. If it is BOT, a PE format mark is recorded. After BOT operations, the PE preamble is written in step 386. The program loop in dash box 387 is performed during the burst mode of recording data in the PE mode. A write data command at 388 makes the data flow circuits supply write data. In decision step 389, MPUY checks whether or not preamble recorded in step 386 should be arriving at the downstream read gap as mentioned in the NRZI mode. If the preamble has not yet reached the read gap, beginning of record decision step 390 is performed.

BOR flag in LSR 75 of MPUY is set upon the detection of data during the read-after-write operation. This should occur within a predetermined time after the preamble starts to write. If BOR is not detected by the read gap, which occurs at the beginning of the write operation, velocity check 391 is performed. This is performed in the same manner as described for NRZI. Generally, the velocity check will be OK and loop 387 is re-entered. However, if the velocity check is bad, the write condition is reset and end of data is set requiring data flow circuits 13 to stop recording. Loop 387 is then entered for reaching write reset decision step 392 as will be later described.

If, in step 389, the preamble should have reached or has reached the read gap in the read-after-write operation, the preamble is checked in step 393. This consists of counting the number of signals recorded therein. Generally, the PE preamble contains 40 zeroes. The preamble may be acceptable if 35 zeroes are detected. It may be assumed that during the initial resynchronization portion of the preamble the recorded signals may not be successfully recovered. Upon completion of the checking of the preamble, the record must be continuous since writing is still in process; therefore, the program goes directly to check BOR routine 394. This subroutine checks to see that the data signals from the addressed MTU over INTFY are still active. This branch condition remains active as long as signals are being detected by the read gaps. In step 392, MPUY determines whether or not the write condition is reset. During normal operations, the write condition will be reset at the end of the record as determined by INTFX of in the alternative of a detection of a velocity error. When write is reset, loop 387 is exited for terminating the write PE program. Initially, there is a delay provided at 395 to allow some of the tape to pass by the read head. In step 396, MPUY senses whether or not the read gap is still sensing the record. If not, there is a write error; and the status of the write error is set in step 397. Following this, ENDUP routine is entered. Normally, the read gap would still be sensing the record. The program then senses for end of data (signal generated by data flow circuits 13) in step 398. If it is end of data, the data flow circuits 13 are reset at 400; and the postamble is checked for proper length of recording. Then a series of decision steps at 401 are performed. These check MTU read, write time, IBG, write tape mark op (WTM OP), and the like. From these decision steps, readback checks 402 are performed. Based upon the analysis of the decision steps 401 and readback checks 402, either the write error 397 step is entered or ENDUP routine of FIG. 27. Normally, ENDUP routine of FIG. 27 is directly entered. If the BOR is off but was on previously as detected in step 403, series of decision steps 404 are performed. These determine whether or not too many write times have occurred, IBG was being written, or a tape mark was being written (write times are used as a time/distance measurement). As shown in FIG. 32, the program moves to either an error condition or back to decision steps 401 in accordance with the various operating statuses.

The Y-read program is shown in FIG. 33. This is entered on a read operation, space, or space-file command operation. In the latter two, the read circuits are operated with a threshold of 10 percent maximum. The threshold is forced on the data flow by MPUY as explained with respect to FIG. 2. In the read program, MPUY first checks the direction of motion in step 410. Depending on the direction desired, the addressed MTU is set in either the forward or backward mode. Then, the motion control program at TURNARND is entered at 411. The branch condition set up in step 410 causes the TURNARND program to branch back to the Y-read program of FIG. 33. Then, MPUY in step 412 determines whether or not BOT is encountered. If it is, MPUY checks the tachometer velocity and meters tape in step 413. It then proceeds to decision step 414 for determining whether NRZI or PE recording scheme was used on the tape being read. If it is NRZI, MPUY determines whether or not the NRZI feature was included in the addressed MTU. If the NRZI tape is loaded on a MTU not having the NRZI feature, it is not capable; and an error condition exists. This is logged in step 415 and ENDUP routine of FIG. 27 is entered. If it is NRZI and capable of being performed, TURNARND 411 is again entered for moving the tape to the first record block. If PE was recorded on the tape, the PE read routine 416 is directly entered.

On the other hand, if the read operation is in the middle of the tape, BOT is "no" with decision step 417 being entered. If it is a NRZI tape, NRZI read routine shown in FIG. 34 is entered. If it is PE, PE read routine 416 is entered. Upon completion of either of the read routines, terminate read routine 419 is performed. This includes error checking which may cause entry of a diagnostic routine (not described in detail). Normal exiting of terminate read routine 419 is to ENDUP routine of FIG. 27. Also, during the terminate read 419, a creased tape may be detected—that is, a tape being read may have a crease in it causing no readback signals for a short period of time. This period of time is normally much less than an IBG. Known detection schemes for detecting creased tape are used. A creased tape routine 418 is entered if the tape is stopped because of the crease, and ENDUP routine of FIG. 27 is entered. Otherwise, PE read routine 416 is entered as will become apparent.

The NRZI read routine of FIG. 34 is entered from decision block 417 of FIG. 33. The first step in the routine is 420 in which MPUY sets the read mode in MPUY and data flow circuits 13. It also sets detection thresholds. Initially, before the record is encountered, the threshold is set high, and after the record is encountered, it is lowered. This function can be performed by hardware sequences in data flow circuits 13, as was performed in previous controllers. NRZI data transfer loop 421 permits MPUY to idle through a pair of decision steps, while data flow circuits 13 process data from the addressed MTU directly to INTFX. SRVRTN routine of MPUX again provides coordination between INTFX and the I/O controller. Within NRZI data transfer loop 421, end of data is continually sensed. If there is end of data, MPUY then determines whether or not a tape mark is being read. If a tape mark is being read, the read routine is terminated. If a tape mark is not being read, MPUY determines whether or not a file operation is being performed. If not, terminate read subroutine 419 is entered. If the file operation is being performed, tape operation condition is reset momentarily; and NRZI data transfer 421 is re-entered. This permits resetting the end data flag to allow the next data block to be scanned for the presence of a tape mark.

During the data transfer, the addressed MTU may become incapable of performing the read operation. In such a situation, it provides an interrupt through INTFY to MPUY. An interrupt from the addressed MTU is a BOC for MPUY. If there is no interrupt, MPUY idles through the two decision steps until end of data occurs. Upon detection of an interrupt indicating that the MTU cannot continue the read operation, unit check is set at 422; and terminate read operation 419 is entered. This will be explained in some detail with respect to read PE set forth in FIG. 35.

The read PE routine starts with setup PE read in the MTU at 425. The preamble of the PE record mentioned above with respect to write PE is read by the read preamble sequence of steps in dash box 426. This includes detection of beginning of record, tracing the BOR, detecting whether or not read operation has been set up, and doing a tape velocity check may be performed using tachometer pulses. Finally, data ready is detected in step 427. This corresponds to detection of the mark or signal marking the boundary between the preamble and the record. If the beginning of record or read op are turned off, special conditions are checked in step 428. These include detection of an MTU interrupt, detection of a tape mark, IBG, unit exceptions, and the like. Such operations have been performed in previous I/O controllers and are not discussed further for this reason. If none of the special conditions are detected, read preamble 426 is re-entered. If a special condition is detected, terminate read 419 is entered on FIG. 33.

Transfer of actual data signals from the addressed MTU to INTFX occurs during PE data transfer 430. This includes monitoring for IBG and MTU interrupt. If an IBG or MTU interrupt occurs during transfer of data, errors are set at 431 and terminate read is entered. Upon detection of end of data, the PE data transfer routine is terminated; and postamble checking is performed. The end-of-data signal is supplied from data flow circuits 13 to MPUY as a BOC. This is one of the status lines shown in FIG. 2.

In postamble checking, MPUY checks whether or not the postamble is too long, too short, or appears as an IBG. As long as data ready is sensed at 431, the postamble checking continues. As soon as an IBG or MTU interrupt is sensed, terminate read is entered. If the postamble is too long or too short, an end data check is flagged and forwarded to MPUX at 432.

Terminate read routine is a microprogram version of a previously used hardware sequence. It is not shown in the drawing in detail for that reason. The functions performed include drop the move signal to the addressed MTU and continue to monitor the read bus until MTU is stopped. This is a velocity check performed by counting tachometer pulses. If a read data signal is received from INTFX via MPUX, the move tag to the addressed MTU is again raised; and the read operation is re-entered as shown by line 433 of FIG. 33. In the latter situation there is a possibility of a creased tape. Raising or activating the move tag enables the system tag to read data signals after traversing a tape crease.

Response of I/O controller 11 to a sense command by MPUX was described in detail with respect to FIG. 24. In that routine, MPUX trapped MPUY to the MPUY's sense program shown in FIG. 36. Upon being trapped, MPUY fetches two sense bytes from the MTU. Then, at 435, MPUY indexes to the next two MTU sense bytes by changing the contents of the TUBO. MPUY then transfers both bytes of data to YA and YB respectively and sets stat C as set forth in 436. A decision cycle is then entered at 437. First, MPUY senses whether or not the stop flag from MPUX is on. This is one of the stat bits in register 89 of FIG. 3. If the stop flag is on, MPUY merely waits MPUX. If it is not on, it senses for MPUX stat C. It may be recalled from the description of FIG. 24 that when MPUX has transferred both sense bytes from registers YA and YB to INTFX, it sets stat C. MPUY must wait until MPUX has stat C. Then it goes to a set of decision steps 438. Again, the stop flag is sensed and MPUY waits for MPUX stat C. It should be on, and then proceeds to clear the LSR sense byte memory locations at 439. Finally, in decision step 440, MPUY checks whether or not all the sense bytes have been forwarded to MPUX. If not, the sense routine is re-entered for fetching two additional sense bytes. If the sense operation is completed, it goes to wait MPUX.

MICROPROGRAM CONTROL OF DATA FLOW CIRCUITS 13

Referring now more particularly to FIG. 37, I/O controller 11 is shown in simplified form accenting the relationship between MPUX, MPUY, and data flow circuits 13. MPUX generally controls the left-hand portion of data flow circuits 13 in an intimate manner and provides supervisory control functions with respect to the right-hand portion. MPUY provides detailed control over the NRZI detect circuit 102, PE detect circuit 103, and control 104. It also supplies data-rate control signals to write timing and control circuits 111.

Firstly, the relationship between MPUX and data flow circuits 13 is described. Stat 1 from MPUX status register 89 (FIG. 3) selectively enable AND circuits 444. AND circuits 444 then pass signals from XA register 14 to data flow status circuits 45 (a set of gates). Data flow status 445 also receives hardware signals (not shown) from data flow circuits 13 showing operational status, i.e., data check, write check, and the like. Output signals from data flow status 445 are supplied through OR circuits 446 to CBI cable 30.

XA register also supplies its signals to logic circuits 447 which decode the signals for generating special control signals supplied over line 448. These special control signals are used in connection with diagnostic procedures which are not further described. In connection therewith, the stat 0 bit from MPUY register 89 is supplied over line 449 to logic circuits 447. These are combined to jointly control operation of write timing and control circuit 111 as well as control circuits 104. Special control signals can be used to abort parity checking during data transfer operations, provide connections in loop write-to-read diagnostics, (i.e., data received from INTFX is not actually recorded on the tape, record tape mark), and performs selected hardware checks under diagnostic control. AND circuits 450 are jointly responsive to signals in XA register 14 and MPUY stat 0 being active to supply a write initiate signal to control circuits 111. Circuits 111 respond to the write command for initiating signal generation and supplying signals over cable 33 to the addressed MTU. In a similar manner, logic circuits 451 are jointly responsive to signals from XA register 14 and stat 0 of MPUY to supply a read command signal over line 452 to control circuits 104. For example, register XA may be an 8-bit register; and bit 4 being active simultaneously with MPUY stat 0 being active indicates initiate read. Control circuits 104 respond to the read command signal on line 452 in the same manner that previous hardware-sequence controllers responded to an initiate read command received over the data channel.

The data flow control within circuits 13 are set forth below in Table II:

TABLE II

DATA FLOW CIRCUITS COMMAND STRUCTURE

| Command | Active Bits | |
|---|---|---|
| Transfer XA to TIE | | MPUX Stat 4 |
| Special Diagnostic Commands | XA–0, | MPUY Stat 0 |
| Write | XA–1, | MPUY Stat 0 |
| Read | XA–4, | MPUY Stat 0 |
| Transfer Sense Byte A to CBI | XA–6, | MPUX Stat 1 |
| Transfer Sense Byte B to CBI | XA–7, | MPUX Stat 1 |
| NRZI Last Mode Set | XA–7 | |
| Select PE Mode | YA–0 | |
| Select Forward | YA–1 | |
| Lower Threshold | YA–2 | |
| FORCE (enable detection) | YA–4 | |
| Data Rate | Decode YA–5, 6, 7 | |

In the above table, the active bits indicate that when a binary "1" is stored in a particular bit that the command function on the left side of the Table is performed. For example, the contents of register XA are transferred to TIE register within data flow circuits whenever MPUX Stat 4 is active. TIE register is used by the error detection and correction circuit to correct bits in accordance with the indicated track in error. Special diagnostic commands are transferred when the XA bit 0 register (XA–0) is active and MPUY stat 0 is active. Similarly, as previously explained, write and read commands are initiated. It is to be understood that controls 111 and 104, upon receipt of a write or read command, may perform additional logic decisions before actual reading or writing is effected. Such additional logic decisions are those used in prior I/O controllers. Each data flow circuit 13 may generate two sense bytes A and B which indicate various status for the data flow circuits. For example, sense byte A may represent PE status whereas sense byte B may represent NRZI status. The bits from the YA register are not gated to data flow circuits, but are transferred directly to effect control. For example, select PE mode is generated within data flow circuits 13 whenever YA register bit 0 is active. If bit 0 is not active, the NRZI mode is selected. Similarly, forward mode of operation is selected if YA-1 is active and the backward mode whenever YA-1 is inactive. Data rate for transferring data from the addressed MTU is decoded by the three YA bits 5, 6, and 7. For example, various MTU's may be attached to INTFY. These may transport tape at different velocities, for example, 75 ips, 125 ips, 200 ips, and the like. This information is contained in the three bits providing for maximum of eight different MTU speeds.

The implementation of Table II from register YA to control circuits 104 is shown in abbreviated form in FIG. 37.

While the invention has been particularly shown and described with reference to preferred embodiments thereof, it will be understood by those skilled in the art that various changes in form and details may be made therein without departing from the spirit and scope of the invention.

What is claimed is:

1. A microprogrammable I/O controller adapted to control a plurality of I/O devices in response to controlling system sets of instructions and processing information-bearing signals therebetween, the improvement including the combination:

a plurality of independently operable microprogrammable units (MPU's);

each MPU having its own program of micro-instructions, a set of output exchange registers (A, B), and input gating means receiving signals from said exchange registers of all other MPU's and selectively opened in accordance with the respective MPU program of micro-instructions; and data flow means receiving signals from said exchange registers and responsive thereto be perform signal-processing operations including signal waveform modifications for changing information representing characteristics in accordance with signal patterns in said exchange registers for exchanging information-bearing signals between said controlling system and said I/O devices.

2. The combination of claim 1 wherein each MPU has a computing capability substantially less than that required for singly controlling said data flow means, controlling said I/O devices and responding to said sets of instructions; and all of said MPU's being identically constructed except for the respective programs of micro-instructions.

3. The combination of claim 1 wherein said data flow means has an MPU to process said information-bearing signals in accordance with its program of instructions and being responsive to signals in said exchange registers from said MPU's not in said data flow means for performing said signal-processing operations.

4. A microprogrammable I/O controller adapted to control a plurality of I/O devices in response to controlling system sets of instructions and for processing information-bearing signals therebetween, the improvement including the combination:

a plurality of independently programmable microprogrammable units (MPU's), a set of output exchange registers for interconnecting said MPU's and input gating means in each MPU receiving signals from said exchange registers from the other MPU's and each MPU selectively opening said gating means in accordance with the MPU program of instructions, one of said MPU's (MPUX) being connected to said controlling system for exchanging control signals and data signals therewith and for coordinating transfer of signals between said data flow means and said controlling system, a second one of said MPU's (MPUY) being connected solely to said I/O devices for coordinating operation thereof with said data flow means, and an I/O device address register in said controller and connected to MPUX for transferring I/O device address signals from MPUX to said I/O devices for activating same for operation with MPUY and said data flow means.

5. The combination of claim 4 wherein said data flow means has data-signal writing means and data-signal reading means respectively for supplying signals to and from said I/O devices, one of said output exchange registers of MPUY (register YA) being connected primarily to said read detection portion and one of said output exchange registers MPUX (register XA) being connected primarily to said write control circuits;

MPUX and MPUY each having status registers; and command means in said data flow means jointly responsive to signals in said status registers and to signals in registers XA and YA respectively of MPUX and MPUY for initiating and controlling signal-processing operations in said data flow means.

6. The combination set forth in claim 5 wherein said data flow means includes data flow sense registers having signals indicating operational status thereof, means in said data flow means jointly responsive to status signals from MPUX and to signals from register XA to transfer sense bytes from said sense registers to said controlling system.

7. The combination of claim 5 wherein register YA supplies its signals directly to said data flow means unconditionally imposing operational conditions thereon in accordance with the signal pattern therein;

register XA being selectively gated to said data flow means by said status registers of MPUX and MPUY for selectively altering operational status of said data flow means such that said output register of MPUX may be used jointly for transferring instructional signals to MPUY and said data flow means; and MPUX monitoring signals in register YA.

8. The combination of claim 4 wherein MPUX output exchange registers are XA and XB and wherein MPUY output exchange registers are YA and YB, said registers XA and YA being connected to said data flow means and registers XB and YB being connected only to MPUY and MPUX, respectively;

status registers in each MPUX and MPUY; and branch control means in each MPUX and MPUY receiving signals from status registers of MPUY and MPUX, respectively, and said microprograms in MPUX and MPUY coordinating operations in accordance with the status signals in said status registers and MPUY branching to microprograms in accordance with signals in register XA.

9. The combination of claim 8 wherein programs in MPUX during an initial selection by said controlling system provide coordination between the I/O controller and the controlling system;

programs in MPUY responding to said MPUX programs for polling the status of attached I/O devices; and programs in MPUX selecting an I/O device being polled by MPUY, said MPUY supplying status signals to MPUX for either selecting or deselecting an I/O device and indicating same to MPUX via said exchange registers.

10. The combination set forth in claim 4 wherein MPUX and MPUY each have a plurality of independently performable microprograms;

MPUY including instruction counter means presettable to a predetermined instruction within a program of instructions;

MPUX forcing said MPUY instruction counter to said one number and simultaneously providing a reference to a given program of instructions in said exchange registers, said MPUY executing a program of instructions in accordance with said instruction counter to obtain the reference to a given program of instructions from said exchange register and then executing said given program; and MPUY having timing pulse means and means further operative upon completion of said given program of instructions to stop said timing pulse means until MPUX again inserts a number into said instruction counter of MPUY.

11. A data channel controller having first and second interface portions, each portion having different signal formats, data flow circuits electrically interposed between said portions and operative to alter information-bearing signals in accordance with said signal formats whereby signals may be exchanged between said portions, the improvement including the combination:

a plurality of MPU's (microprogrammable units), each MPU having a memory, an input and an output portion;

first and second of said MPU's respectively operatively associated with said first and second interface portions and being programmable to exchange control and data signals therewith;

first and second sets of exchange registers respectively connected to said first and second MPU's for receiving result signals therefrom and supplying said result signals to said data flow circuits for controlling same to alter said information-bearing signals; and first and second gating means respectively controlled by said first and second MPU's for gating said result signals from said second and first exchange registers respectively into said first and second MPU's.

12. The combination set forth in claim 11 wherein said first MPU is operative to sample one of said exchange registers of said second MPU while said one exchange register is supplying signals to said data flow circuits for monitoring operation thereof whereby said first MPU exercises simultaneous supervisory control over said second MPU and said data flow circuits such that programming coordination between said first and second MPU's is effected.

13. The combination set forth in claim 11 further including a third MPU is said data flow circuits being jointly responsive to said first and second MPU's to perform signal-processing operations in accordance with signals received from said first and second sets of exchange registers.

14. The combination set forth in claim 11 wherein a plurality of record-media transporting devices are connected to said second interface portion and being responsive to address signals for initiating an active condition, and said first MPU having an address register connected to all of said record-media devices for addressing same and all other connections between said controller and said record-media devices being through said second MPU and said data flow means.

15. An I/O controller having first and second microprogrammed MPU's (microprogrammable units) each performing different but functionally related program operations and supplying control signals to interconnecting register means;

data flow circuits receiving said control signals from said register means having first and second portions respectively primarily responsive to said MPU's to perform signal-processing operations including changing signal information representation while maintaining information content; and said first and second MPU's receiving said control signals under microprogram selection from said register means and being responsive thereto for coordinating said signal-processing operations in said data flow circuits and operations of said microprograms.

16. The controller set forth in claim 15 having quiescent periods wherein said data flow circuits are processing no signals, the combination further including:

a stat C and D means in each MPU supplying status signals to the other MPU, trap means in the second MPU to select a given micropro-gram in response to a trap signal from said first MPU, a microprogram interrupt scan in said first MPU including, a. device end prime (DEP) scan microprogram in each MPU, said first MPU scan trapping said second MPU to scan DEP, said second MPU setting its stat C on a detected DEP and stat D on no such detection, said first MPU repetitively scanning said second MPU stats C and D until one is activated, and said second MPU waiting said first MPU after setting either its said stats C or D, and b. additional microprograms in said MPU is said IDLESCAN interleaving status sensing and exchanging in accordance with said stats C and D during such quiescent period.

17. The controller set forth in claim 15 wherein said data flow circuits include bus connections for a controlling and a controlled signal processing system and operative to exchange data signals therebetween, said data flow circuits including multimode signal processing circuits with first portions operative with said controlling system and second portions with said controlled system, said first and second portions being respectively controlled and actuated by microprograms in said first and second MPU's with coordination therebetween effected by microprograms, and said data flow circuits including data flow status means monitoring operations of said data flow circuits and said data flow circuits being responsive to signals in said first MPU exchange register means to supply status indicating signals to said controlling system rather than data signals from said controlled system.

18. The I/O controller set forth in claim 15 further including gating means interposed between a portion of said register means receiving signals from said first MPU and said data flow circuits, said first MPU activating said second MPU to perform program functions relating to initial portions of a signal-processing operation, and said second MPU activating said gating means to initiate operations in said data flow circuits whenever said second MPU has reached a predetermined program status in said program functions.

19. A microprogrammable controller adapted to selectively connect a controlling system to a controlled system, including the combination:

first and second microprocessors (MP1 and MP2, respectively) with interchange (IM) means for selectively transferring signals therebetween;

data flow means connected to said IM means and responsive to first signals in said IM means to effect predetermined signal exchange between said systems and being responsive to second signals in said IM means to generate status signals and independent means in said data flow means responsive to signals being processed to generate additional status signals;

MP1 having program controlled means responsive to signals from said controlling system to generate some of said signals;

MP2 having program controlled means responsive to said MP1 first signals to generate the remainder of said first signals; and one of said MP's effecting an electrical connection between said data flow means and said controlled system and supplying signals to said IM means as some of said first signals indicating an electrical connection has been effected.

20. A microprogrammable controller, including the combination:

first and second independent microprocessors including means for exchanging signals therebetween, data flow circuits responsive to said microprocessors to establish sequences of signal-processing operations including signal waveform modifications and generating signals indicative of operational status including some status signals in response to said signal-processing operations, first and second interface means connected to said microprocessors and said data flow circuits for exchanging signals between different units connectable to said controller, and said microprocessors being constructed to receive programs for respectively supervising signal-exchanging operations between the units respectively connectable to said interface means.

* * * * *